United States Patent
Stuart et al.

(10) Patent No.: US 12,529,789 B2
(45) Date of Patent: *Jan. 20, 2026

(54) SYSTEMS AND METHODS FOR ANALYZING AND DISPLAYING ACOUSTIC DATA

(71) Applicant: Fluke Corporation, Everett, WA (US)

(72) Inventors: Michael D. Stuart, Issaquah, WA (US); Dileepa Prabhakar, Edmonds, WA (US); Scott M. Tsukamaki, Bothell, WA (US); Darwin C. Witt, Seattle, WA (US)

(73) Assignee: Fluke Corporation, Everett, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/635,826

(22) Filed: Apr. 15, 2024

(65) Prior Publication Data

US 2024/0264305 A1    Aug. 8, 2024

Related U.S. Application Data

(63) Continuation of application No. 17/262,497, filed as application No. PCT/US2019/043224 on Jul. 24, 2019, now Pat. No. 11,960,002.

(Continued)

(51) Int. Cl.
*G01S 15/89*    (2006.01)
*G01C 3/02*    (2006.01)
(Continued)

(52) U.S. Cl.
CPC ............ *G01S 15/8977* (2013.01); *G01C 3/02* (2013.01); *G01C 21/16* (2013.01); *G01H 3/125* (2013.01);
(Continued)

(58) Field of Classification Search
CPC ............... G01S 15/8977; G06T 7/70
(Continued)

(56) References Cited

U.S. PATENT DOCUMENTS 3,592,534 A    7/1971    Duck et al.
4,662,222 A    5/1987    Johnson
(Continued)

FOREIGN PATENT DOCUMENTS

CN    101111748 A    1/2008
CN    101290347 A    10/2008
(Continued)

OTHER PUBLICATIONS

English Abstract and Machine Translation for Chinese Publication No. CN101290347A, 1 published Oct. 22, 2008, 9pgs.
(Continued)

*Primary Examiner* — Lan Dai T Truong
(74) *Attorney, Agent, or Firm* — Seed Intellectual Property Law Group LLP

(57)    ABSTRACT

Some systems include an acoustic sensor array configured to receive acoustic signals, an electromagnetic imaging tool configured to receive electromagnetic radiation, a user interface, a display, and a processor. The processor can receive electromagnetic data from the electromagnetic imaging tool and acoustic data from the acoustic sensor array. The processor can generate acoustic image data of the scene based on the received acoustic data, generate a display image comprising combined acoustic image data and electromagnetic image data, and present the display image on the display. The processor can receive an annotation input from the user interface and update the display image based on the received annotation input. The processor can be configured to determine one or more acoustic parameters associated with the received acoustic signal and determine a criticality (Continued)

associated with the acoustic signal. A user can annotated the display image with determined criticality information or other determined information.

20 Claims, 52 Drawing Sheets

Related U.S. Application Data

(60) Provisional application No. 62/702,716, filed on Jul. 24, 2018.

(51) Int. Cl.
| | | |
|---|---|---|
| *G01C 21/16* | (2006.01) | |
| *G01H 3/12* | (2006.01) | |
| *G01S 3/808* | (2006.01) | |
| *G01S 7/56* | (2006.01) | |
| *G01S 15/86* | (2020.01) | |
| *G01S 17/86* | (2020.01) | |
| *G01S 19/01* | (2010.01) | |
| *G06T 7/70* | (2017.01) | |
| *G06T 11/00* | (2006.01) | |
| *H04N 23/95* | (2023.01) | |
| *H04R 29/00* | (2006.01) | |
| *H04S 7/00* | (2006.01) | |

(52) U.S. Cl.
CPC ............ *G01S 3/808* (2013.01); *G01S 3/8086* (2013.01); *G01S 7/56* (2013.01); *G01S 15/86* (2020.01); *G01S 15/89* (2013.01); *G01S 17/86* (2020.01); *G01S 19/01* (2013.01); *G06T 7/70* (2017.01); *G06T 11/00* (2013.01); *H04N 23/95* (2023.01); *H04R 29/008* (2013.01); *H04S 7/301* (2013.01); *H04S 7/40* (2013.01); *G06T 2207/10012* (2013.01); *H04R 2430/20* (2013.01)

(58) Field of Classification Search
USPC .......................................................... 348/163
See application file for complete search history.

(56) References Cited

U.S. PATENT DOCUMENTS

| | | | |
|---|---|---|---|
| 5,289,838 | A | 3/1994 | Odell |
| 6,006,175 | A | 12/1999 | Holzrichter |
| 6,198,694 | B1 | 3/2001 | Kröling et al. |
| 6,249,075 | B1 | 6/2001 | Bishop et al. |
| 6,473,514 | B1 | 10/2002 | Bodley et al. |
| 7,138,576 | B2 | 11/2006 | Metcalf |
| 7,289,633 | B2 | 10/2007 | Metcalf |
| 7,538,326 | B2 | 5/2009 | Johnson et al. |
| 8,279,112 | B2 | 10/2012 | Carrick |
| 8,376,946 | B2 | 2/2013 | Littrup et al. |
| 8,446,254 | B2 | 5/2013 | Carrick et al. |
| 8,520,858 | B2 | 8/2013 | Metcalf |
| 8,638,362 | B1 | 1/2014 | Thompson et al. |
| 8,701,491 | B2 | 4/2014 | Scholte et al. |
| 8,784,321 | B2 | 7/2014 | Courtney et al. |
| 9,084,045 | B2 | 7/2015 | Scholte |
| 9,176,990 | B2 | 11/2015 | Stuart et al. |
| 9,511,842 | B2 | 12/2016 | Longson et al. |
| 9,520,120 | B2 | 12/2016 | Scholte et al. |
| 9,568,492 | B2 | 2/2017 | Yuen |
| 9,599,632 | B2 | 3/2017 | Yuen |
| 9,706,292 | B2 | 7/2017 | Duraiswami et al. |
| 9,729,803 | B2 | 8/2017 | Holliday |
| 9,736,580 | B2 | 8/2017 | Cahill et al. |
| 10,042,038 | B1 * | 8/2018 | Lord ................ G10L 25/51 |
| 10,111,013 | B2 | 10/2018 | Hu |
| 10,152,811 | B2 | 12/2018 | Johnson et al. |
| 10,375,325 | B2 | 8/2019 | Schmidt |
| 10,408,933 | B1 | 9/2019 | DeHart et al. |
| 11,099,075 | B2 | 8/2021 | Stuart |
| 11,209,306 | B2 | 12/2021 | Stuart et al. |
| 11,494,158 | B2 | 11/2022 | Reiger et al. |
| 2002/0069054 | A1 | 6/2002 | Arrowood et al. |
| 2003/0089183 | A1 | 5/2003 | Jacobsen et al. |
| 2003/0202423 | A1 | 10/2003 | Clayton et al. |
| 2004/0021031 | A1 | 2/2004 | Klaus |
| 2004/0120532 | A1 | 6/2004 | Dedieu et al. |
| 2004/0160370 | A1 | 8/2004 | Ghosh et al. |
| 2004/0252587 | A1 | 12/2004 | Melese et al. |
| 2006/0153391 | A1 | 7/2006 | Hooley et al. |
| 2006/0159281 | A1 | 7/2006 | Koh et al. |
| 2006/0289772 | A1 | 12/2006 | Johnson et al. |
| 2007/0005348 | A1 | 1/2007 | Klefenz |
| 2007/0189544 | A1 | 8/2007 | Rosenberg |
| 2007/0195646 | A1 | 8/2007 | Govindswamy et al. |
| 2008/0034869 | A1 | 2/2008 | Heinz et al. |
| 2008/0074307 | A1 | 3/2008 | Boric-Lubecke et al. |
| 2008/0146930 | A1 | 6/2008 | Takeuchi |
| 2008/0265130 | A1 | 10/2008 | Colomb et al. |
| 2009/0058663 | A1 | 3/2009 | Joshi et al. |
| 2009/0312819 | A1 | 12/2009 | Klefenz et al. |
| 2010/0117885 | A1 | 5/2010 | Holbrook et al. |
| 2010/0161255 | A1 | 6/2010 | Mian et al. |
| 2010/0208907 | A1 | 8/2010 | Ukai et al. |
| 2010/0272286 | A1 | 10/2010 | Bai et al. |
| 2011/0019835 | A1 | 1/2011 | Schmidt et al. |
| 2011/0098056 | A1 | 4/2011 | Rhoads et al. |
| 2011/0120222 | A1 | 5/2011 | Scholte et al. |
| 2011/0252888 | A1 | 10/2011 | Goodman et al. |
| 2012/0051182 | A1 | 3/2012 | Shin |
| 2012/0089396 | A1 | 4/2012 | Patel et al. |
| 2012/0331143 | A1 | 12/2012 | Niebergall et al. |
| 2013/0155248 | A1 | 6/2013 | Neeley et al. |
| 2013/0155249 | A1 | 6/2013 | Neeley et al. |
| 2013/0162835 | A1 | 6/2013 | Forland et al. |
| 2013/0226593 | A1 | 8/2013 | Magnusson et al. |
| 2013/0272548 | A1 | 10/2013 | Visser et al. |
| 2014/0055785 | A1 | 2/2014 | Silny et al. |
| 2014/0071789 | A1 | 3/2014 | Brodsky et al. |
| 2014/0119547 | A1 | 5/2014 | Nobile et al. |
| 2014/0177388 | A1 | 6/2014 | D'Angelo |
| 2014/0192201 | A1 | 7/2014 | Benoit et al. |
| 2014/0241548 | A1 | 8/2014 | Kim et al. |
| 2014/0267757 | A1 | 9/2014 | Abramson et al. |
| 2014/0269163 | A1 | 9/2014 | Proctor |
| 2014/0278385 | A1 | 9/2014 | Fan |
| 2015/0010186 | A1 | 1/2015 | Larsen |
| 2015/0015763 | A1 | 1/2015 | Lee et al. |
| 2015/0117673 | A1 | 4/2015 | Fenichel |
| 2015/0177403 | A1 | 6/2015 | Haugen et al. |
| 2015/0230024 | A1 | 8/2015 | Goshen et al. |
| 2015/0247999 | A1 | 9/2015 | Ntziachristos et al. |
| 2015/0293214 | A1 | 10/2015 | Cannon et al. |
| 2015/0296413 | A1 | 10/2015 | Sadek et al. |
| 2015/0317565 | A1 | 11/2015 | Li et al. |
| 2015/0371096 | A1 | 12/2015 | Stein et al. |
| 2016/0025993 | A1 | 1/2016 | Mor et al. |
| 2016/0037244 | A1 | 2/2016 | Yamanaka et al. |
| 2016/0073087 | A1 | 3/2016 | Davis et al. |
| 2016/0076937 | A1 | 3/2016 | Stuart et al. |
| 2016/0142830 | A1 | 5/2016 | Hu |
| 2016/0165341 | A1 | 6/2016 | Benattar |
| 2016/0277863 | A1 | 9/2016 | Cahill et al. |
| 2016/0291146 | A1 | 10/2016 | Wang et al. |
| 2016/0330545 | A1 | 11/2016 | McElveen et al. |
| 2016/0345115 | A1 | 11/2016 | Paik |
| 2016/0364960 | A1 | 12/2016 | Cheatham, III et al. |
| 2017/0010359 | A1 | 1/2017 | Jung |
| 2017/0061663 | A1 | 3/2017 | Johnson et al. |
| 2017/0061981 | A1 | 3/2017 | Nakadai et al. |
| 2017/0178392 | A1 | 6/2017 | Zuccarino et al. |
| 2017/0225033 | A1 | 8/2017 | Czaja |
| 2017/0243367 | A1 | 8/2017 | Lee et al. |
| 2017/0281982 | A1 | 10/2017 | Zhu et al. |
| 2017/0374296 | A1 | 12/2017 | Schmidt |
| 2018/0190260 | A1 | 7/2018 | Christoph |

(56) References Cited

U.S. PATENT DOCUMENTS

| | | |
|---|---|---|
| 2018/0199137 A1 | 7/2018 | Mate et al. |
| 2018/0270576 A1 | 9/2018 | Chua et al. |
| 2018/0317826 A1 | 11/2018 | Muhsin et al. |
| 2019/0128730 A1 | 5/2019 | Stuart et al. |
| 2019/0128739 A1 | 5/2019 | Stuart |
| 2019/0129027 A1* | 5/2019 | Stuart .................. H04N 23/20 |
| 2019/0231220 A1 | 8/2019 | Refai et al. |
| 2019/0261108 A1 | 8/2019 | Saksela et al. |
| 2020/0195906 A1 | 6/2020 | Van Hoff et al. |
| 2021/0152969 A1 | 5/2021 | Vilkamo et al. |
| 2021/0293953 A1 | 9/2021 | Stuart et al. |
| 2021/0310856 A1 | 10/2021 | Stuart et al. |
| 2021/0310857 A1 | 10/2021 | Stuart et al. |
| 2021/0311187 A1 | 10/2021 | Stuart et al. |
| 2021/0311188 A1 | 10/2021 | Stuart et al. |
| 2022/0146668 A1 | 5/2022 | Stuart |
| 2024/0118416 A1 | 4/2024 | Stuart et al. |

FOREIGN PATENT DOCUMENTS

| | | |
|---|---|---|
| CN | 102879080 A | 1/2013 |
| CN | 205067744 U | 3/2016 |
| CN | 105474667 A | 4/2016 |
| CN | 107223332 A | 9/2017 |
| DE | 19844870 A1 | 4/2000 |
| DE | 102016215522 A1 | 2/2018 |
| EP | 1636404 A1 | 3/2006 |
| EP | 2469323 A1 | 6/2012 |
| FR | 3018023 A1 | 8/2015 |
| JP | H09304055 A | 11/1997 |
| JP | 2000075014 A | 3/2000 |
| JP | 2002181913 A | 6/2002 |
| JP | 2002300569 A | 10/2002 |
| JP | 2004028980 A | 1/2004 |
| JP | 2004077277 A | 3/2004 |
| JP | 2006516373 A | 6/2006 |
| JP | 2006308409 A | 11/2006 |
| JP | 2007225590 A | 9/2007 |
| JP | 2009210491 A | 9/2009 |
| JP | 2010206419 A | 9/2010 |
| JP | 2011015050 A | 1/2011 |
| JP | 2011163776 A | 8/2011 |
| JP | 2012021969 A | 2/2012 |
| JP | 4892177 B2 | 3/2012 |
| JP | 2012150059 A | 8/2012 |
| JP | 2013250111 A | 12/2013 |
| JP | 2014137323 A | 7/2014 |
| JP | 2015078845 A | 4/2015 |
| JP | 2015152316 A | 8/2015 |
| JP | 2016046705 A | 4/2016 |
| JP | 2016515698 A | 5/2016 |
| JP | 5939341 B1 | 6/2016 |
| JP | 2017092732 A | 5/2017 |
| JP | 2017519967 A | 7/2017 |
| JP | 2017530580 A | 10/2017 |
| JP | 2017207399 A | 11/2017 |
| JP | 2018500075 A | 1/2018 |
| JP | 2018077837 A | 5/2018 |
| KR | 101204499 B1 | 11/2012 |
| KR | 20170015139 A | 2/2017 |
| NL | 9201787 A | 5/1994 |
| WO | WO 03011139 A1 | 2/2003 |
| WO | WO 2004021031 A1 | 3/2004 |
| WO | WO 2006060746 A2 | 6/2006 |
| WO | WO 2009130243 A2 | 10/2009 |
| WO | WO 2016148825 A1 | 9/2016 |
| WO | WO 2018055232 A1 | 3/2018 |
| WO | WO 2020023622 A1 | 1/2020 |

OTHER PUBLICATIONS

European Patent Application No. 18203998.2, Extended European Search Report mailed Mar. 28, 2019, 8 pages.
European Patent Application No. 18204004.8, Extended European Search Report mailed March 22, 2019, 11 pages.
European Patent Application No. 18204005.5, Extended European Search Report mailed July 18, 2019, 19 pages.
European Patent Application No. 18204005.5, Partial European Search Report mailed March 21, 2019, 18 pages.
Lanslots, J. et al., "Selecting Sound Source Localization Techniques for Industrial Applications", Sound & Vibration, www.SandV.com, Jun. 2010, 5 pgs.
Teo et al., "Multifrequency Holography Using Backpropogation," Ultrasonic Imaging, vol. 8, No. 3, July 1986, pp. 213-224, Abstract Only.

* cited by examiner

SYSTEMS AND METHODS FOR ANALYZING AND DISPLAYING ACOUSTIC DATA

CROSS-REFERENCE TO RELATED APPLICATIONS

This application is a continuation of U.S. application Ser. No. 17/262,497, filed Jan. 22, 2021, which was a U.S. national phase of PCT/US2019/043224, filed Jul. 24, 2019, which claimed the benefit of U.S. Provisional Application No. 62/702,716, filed Jul. 24, 2018, all of which are incorporated herein by reference.

BACKGROUND

Technical Field

The present disclosure relates to acoustic imaging.

Description of the Related Art

Presently available acoustic imaging devices include acoustic sensor array configurations that have various frequency sensitivity limitations due to a variety of factors. For instance, some acoustic imaging devices are designed to be responsive to a range of acoustic frequencies between approximately 20 Hz and approximately 20 kHz. Other devices (e.g., ultrasonic devices) are designed to be responsive to a range of acoustic frequencies between approximately 38 kHz and approximately 45 kHz.

However, acoustic imaging devices that are generally designed operating in the 20 Hz to 20 KHz frequency range cannot effectively detect or image higher frequencies, for example, up to or above approximately 50 kHz. Likewise, acoustic or ultrasonic devices that are designed to operate in the 20 kHz to 50 KHz frequency range cannot effectively detect and/or image lower frequencies, for example, at or below 20 kHz. This can be for a variety of reasons. For example, sensor arrays which are optimized for lower (e.g., audible) frequencies typically contain individual sensors that are farther apart than do sensor arrays that are optimized for higher (e.g., ultrasonic) frequencies.

Additionally or alternatively to hardware concerns, different calculation algorithms and methods of acoustic imaging are often better suited for acoustic signals having different frequencies and/or different distances to target, making it difficult to determine how to best to acoustically image a scene without, particularly to an inexperienced user.

Such discrepancies in imaging different acoustic frequency ranges are due, in part, to the physics behind the propagation of sound waves of different frequencies and wavelengths through air. Certain array orientations, array sizes, and calculation methods can generally be better suited for acoustic signals having different frequency characteristics (e.g., audible frequencies, ultrasonic frequencies, etc.).

Similarly, different array properties and/or calculation methods can be better suited for acoustic scenes at different distances to target. For example, near field acoustic holography for targets at very close distances, various acoustic beamforming methods for targets at greater distances.

Accordingly, acoustic inspection using acoustic arrays (e.g., for acoustic imaging) can require a wide range of equipment, for example, for analysis of acoustic signals having different frequency ranges as well as expertise in understanding when different hardware and calculation techniques are appropriate for performing acoustic analysis. This can make acoustic inspections time- and cost-intensive, and can require an expert to perform such inspections.

For example, a user may be forced to manually select various hardware and/or software for performing acoustic analysis. However, an inexperienced analyst may be incapable of knowing the preferred combination of hardware and software for a given acoustic analysis and/or acoustic scene. Additionally, isolating a sound of interest from within a scene can provide its own challenges, particularly in a cluttered scene, and may prove tedious and frustrating to an inexperienced user. For instance, a given acoustic scene, especially in a noisy environment, can include acoustic signals including any number of frequency, intensity, or other characteristics that may obscure acoustic signals of interest.

Traditional systems often require users to manually identify various acoustic parameters of interest prior to inspection in order to analyze the sounds of interest. However, an inexperienced user may be unaware of how to best isolate and/or identify various sounds of interest.

Additionally, when multiple imaging technologies (e.g., visible light, infrared, ultraviolet, acoustic, or other imaging techniques) are used in tandem while inspecting the same object or scene, the physical placement and or other settings (e.g., focus position) of the tools used to perform the different imaging techniques can impact the analysis. For example, different locations and/or focus positions of each imaging device can result in a parallax error wherein the resulting images may be misaligned. This may result in inability to properly localize areas of interest and/or problem areas within a scene, documentation errors, and misdiagnosis of problems. For example, with respect to acoustic image data, it can be difficult to identify a location or source of an acoustic signal of interest if acoustic image data is misaligned with respect to image data from other imaging technologies (e.g., visible light and/or infrared image data).

Existing ultrasonic test and inspection tools employ ultrasonic sensor(s), with or without the use of a parabolic dish in order to assist in focusing the sound towards the receiving sensor(s). When a sound of a specific frequency is detected, it is typically displayed as a rising or falling numerical value, or on a frequency or decibel level graph on the display of the device. This can be very confusing and non-intuitive to many users. No image of the live scene or visualizations of the sounds are available.

Isolating, localizing, and analyzing a specific sound can be a tedious process, and can be confusing for many end users. The complex and non-intuitive interface between device and human can become a barrier to effective use of the device, and/or require the need for additional training even to operate basic functionality on the device.

Advanced acoustic imaging devices have the capability of producing a false-color visual representation of sounds integrated with a still or live visible image of a scene. Even on these devices, selection and adjustment controls are important for proper visualization of sounds. However, traditional controls have been developed for use by highly-trained acoustics technicians and specialists. These controls are often non-intuitive to the average user, and can result in some confusion over proper selection and visualization parameter controls. Use of these controls by those with a lower level of training can be cumbersome, and lead to errors in parameter selection, and ultimately lead to poor acoustic visualizations.

Moreover, additional contextual information is often needed with this method as well, in order to perform proper analysis and reporting activities. Technicians desiring to collect additional contextual information about a scene that is being inspected with a traditional ultrasonic testing device or an acoustic imager typically must take photographs with a separate camera or device and/or record written notes, or notes recorded in a separate device such as a PC, tablet, smartphone, or other mobile device. These secondary notes must then be manually synchronized or matched up with the data from the ultrasonic tool or acoustic imager. This can take a significant amount of time, and can also be prone to errors in matching the correct data with the corresponding secondary contextual information.

BRIEF SUMMARY

Some aspects of the disclosure are directed toward an acoustic analysis system. Systems can include an acoustic array comprising a plurality of acoustic sensor elements, each of the plurality of acoustic sensor elements can be configured to receive acoustic signals from an acoustic scene and output acoustic data based on the received acoustic signals.

Systems can include an electromagnetic imaging tool configured to receive electromagnetic radiation from a target scene and output electromagnetic image data representative of the received electromagnetic radiation. The electromagnetic imaging tool may be configured to detect electromagnetic radiation from a range of wavelengths, such as a range including the visible light and/or near-infrared light spectrum. In some systems, the electromagnetic imaging system may comprise a visible light camera module and/or an infrared camera module.

Systems can include a user interface, a display, and a processor. The processor may be in communication with the acoustic sensor array, the electromagnetic imaging tool, the user interface, and the display.

In some systems, the processor can be configured to receive electromagnetic data from the electromagnetic imaging tool and receive acoustic data from the acoustic sensor array. The processor may also generate acoustic image data of the scene based on the received acoustic data; generate a display image comprising combined acoustic image data and electromagnetic image data; and present the display image on the display. In some embodiments, the processor may receive an annotation input from the user interface and update the display image on the display based on the received annotation input. The annotation input may comprise a freestyle annotation received via a touch screen; a selection of an icon, or predefined shape, and/or an alphanumeric input.

In some systems, the processor is configured to determine one or more acoustic parameters associated with the received acoustic signal and determine a criticality associated with the acoustic signal, for example, based on a comparison of the one or more acoustic parameters to one or more predetermined thresholds. In some embodiments, the processor may also update the display image based on the determined criticality. A user may annotate an image with determined criticality information. A user may similarly annotate an image with determined information, such as a distance to target value.

The details of one or more examples set forth in the accompanying drawings and the description below. Other features, objects, and advantages will be apparent from the description and drawings, and from the claims.

DETAILED DESCRIPTION

Figure 1B:
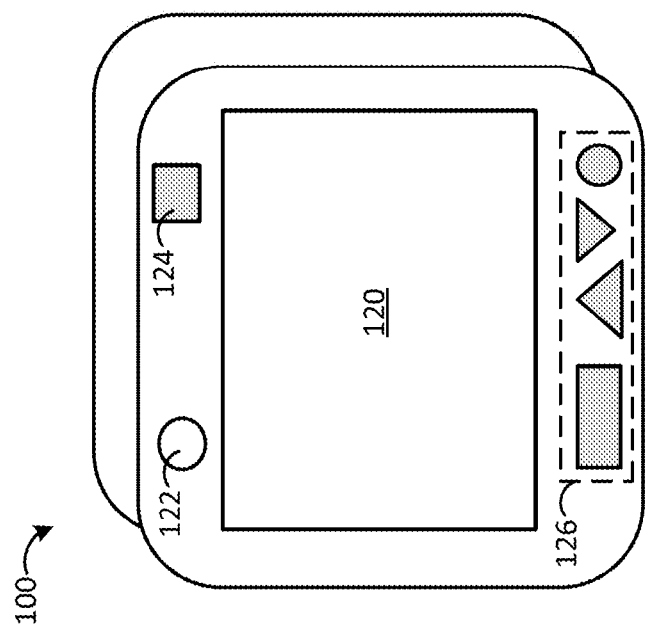
FIGS. 1A and 1B show front and back views of an example acoustic imaging device.
Figure 1A:
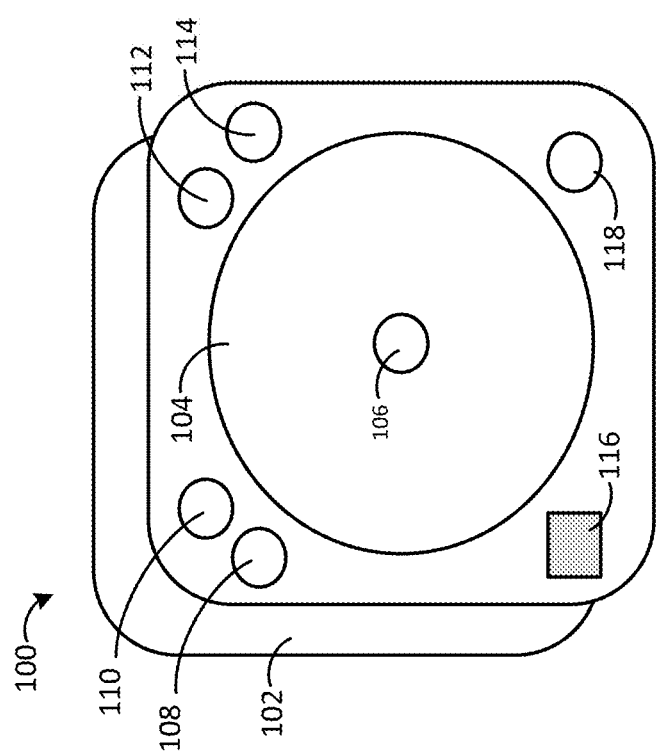

FIGS. 1A and 1B show front and back views of an example acoustic imaging device. FIG. 1A shows a front side of an acoustic imaging device 100 having a housing 102 supporting an acoustic sensor array 104 and an electromagnetic imaging tool 106. In some embodiments, the acoustic sensor array 104 includes a plurality of acoustic sensor elements, each of the plurality of acoustic sensor elements being configured to receive acoustic signals from an acoustic scene and output acoustic data based on the received acoustic signals. The electromagnetic imaging tool 106 can be configured to receive electromagnetic radiation from a target scene and output electromagnetic image data representative of the received electromagnetic radiation. The electromagnetic imaging tool 106 can be configured to detect electromagnetic radiation in one or more of a plurality of ranges of wavelengths, such as visible light, infrared, ultraviolet, or the like.

In the illustrated example, the acoustic imaging device 100 includes an ambient light sensor 108 and a location sensor 116, such as a GPS. The device 100 includes a laser pointer 110, which in some embodiments, includes a laser distance meter. The device 100 includes a torch 112, which can be configured to emit visible light radiation toward a scene, and an infrared illuminator 118, which can be configured to emit infrared radiation toward a scene. In some examples, device 100 can include an illuminator for illuminating a scene over any range of wavelengths. Device 100 further includes a projector 114, such as an image reprojector, which can be configured to project a generated image onto a scene, such as a colorized image, and/or a dot projector configured to project a series of dots onto a scene, for example, to determine a depth profile of the scene.

FIG. 1B shows a back side of the acoustic imaging device 100. As shown, the device includes display 120, which can present image or other data. In some examples, display 120 comprises a touch screen display. The acoustic imaging device 100 includes a speaker, which can provide audio feedback signals to a user, and a wireless interface 124, which can enable wireless communication between the acoustic imaging device 100 and an external device. The device further includes controls 126, which can include one or more buttons, knobs, dials, switches, or other interfacing components to enable a user to interface with the acoustic imaging device 100. In some examples, controls 126 and a touchscreen display combine to provide a user interface of the acoustic imaging device 100.

In various embodiments, acoustic imaging devices need not include every element shown in the embodiment of FIGS. 1A and 1B. One or more illustrated components can be excluded from an acoustic imaging device. In some examples, one or more components shown in the embodiment of FIGS. 1A and 1B can be included as a part of an acoustic imaging system but included separately from the housing 102. Such components can communicate with other components of an acoustic imaging system via wired or wireless communication techniques, for example, using wireless interface 124.

Figure 2:
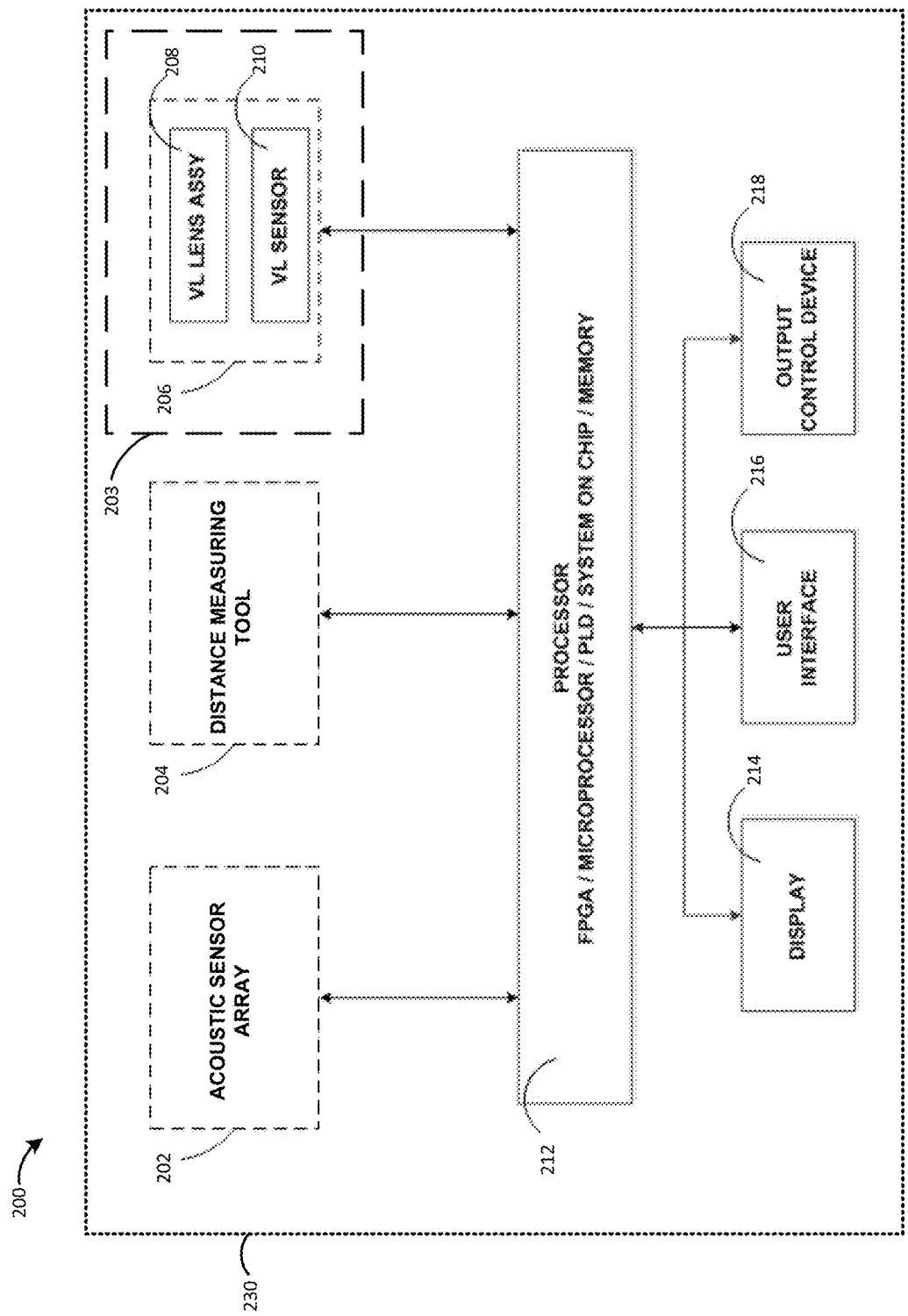
FIG. 2 is a functional block diagram illustrating components of an example of acoustic analysis system.

FIG. 2 is a functional block diagram illustrating components of an example of acoustic analysis system 200. The exemplary acoustic analysis system 200 of FIG. 2 can include a plurality of acoustic sensors such as microphones, MEMS, transducers, etc., arranged in an acoustic sensor array 202. Such arrays can be one-dimensional, two-dimensional, or three-dimensional. In various examples, the acoustic sensor array can define any suitable size and shape. In some examples, acoustic sensor array 202 includes a plurality of acoustic sensors arranged in a grid pattern such as, e.g., an array of sensor elements arranged in vertical columns and horizontal rows. In various examples, acoustic sensor array 202 can include an array of vertical columns by horizontal rows of, e.g., 8×8, 16×16, 32×32, 64×64, 128×128, 256×256, etc. Other examples are possible, and various sensor arrays need not necessarily include the same number of rows as columns. In some embodiments, such sensors can be positioned on a substrate, for example, such as a printed circuit board (PCB) substrate.

In the configuration shown in FIG. 2, a processor 212 in communication with the acoustic sensor array 202 can receive acoustic data from each of the plurality of acoustic sensors. During exemplary operation of acoustic analysis system 200, processor 212 can communicate with acoustic sensor array 202 to generate acoustic image data. For example, processor 212 can be configured to analyze data received from each of a plurality of acoustic sensors arranged in the acoustic sensor array and determine an acoustic scene by "back propagating" acoustic signals to the source of the acoustic signals. In some embodiments, processor 212 can generate a digital "frame" of acoustic image data by identifying various source locations and intensities of acoustic signals across a two-dimensional scene. By generating a frame of acoustic image data, processor 212 captures an acoustic image of a target scene at substantially a given point in time. In some examples, a frame comprises a plurality of pixels making up the acoustic image, wherein each pixel represents a portion of the source scene to which acoustic signals have been back-propagated.

Components described as processors within the acoustic analysis system 200, including processor 212, may be implemented as one or more processors, such as one or more microprocessors, digital signal processors (DSPs), application specific integrated circuits (ASICs), field programmable gate arrays (FPGAs), programmable logic circuitry, or the like, cither alone or in any suitable combination. Processor 212 may also include memory that stores program instructions and related data that, when executed by processor 212, cause acoustic analysis system 200 and processor 212 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow acoustic image data to be easily transferred to another computing device, or to be removed before acoustic analysis system 200 is used in another application. Processor 212 may also be implemented as a System on Chip that integrates some or all components of a computer or other electronic system into a single chip. The processor 212 (processing circuitry) can be configured to communicate the processed data to a display 214 or other output/control device 218.

In some embodiments, acoustic sensors in acoustic sensor array 202 generate a series of signals corresponding to the acoustic signals received by each acoustic sensor to represent an acoustic image. A "frame" of acoustic image data is generated when the signal from each acoustic sensor is obtained by scanning all of the rows that make up the acoustic sensor array 202. In some examples, processor 212 can acquire acoustic image frames at a rate sufficient to generate a video representation (e.g., 30 Hz, or 60 Hz) of the acoustic image data. Independent of the specific circuitry, acoustic analysis system 200 may be configured to manipulate acoustic data representative of the acoustic profile of a target scene so as to provide an output that can be displayed, stored, transmitted, or otherwise utilized by a user.

In some embodiments, the "back propagation" of received acoustic signals in order to generate acoustic image data comprises analyzing the received signals at the plurality of acoustic sensors in the acoustic sensor array 202, for example, via the processor. In various examples, performing the back propagation is a function of one or more parameters, including a distance to target, frequency, sound intensity (e.g., dB level) sensor array dimensions/configuration, including, for example, the spacing and arrangement of individual sensors within one or more arrays, etc. In some embodiments, such parameters can be pre-programmed into the system, for example, in memory. For example, acoustic sensor array 202 properties can be stored in memory, such as internal memory or memory associated particularly with the acoustic sensor array 202. Other parameters, such as a distance to target, can be received a variety of ways. For instance, in some examples, the acoustic analysis system 200 includes a distance measuring tool 204 in communication with the processor 212. The distance measuring tool can be configured to provide distance information representative of the distance from the distance measuring tool 204 to a particular location in the target scene. Various distance measuring tools can include a laser distance meter or other known distance measuring devices, such as other optical or audio distance measurement devices. Additionally or alternatively, a distance measuring tool can be configured to generate three-dimensional depth data such that each portion of a target scene has an associated distance-to-target value. Thus, in some examples, a distance to target measurement as used herein can correspond to a distance to each location within a target scene. Such three-dimensional depth data can be generated, for example, via a plurality of imaging tools having different view of a target scene, or via other known distance scanning tools. In general, in various embodiments, a distance measuring tool can be used to perform one or more distance measurement functions, including but not limited to: laser distance measurement, active sonic distance measurement, passive ultrasonic distance measurement, LIDAR distance measurement, RADAR distance measurement, millimeter wave distance measurement, and the like.

Distance information from the distance measuring tool 204 can be used in the back propagation calculation. Additionally or alternatively, the system 200 can include a user interface 216 into which a user may manually enter a distance to target parameter. For example, a user may enter a distance to target value into the system 200 in the event that the distance to a component suspected of producing acoustic signals is known or is difficult to measure with the distance measuring tool 204.

In the illustrated embodiment, acoustic analysis system 200 includes an electromagnetic imaging tool 203 for generating image data representative of a target scene. Exemplary electromagnetic imaging tools can be configured to receive electromagnetic radiation from a target scene and generate electromagnetic image data representative of the received electromagnetic radiation. In some examples, electromagnetic imaging tool 203 can be configured to generate electromagnetic image data representative of a particular range of wavelengths within the electromagnetic spectrum, such as infrared radiation, visible light radiation, and ultraviolet radiation. For instance, in some embodiments, an electromagnetic timing tool 203 can include one or more camera modules configured to generate image data representative of a particular range of wavelengths in the electromagnetic spectrum such as, for example, a visible light camera module 206.

Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 214 and/or stored in memory. Visible light camera module 206 can include any suitable components for performing the functions attributed to the module herein. In the example of FIG. 2, visible light camera module 206 is illustrated as including visible light lens assembly 208 and visible light sensor 210. In some such embodiments, visible light lens assembly 208 includes at least one lens that takes visible light energy emitted by a target scene and focuses the visible light energy on visible light sensor 210. Visible light sensor 210 can include a plurality of visible light sensor elements such as, e.g., CMOS detectors, CCD detectors, PIN diodes, avalanche photo diodes, or the like. Visible light sensor 210 responds to the focused energy by generating an electrical signal that can be converted and displayed as a visible light image on display 214. In some examples, the visible light module 206 is configurable by a user, and can provide output, for example, to display 214, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

In operation of some exemplary visible light camera modules 206, optical energy received from a target scene may pass through visible light lens assembly 208 and be focused on visible light sensor 210. When the optical energy impinges upon the visible light sensor elements of visible light sensor 210, photons within the photodetectors may be released and converted into a detection current. Processor 212 can process this detection current to form a visible light image of the target scene.

During use of acoustic analysis system 200, processor 212 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 212 can generate a "frame" of visible light image data by measuring the response of each visible light sensor element of acoustic analysis system 200 a single time. By generating a frame of visible light data, processor 212 captures visible light image of a target scene at a given point in time. Processor 212 may also repeatedly measure the response of each visible light sensor element of acoustic analysis system 200 so as to generate a dynamic visible light image (e.g., a video representation) of a target scene. In some examples, the visible light camera module 206 may include its own dedicated processor or other circuitry (e.g., ASIC) capable of operating the visible light camera module 206. In some such embodiments, the dedicated processor is in communication with processor 212 for providing visible light image data (e.g., RGB image data) to processor 212. In alternative embodiments, a dedicated processor for the visible light camera module 206 may be integrated into processor 212.

With each sensor element of visible light camera module 206 functioning as a sensor pixel, processor 212 can generate a two-dimensional image or picture representation of the visible light from a target scene by translating an electrical response of each sensor element into a time-multiplexed electrical signal that can be processed, e.g., for visualization on display 214 and/or storage in memory.

Processor 212 may control display 214 to display at least a portion of a visible light image of a captured target scene. In some examples, processor 212 controls display 214 so that the electrical response of each sensor element of visible light camera module 206 is associated with a single pixel on display 214. In other examples, processor 212 may increase or decrease the resolution of a visible light image so that there are more or fewer pixels displayed on display 214 than there are sensor elements in visible light camera module 206. Processor 212 may control display 214 to display an entire visible light image (e.g., all portions of a target scene captured by acoustic analysis system 200) or less than an entire visible light image (e.g., a lesser port of the entire target scene captured by acoustic analysis system 200).

In some embodiments, processor 212 may control display 214 to concurrently display at least a portion of the visible light image captured by acoustic analysis system 200 and at least a portion of an acoustic image generated via acoustic sensor array 202. Such a concurrent display may be useful in that an operator may reference the features displayed in the visible light image to help view sources of acoustic signals concurrently displayed in the acoustic image. In various examples, processor 212 may control display 214 to display the visible light image and the acoustic image in side-by-side arrangement, in a picture-in-picture arrangement, where one of the images surrounds the other of the images, or any other suitable arrangement where the visible light and the acoustic image are concurrently displayed.

For example, processor 212 may control display 214 to display the visible light image and the acoustic image in a combined arrangement. In such an arrangement, for a pixel or set of pixels in the visible light image representative of a portion of the target scene, there exists a corresponding pixel or set of pixels in the acoustic image, representative of substantially the same portion of the target scene. In various embodiments, the size and/or resolution of the acoustic and visible light images need not be the same. Accordingly, there may exist a set of pixels in one of the acoustic or visible light images that correspond to a single pixel in the other of the acoustic or visible light image, or a set of pixels of a different size. Similarly, there may exist a pixel in one of the visible light or acoustic images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single acoustic pixel has a plurality of corresponding visible light pixels, or a visible light pixel has a plurality of corresponding acoustic pixels. Additionally or alternatively, in some embodiments, not all visible light pixels have corresponding acoustic pixels, or vice versa. Such embodiments may be indicative of, for example, a picture-in-picture type display as previously discussed. Thus, a visible light pixel will not necessarily have the same pixel coordinate within the visible light image as does a corresponding acoustic pixel. Accordingly, as used herein, corresponding pixels generally refers pixels from any image (e.g., a visible light image, an acoustic image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the acoustic image may be superimposed on top of one another, at corresponding pixels. An operator may interact with user interface 216 to control the transparency or opaqueness of one or both of the images displayed on display 214. For example, the operator may interact with user interface 216 to adjust the acoustic image between being completely transparent and completely opaque and also adjust the visible light image between being completely transparent and completely opaque. Such an exemplary combined arrangement, which may be referred to as an alpha-blended arrangement, may allow an operator to adjust display 214 to display an acoustic-only image, a visible light-only image, of any overlapping combination of the two images between the extremes of an acoustic-only image and a visible light-only image. Processor 212 may also combine scene information with other data, such as alarm data or the like. In general, an alpha-blended combination of visible light and acoustic images can comprise anywhere from 100 percent acoustic and 0 percent visible light to 0 percent acoustic and 100 percent visible light. In some embodiments, the amount of blending can be adjusted by a user of the camera. Thus, in some embodiments, a blended image can be adjusted between 100 percent visible light and 100 percent acoustic.

Additionally, in some embodiments, the processor 212 can interpret and execute commands from user interface 216, and/or output/control device 218. Moreover, input signals may be used to alter the processing of the visible light and/or acoustic image data that occurs in the processor 212.

An operator may interact with acoustic analysis system 200 via user interface 216, which may include buttons, keys, or another mechanism for receiving input from a user. The operator may receive output from acoustic analysis system 200 via display 214. Display 214 may be configured to display an acoustic-image and/or a visible light image in any acceptable palette, or color scheme, and the palette may vary, e.g., in response to user control. In some embodiments, acoustic image data can be presented in a palette in order to represent varying magnitudes of acoustic data from different locations in the scene. For instance, in some examples, display 214 is configured to display an acoustic image in a monochromatic palette such as grayscale. In other examples, display 214 is configured to display an acoustic image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 212. For example, processor 212 may generate values (e.g., RGB values, grayscale values, or other display options) for each pixel to be displayed. Display 214 may receive such information and map each pixel into a visual display.

While processor 212 can control display 214 to concurrently display at least a portion of an acoustic image and at least a portion of a visible light image in any suitable arrangement, a picture-in-picture arrangement may help an operator to easily focus and/or interpret an acoustic image by displaying a corresponding visible image of the same scene in adjacent alignment.

A power supply (not shown) delivers operating power to the various components of acoustic analysis system 200. In various examples, power supply may include a rechargeable or non-rechargeable battery and a power generation circuit, AC power, an inductive power pick-up, a photovoltaic power source, or any other appropriate power supplying component. Combinations of power supplying components are also possible, such as a rechargeable battery and another component configured to provide power to operate the device and/or to charge the rechargeable battery.

During operation of acoustic analysis system 200, processor 212 controls acoustic sensor array 202 and visible light camera module 206 with the aid of instructions associated with program information that is stored in memory to generate a visible light image and an acoustic image of a target scene. Processor 212 further controls display 214 to display the visible light image and/or the acoustic image generated by acoustic analysis system 200.

As noted, in some situations, it can be difficult to identify and differentiate between real-world (visible) features of the target scene in an acoustic image. In addition to supplementing the acoustic image with visible light information, in some embodiments, it can be useful to emphasize visible edges within the target scene. In some embodiments, known edge detection methods can be performed on a visible light image of a target scene. Because of the corresponding relationship between the acoustic image and the visible light image, visible light pixels determined to represent a visible edge in the target scene correspond to acoustic pixels also representing the visible edge in the acoustic image. It will be appreciated that, as used herein, "edges" need not refer to the physical boundary of an object, but may refer to any sufficiently sharp gradient in the visible light image. Examples may include physical boundaries of an object, color changes within an object, shadows across a scene, and the like.

While generally described with respect to FIG. 2 as including a visible light camera module 206, in some examples, electromagnetic imaging tool 203 of acoustic analysis system 200 can additionally or alternatively include imaging tools capable of generating image data representative of a variety of spectrums. For instance, in various examples, electromagnetic imaging tool 203 can include one or more tools capable of generating infrared image data, visible light image data, ultraviolet image data, or any other useful wavelengths, or combinations thereof. In some embodiments, the acoustic imaging system can include an infrared camera module having an infrared lens assembly and an infrared sensor array. Additional components for interfacing with, for example, an infrared camera module can be included, such as those described in U.S. patent application Ser. No. 14/837,757, filed Aug. 27, 2015, and entitled "EDGE ENHANCEMENT FOR THERMAL-VISIBLE COMBINED IMAGES AND CAMERAS," which is assigned to the assignee of the instant application and is hereby incorporated by reference in its entirety.

In some examples, two or more data streams can be blended for display. For example, exemplary systems including a visible light camera module 206, an acoustic sensor array 202, and an infrared camera module (not shown in FIG. 2) can be configured to produce an output image comprising a blend of visible light (VL) image data, infrared (IR) image data, and acoustic (Acoustic) image data. In an exemplary blending scheme, the display image can be represented by: $\alpha \times IR + \beta \times VL + \gamma \times Acoustic$, wherein $\alpha + \beta + \gamma = 1$. In general, any number of data streams can be combined for display. In various embodiments, blending ratios such as $\alpha$, $\beta$, and $\gamma$ can be set by a user. Additionally or alternatively, set display programs can be configured to include different image data streams based on alarm conditions (e.g., one or more values in one or more data streams meets a predetermined threshold) or other conditions, for example, as described in U.S. Pat. No. 7,538,326, entitled "VISIBLE LIGHT AND IR COMBINED IMAGE CAMERA WITH A LASER POINTER," which is assigned to the assignee of the instant application, and is hereby incorporated by reference in its entirety.

One of more components in acoustic analysis system 200 described with respect to FIG. 2 can be included in a portable (e.g., handheld) acoustic analysis tool. For instance, in some embodiments, a portable acoustic analysis tool can include a housing 230 configured to house the components in the acoustic analysis tool. In some examples, one or more components of the system 200 can be located external to housing 230 of an acoustic analysis tool. For instance, in some embodiments, processor 212, display 214, user interface 216, and/or output control device 218 can be located external to a housing of an acoustic analysis tool and can communicate with various other system components, for example, via wireless communication (e.g., Bluetooth communication, Wi-Fi, etc.). Such components external to the acoustic analysis tool can be provided, for example, via an external device, such as a computer, smartphone, tablet, wearable device, or the like. Additionally or alternatively, other test and measurement or data acquisition tools configured to act as a master or slave device with respect to the acoustic analysis tool can similarly provide various components of an acoustic analysis system external to the acoustic analysis tool. External devices can communicate with a portable acoustic analysis tool via a wired and/or wireless connection, and can be used to perform various processing, display, and/or interface steps.

In some embodiments, such external devices can provide redundant functionality as components housed in a portable acoustic analysis tool. For example, in some embodiments, an acoustic analysis tool can include a display for displaying acoustic image data and can further be configured to communicate image data to an external device for storage and/or display. Similarly, in some embodiments, a user may interface with an acoustic analysis tool via an application (an "app") running on a smartphone, tablet, computer or the like, in order to perform one or more functions also capable of being performed with the acoustic analysis tool itself.

Figure 3A:
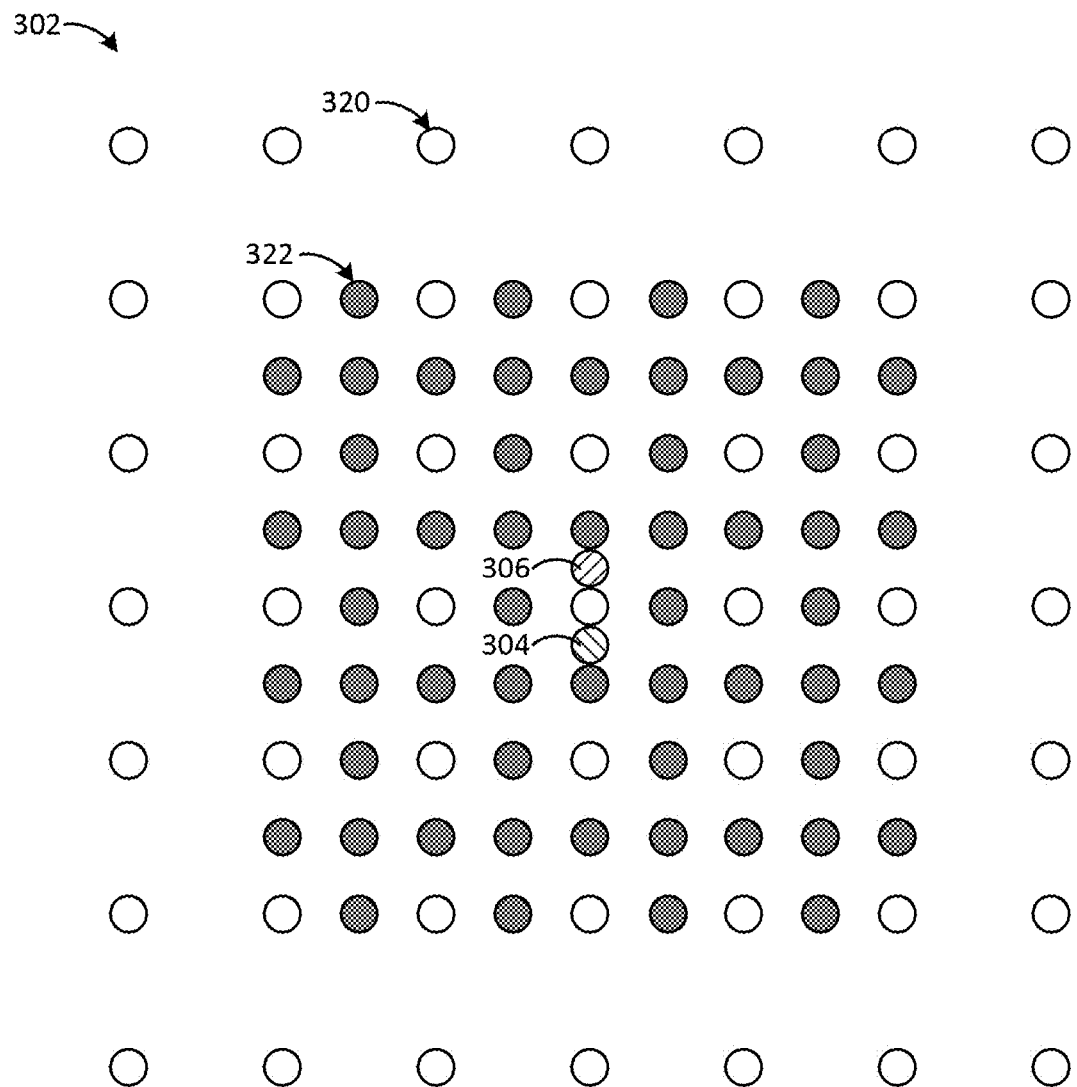
FIGS. 3A, 3B, and 3C show schematic diagrams of exemplary acoustic sensor array configurations within an acoustic analysis system.

FIG. 3A is a schematic diagram of an exemplary configuration of acoustic sensor array within an acoustic analysis system. In the illustrated example, the acoustic sensor array 302 includes a plurality of first acoustic sensors (shown in white) and a plurality of second acoustic sensors (shaded). The first acoustic sensors are arranged into a first array 320, and the second acoustic sensors are arranged into a second array 322. In some examples, the first array 320 and the second array 322 can be selectively used to receive acoustic signals for generating acoustic image data. For instance, in some configurations, the sensitivity of a particular acoustic sensor array to particular acoustic frequencies is a function of the distance between acoustic sensor elements.

In some configurations, more closely spaced together sensor elements (e.g., second array 322) are better able to resolve high frequency acoustic signals (for example, sounds having frequencies greater than 20 kHz, such as ultrasound signals between 20 kHz and 100 kHz) than further spaced sensor elements (e.g., first array 320). Similarly, further spaced sensor elements (e.g., first array 320) may be better suited for detecting lower frequency acoustic signals (e.g., <20 kHz) than more closely spaced sensor elements (e.g., second array 322). Various acoustic sensor arrays can be provided having sensor elements spaced apart from one another for detecting acoustic signals of various frequency ranges, such as infrasonic frequencies (<20 Hz), audible frequencies (between approximately 20 Hz and 20 kHz), ultrasound frequencies (between 20 kHz and 100 kHz). In some embodiments, partial arrays can be used (e.g., every other acoustic sensor element from array 320) for optimizing detection of particular frequency bands.

Additionally, in some examples, some acoustic sensor elements may be better suited for detecting acoustic signals having different frequency characteristics, such as low or high frequencies. Thus, in some embodiments, an array configured for detecting low frequency acoustic signals, such as the first array 320 having further spaced sensor elements, may include first acoustic sensor elements better suited for detecting low frequency acoustic signals. Similarly, an array configured for detecting higher frequency acoustic signals, such as second array 322, may include second acoustic sensor elements better suited for detecting high frequency acoustic signals. Thus, in some examples, the first array 320 and the second array 322 of acoustic sensor elements may include different types of acoustic sensor elements. Alternatively, in some embodiments, the first array 320 and the second array 322 can include the same type of acoustic sensor element.

Thus, in an exemplary embodiment, an acoustic sensor array 302 can include a plurality of acoustic sensor element arrays, such as the first array 320 and the second array 322. In some embodiments, arrays can be used individually or in combination. For instance, in some examples, a user may select to use the first array 320, use the second array 322, or use both the first array 320 and the second array 322 simultaneously for performing an acoustic imaging procedure. In some examples, a user may select which array(s) are to be used via the user interface. Additionally or alternatively, in some embodiments, the acoustic analysis system may automatically select the array(s) to use based on analysis of received acoustic signals or other input data, such as an expected frequency range, or the like. While the configuration shown in FIG. 3A generally includes two arrays (first array 320 and second array 322) generally arranged in rectangular lattices, it will be appreciated that a plurality of acoustic sensor elements can be grouped into any number of discrete arrays in any shape. Moreover, in some embodiments, one or more acoustic sensor elements can be included in multiple distinct arrays that can be selected for operation. As described elsewhere herein, in various embodiments, processes for back propagating acoustic signals to establish acoustic image data from the scene is performed based on the arrangement of acoustic sensor elements. Thus, the arrangement of acoustic sensors may be known or otherwise accessible by the processor in order to perform acoustic image generation techniques.

The acoustic analysis system of FIG. 3A further includes a distance measuring tool 304 and a camera module 306 positioned within the acoustic sensor array 302. Camera module 306 can represent a camera module of an electromagnetic imaging tool (e.g., 203), and can include a visible light camera module, an infrared camera module, an ultraviolet camera module, or the like. Additionally, while not shown in FIG. 3A, the acoustic analysis system can include one or more additional camera modules of the same type or of a different type than camera module 306. In the illustrated example, distance measuring tool 304 and camera module 306 are positioned within the lattice of acoustic sensor elements in the first array 320 and the second array 322. While shown as being disposed between lattice sites within the first array 320 and the second array 322, in some embodiments, one or more components (e.g., camera module 306 and/or a distance measuring tool 304 can be positioned at corresponding one or more lattice sites in the first array 320 and/or the second array 322. In some such embodiments, the component(s) can be positioned at the lattice site in lieu of an acoustic sensor element that would typically be in such a location according to the lattice arrangement.

Figure 3C:
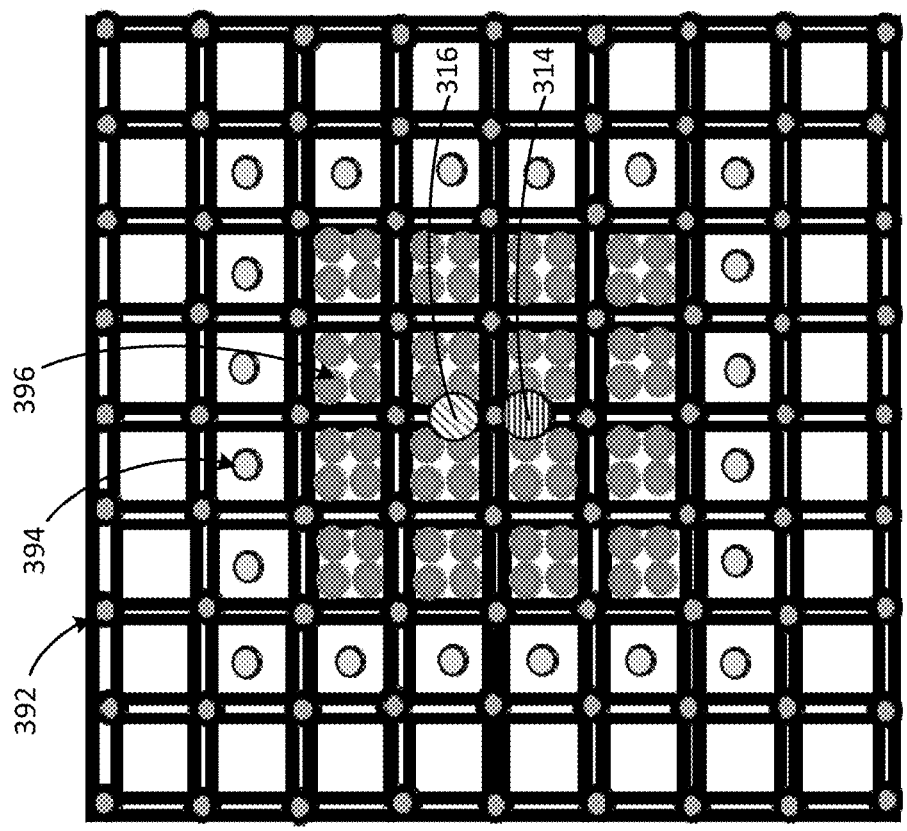
Figure 3B:
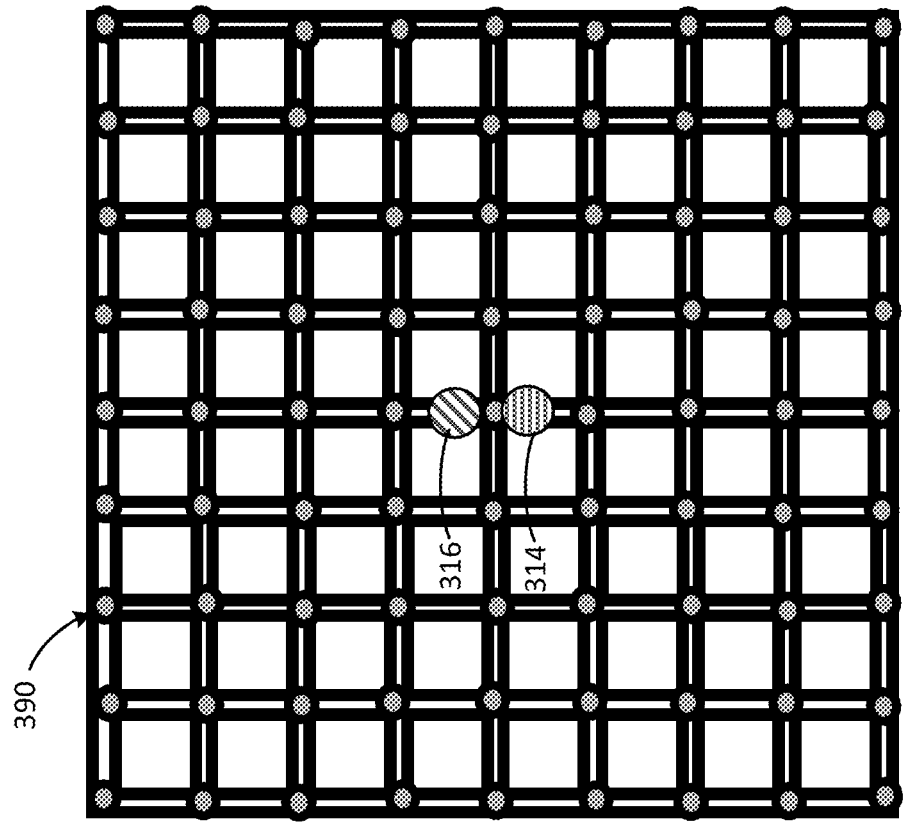

As described elsewhere herein, acoustic sensor arrays can include acoustic sensor elements arranged in any of a variety of configurations. FIGS. 3B and 3C are schematic diagrams illustrating exemplary acoustic sensor array configurations. FIG. 3B shows an acoustic sensor array 390 that includes a plurality of acoustic sensor elements spaced evenly apart in an approximately square lattice. Distance measuring tool 314 and camera array 316 are positioned within acoustic sensor array 390. In the illustrated example, the acoustic sensor elements in acoustic sensor array 390 are the same type of sensor, though in some embodiments, different types of acoustic sensor elements can be used in the array 390.

FIG. 3C shows a plurality of acoustic sensor arrays. Acoustic sensor arrays 392, 394, and 396 each include a plurality of acoustic sensor elements arranged in a different shaped array. In the example of FIG. 3C, acoustic sensor arrays 392, 394, and 396 can be used separately or together in any combination to create sensor arrays of various sizes. In the illustrated embodiment, the sensor elements of array 396 are spaced closer together than the sensor elements of array 392. In some examples, array 396 is designed for sensing high frequency acoustic data, while array 392 is designed for sensing lower frequency acoustic data.

In various embodiments, arrays 392, 394, and 396 can include the same or different types of acoustic sensor elements. For example, acoustic sensor array 392 can include sensor elements having a frequency operating range lower than that of sensor elements of acoustic sensor array 396.

As described elsewhere herein, in some examples, different acoustic sensor arrays (e.g., 392, 394, 396) can be selectively turned off and on during various modes of operation (e.g., different desired frequency spectrums to be imaged). Additionally or alternatively, various acoustic sensor elements (e.g., some or all of acoustic sensor elements in one or more sensor arrays) can be enabled or disabled according to a desired system operation. For example, in some acoustic imaging processes, while data from a large number of sensor elements (e.g., sensor elements arranged in a high density, such as in sensor array 396) marginally improves acoustic image data resolution, it is at the expense of required processing to extract acoustic image data from the data received at each sensor element. That is, in some examples, the increased processing demand (e.g., in cost, processing time, power consumption, etc.) necessary for processing a large number of input signal (e.g., from a large number of acoustic sensor elements) compares negatively to any additional signal resolution provided by the additional data streams. Thus, it may be worthwhile in some embodiments to disable or disregard data from one or more acoustic sensor elements depending on the desired acoustic imaging operation.

Similar to the systems of FIGS. 3A and 3B, the system of FIG. 3C includes distance measuring tool 314 and camera array 316 positioned within acoustic sensor arrays 392, 394, and 396. In some examples, additional components, such as additional camera arrays (e.g., used for imaging a different portion of the electromagnetic spectrum from camera array 316), may be similarly positioned within acoustic sensor arrays 392, 394, and 396. It will be appreciated that, while shown in FIGS. 3A-2C as being positioned within one or more acoustic sensor arrays, distance measuring tool and/or one or more imaging tools (e.g., visible light camera module, infrared camera module, ultraviolet sensor, etc.) can be located outside of the acoustic sensor array(s). In some such examples, the distance measuring tool and/or one or more imaging tools located outside of the acoustic sensor array(s) can be supported by an acoustic imaging tool, for example, by a housing that houses the acoustic sensor array(s), or can located externally to the housing of the acoustic imaging tool.

Figure 4A:
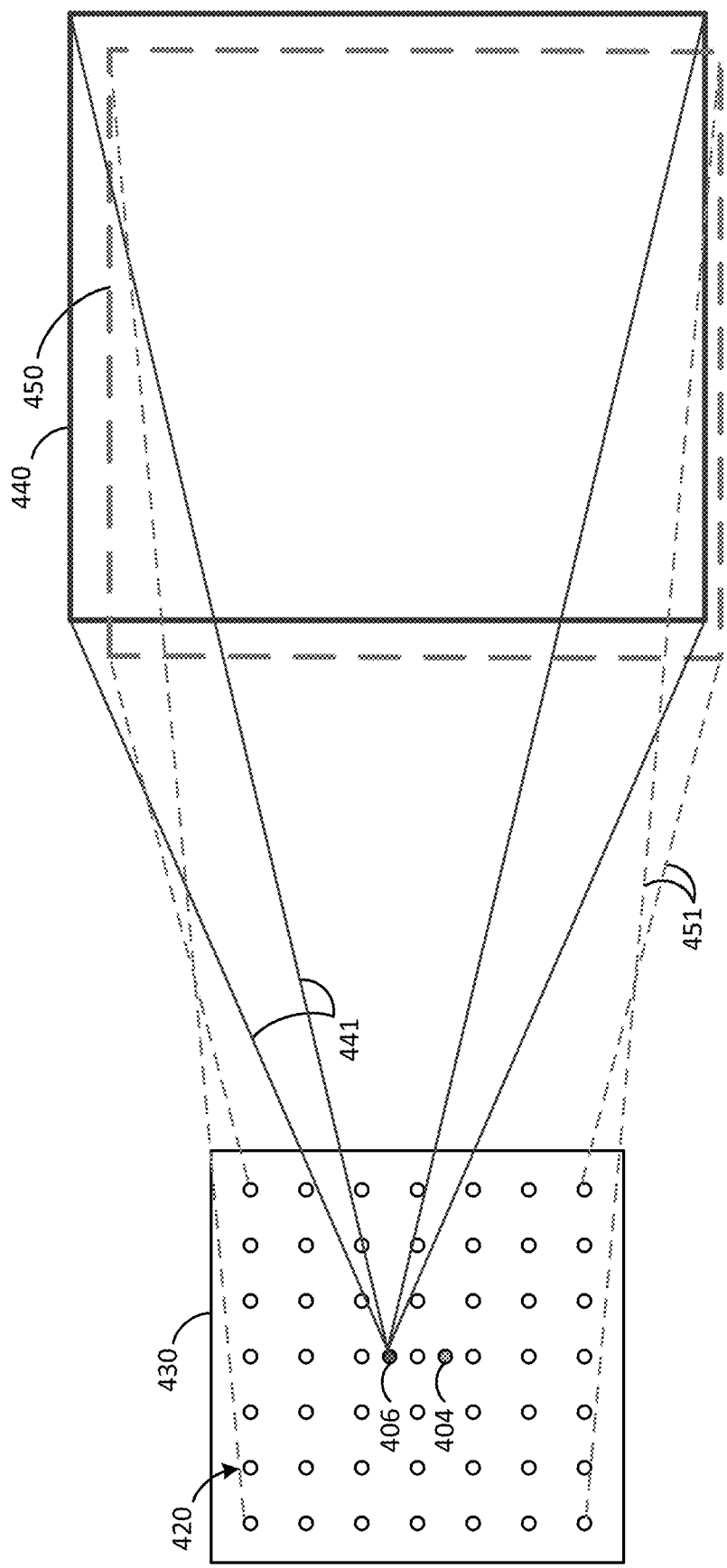
FIGS. 4A and 4B show schematic illustrations of parallax error in the generation of a frame of visible light image data and acoustic image data.

In some examples, general misalignment of an acoustic sensor array and an imaging tool, such as a camera module, can lead to misalignment in corresponding image data generated by the acoustic sensor array and the imaging tool. FIG. 4A shows a schematic illustration of parallax error in the generation of a frame of visible light image data and acoustic image data. In general, parallax error can be vertical, horizontal, or both. In the illustrated embodiment, an acoustic sensor array 420 and an imaging tool comprising a visible light camera module 406. Visible light image frame 440 is shown being captured according to the field of view 441 of the visible light camera module 406 while acoustic image frame 450 is shown as being captured according to the field of view 451 of the acoustic sensor array 420.

As shown, the visible light image frame 440 and the acoustic imaging frame 450 are not aligned with one another. In some embodiments, a processor (e.g., processor 212 of FIG. 2) is configured to manipulate one or both of the visible light image frame 440 and the acoustic image frame 450 in order to align visible light image data and acoustic image data. Such manipulation can include shifting one image frame relative to the other. The amount that the image frames are shifted relative to one another can be determined based on a variety of factors, including, for instance, the distance to the target from the visible light camera module 406 and/or the acoustic sensor array 420. Such distance data can be determined, for example, using distance measuring tool 404 or receiving a distance value via a user interface (e.g., 216).

Figure 4B:
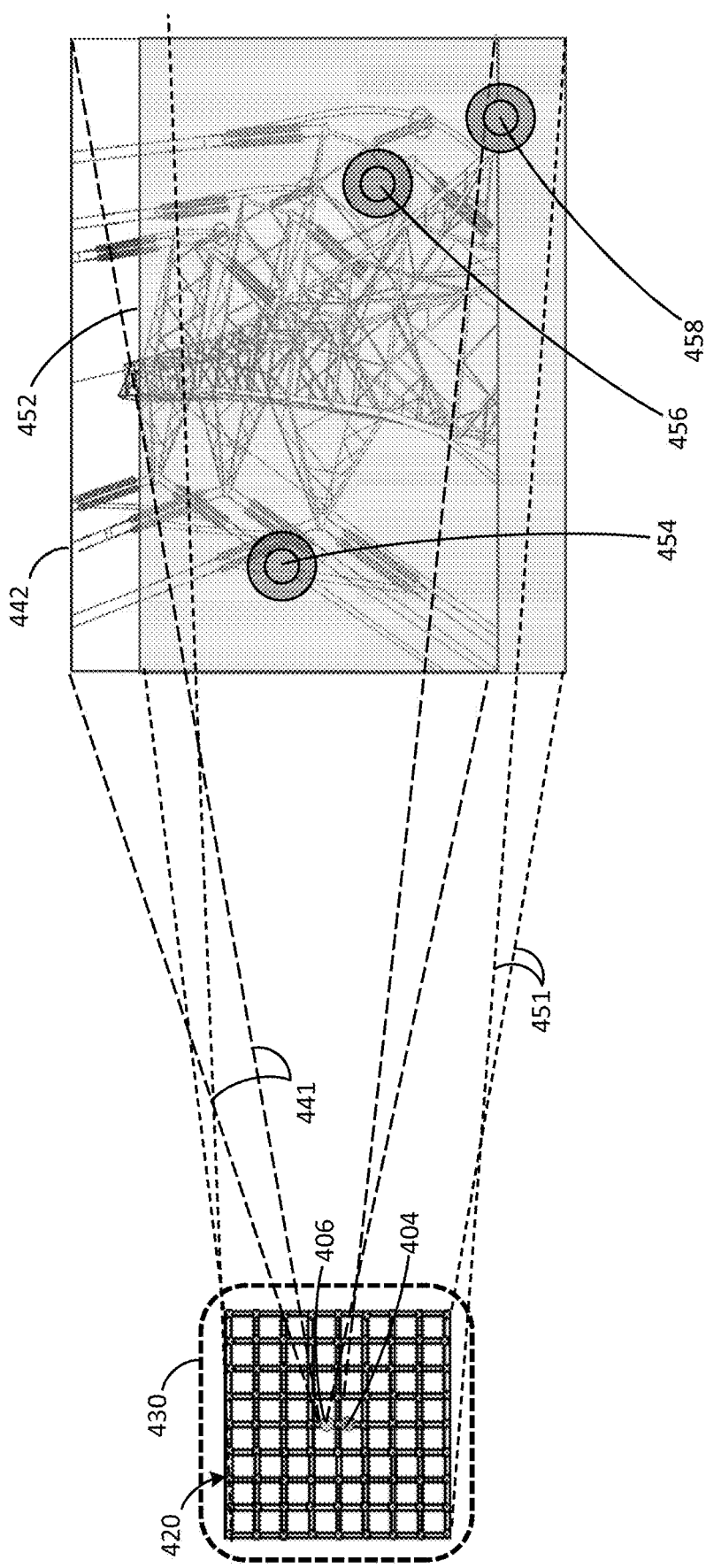

FIG. 4B is a schematic illustration similar to that in FIG. 4A, but including a visible light image of a scene. In the example of FIG. 4B, visible light image 442 shows a scene of a plurality of power lines and a supporting tower. The acoustic image 452 includes a plurality of locations 454, 456, 458 indicating high magnitude acoustic data coming from such locations. As shown, the visible light image 442 and the acoustic image 452 are both displayed simultaneously. However, observation of both images shows at least one acoustic image local maximum at location 458 that does not appear to coincide with any particular structure in the visible light image 442. Thus, one observing both images may conclude that there is misalignment (e.g., parallax error) between the acoustic image 452 and the visible light image 442.

Figure 5A:
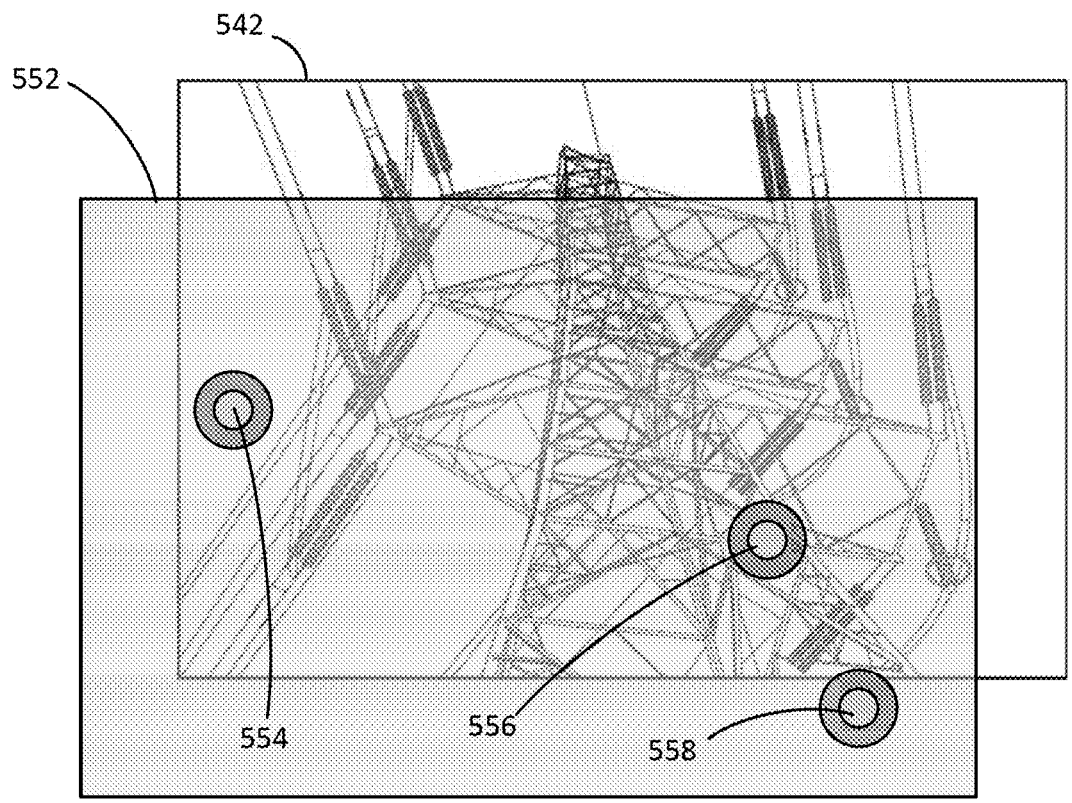
FIGS. 5A and 5B show parallax correction between a visible light image and an acoustic image.
Figure 5B:
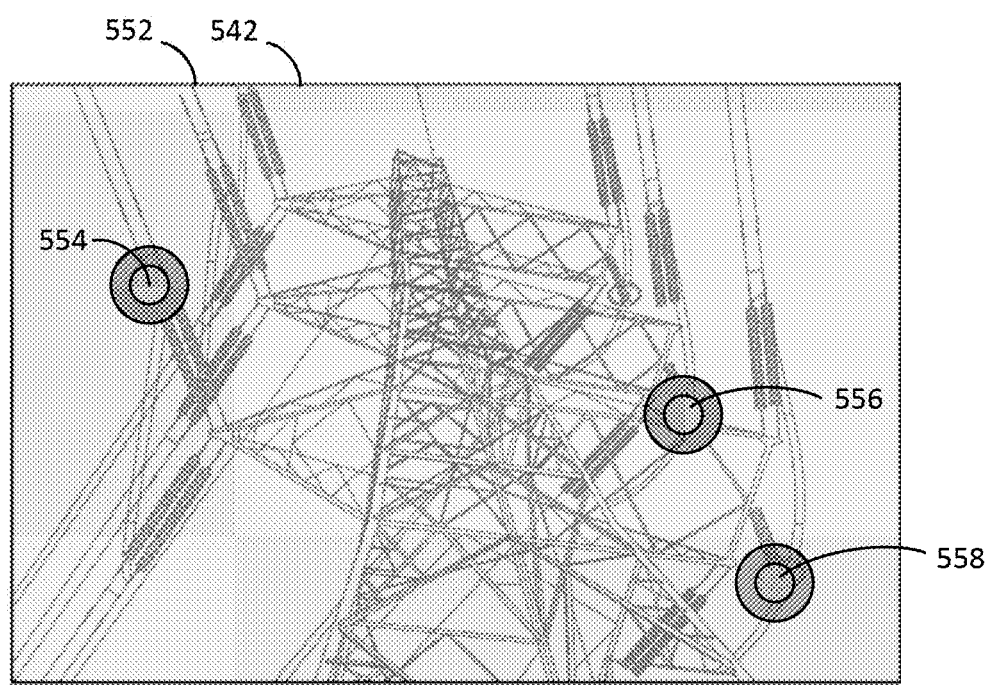

FIGS. 5A and 5B show parallax correction between a visible light image and an acoustic image. FIG. 5A, similar to FIG. 4B, shows a visible light image 542 and an acoustic image 552. The acoustic image 552 includes local maxima at locations 554, 556, and 558. As can be seen, maxima at locations 554 and 558 do not appear to coincide with any structure in the visible light image. In the example of FIG. 5B, the visible light image 542 and the acoustic image 552 are registered with respect to one another. The local maxima at locations 554, 556, and 558 in the acoustic image now appear to coincide with various locations within the visible light image 542.

During use, an operator may view the representation in FIG. 5B (e.g., via display 214) and determine approximate locations in the visible scene 542 that are likely sources of received acoustic signals. Such signals can be further processed in order to determine information regarding the acoustic signature of various components in the scene. In various embodiments, acoustic parameters such as frequency content, periodicity, amplitude, and the like can be analyzed with respect to various locations in the acoustic image. When overlaid onto visible light data so that such parameters can be associated with various system components, acoustic image data may be used to analyze various properties (e.g., performance characteristics) of objects in the visible light image.

Figure 5C:
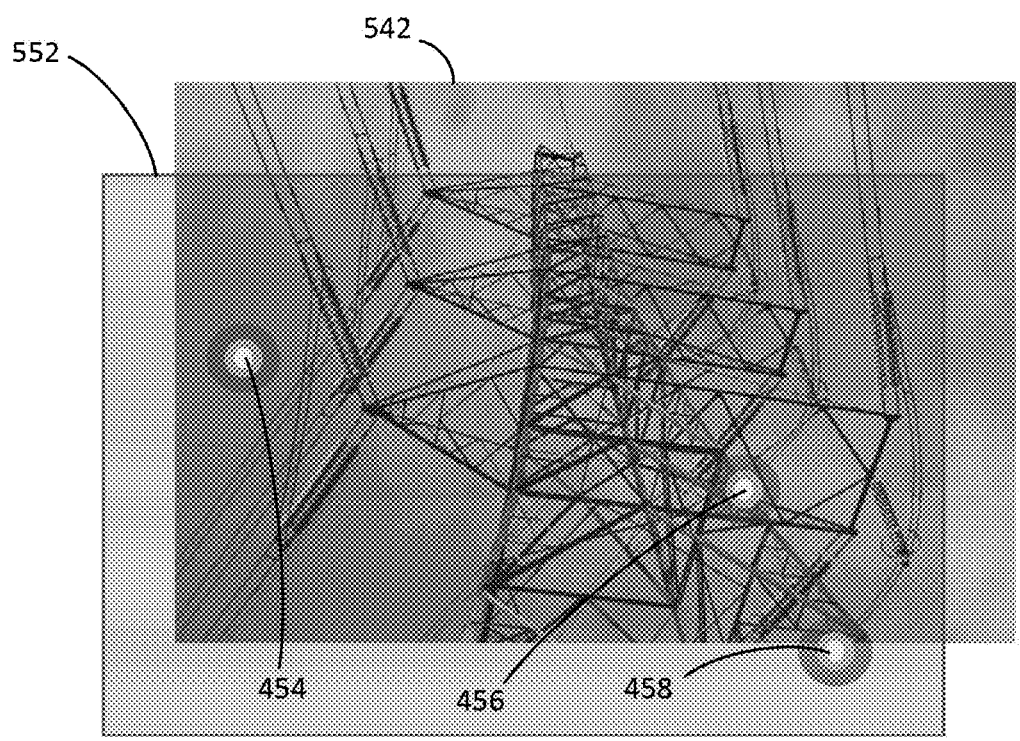
FIGS. 5C and 5D are colorized versions of FIGS. 5A and 5B.
Figure 5D:
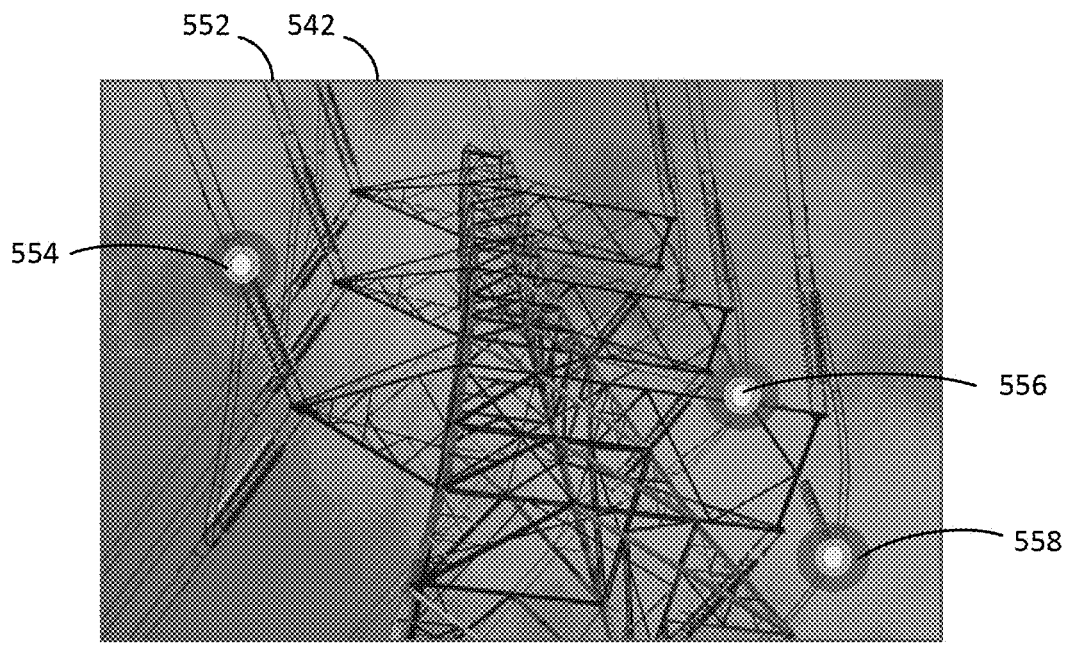

FIGS. 5C and 5D are colorized versions of FIGS. 5A and 5B. As shown in FIGS. 5A and 5B, and more easily seen in the colorized representation of FIGS. 5C and 5D, locations 554, 556, and 558 show a circular gradient in color. As described elsewhere herein, acoustic image data can be visually represented according to a palettization scheme in which each pixel of acoustic image data is colorized based on the acoustic intensity at a corresponding location. Thus, in the exemplary representations of FIGS. 5A-5D, the circular gradient of locations 554, 556, 558 generally represents a gradient in acoustic intensity in the imaging plane based on back-propagated received acoustic signals.

It will be appreciated that, while the exemplary illustrations in FIGS. 4A, 4B, 5A-5D are described with respect to acoustic image data and visible light image data, such processes can be similarly performed with a variety of electromagnetic image data. For example, as described elsewhere herein, in various embodiments, various such processes can be performed using combinations of acoustic image data and one or more of visible light image data, infrared image data, ultraviolet image data, or the like.

As described elsewhere herein, in some embodiments, the back-propagation of acoustic signals to form an acoustic image can be based on a distance to target value. That is, in some examples, the back-propagation calculations can be based on a distance, and can include determining a two-dimensional acoustic scene located at that distance from the acoustic sensor array. Given a two-dimensional imaging plane, spherical sound waves emanating from a source in the plane would generally appear circular in cross-section, with a radial decay in intensity as shown in FIGS. 5A-5B.

In some such examples, portions of an acoustic scene representing data not located at the distance-to-target used in the back-propagation calculation will result in errors in the acoustic image data, such as inaccuracies in the location of one or more sounds in the scene. Such errors can, when the acoustic image is displayed simultaneously (e.g., blended, combined, etc.) with other image data (e.g., electromagnetic image data, such as visible light, infrared, or ultraviolet image data), lead to parallax errors between the acoustic image data and other image data. Thus, in some embodiments, some techniques for correcting parallax error (e.g., as shown in FIGS. 5A and 5B) comprise adjusting a distance-to-target value used in the back-propagation calculation for generating acoustic image data.

In some cases, the system can be configured to perform a back-propagation process using a first distance-to-target value and display a display image such as shown in FIG. 5A in which the acoustic image data and another data stream may not be aligned. Subsequently, the acoustic analysis system can adjust the distance-to-target value used for back-propagation, perform the back-propagation again, and update the display image with the new acoustic image data. This process can repeat, with the acoustic analysis system cycling through a plurality of distance-to-target values while a user observes the resulting display images on a display. As the distance-to-target value changes, the user may observe a gradual transition from the display image shown in FIG. 5A to the display image shown in FIG. 5B. In some such cases, a user may visually observe when the acoustic image data appears properly registered with another data stream, such as electromagnetic image data. A user may signal to the acoustic analysis system that the acoustic image data appears properly registered, indicating to the system that the distance-to-target value used to perform the most recent back-propagation is approximately correct, and can save that distance value to memory as the correct distance-to-target. Similarly, a user may manually adjust a distance-to-target value as the display image is updated using new distance values in updated back-propagation processes until the user observes that the acoustic image data is properly registered. The user may choose to save the current distance to target in the acoustic analysis system as a current distance-to-target.

In some examples, correcting a parallax error can include adjusting the position of the acoustic image data relative to other image data (e.g., electromagnetic image data) by a predetermined amount and in a predetermined direction based on the distance-to-target data. In some embodiments, such adjustments are independent of the generation of the acoustic image data by back-propagating acoustic signals to the identified distance-to-target.

In some embodiments, in addition to being used to generate acoustic image data and reduce parallax error between the acoustic image data and other image data, a distance-to-target value can be used for other determinations. For instance, in some examples, a processor (e.g., 212) can use a distance to target value in order to focus or assist a user in focusing an image, such as an infrared image, as described in U.S. Pat. No. 7,538,326, which is incorporated by reference. As described therein, this can similarly be used to correct for parallax errors between visible light image data and infrared image data. Thus, in some examples, a distance value can be used to register acoustic image data with electromagnetic imaging data, such as infrared image data and visible light image data.

As described elsewhere herein, in some examples, a distance measuring tool (e.g., 204) is configured to provide distance information that can be used by the processor (e.g., 212) for generating and registering acoustic image data. In some embodiments, the distance measuring tool comprises a laser distance meter configured to emit light onto the target scene at a location to which the distance is measured. In some such examples, the laser distance meter can emit light in the visible spectrum so that the user may view the laser spot in the physical scene to ensure that the distance meter is measuring a distance to a desired portion of the scene. Additionally or alternatively, the laser distance meter is configured to emit light in a spectrum to which one or more imaging components (e.g., camera modules) is sensitive. Thus, a user viewing the target scene via the analysis tool (e.g., via display 214) may observe the laser spot in the scene to ensure that the laser is measuring the distance to the correct location in the target scene. In some examples, the processor (e.g., 212) can be configured to generate a reference mark in a displayed image representative of the location that the laser spot would be located in the acoustic scene based on a current distance value (e.g., based on a known distance-based parallax relationship between the laser distance meter and the acoustic sensor array). The reference mark location can be compared to a location of the actual laser mark (e.g., graphically on a display and/or physically in the target scene) and the scene can be adjusted until the reference mark and the laser coincide. Such processes can be performed similar to the infrared registration and focusing techniques described in U.S. Pat. No. 7,538,326, which is incorporated by reference.

Figure 6:
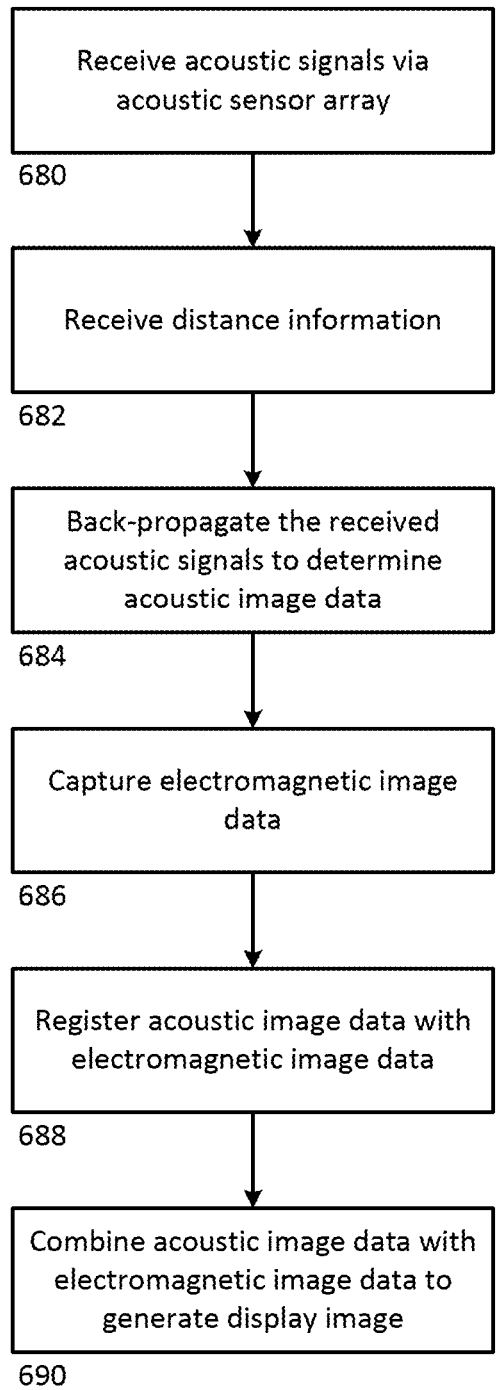
FIG. 6 is a process flow diagram showing an exemplary method for generating a final image combining acoustic image data and electromagnetic image data.

FIG. 6 is a process flow diagram showing an exemplary method for generating a final image combining acoustic image data and electromagnetic image data. The method includes the steps of receiving acoustic signals via an acoustic sensor array (680) and receiving distance information (682). Distance information can be received, for example, via a distance measuring device and/or a user interface, such as via manual entry or as the result of a distance adjustment process by which the distance is determined based on an observed registration.

The method further includes back-propagating the received acoustic signals to determine acoustic image data representative of the acoustic scene (684). As described elsewhere herein, back-propagating can be include analyzing a plurality of acoustic signals received at a plurality of sensor elements in an acoustic sensor array in combination with the received distance information to determine a source pattern of the received acoustic signals.

The method of FIG. 6 further includes the step of capturing electromagnetic image data (686), and registering the acoustic image data with the electromagnetic image data (688). In some embodiments, registering the acoustic image data with the electromagnetic image data is done as part of the back-propagation step for generating the acoustic image data (684). In other examples, registering the acoustic image data with the electromagnetic image data is done separately from the generation of the acoustic image data.

The method of FIG. 6 includes the step of combining acoustic image data with electromagnetic image data in order to generate a display image (690). As described elsewhere herein, combining electromagnetic image data and acoustic image data can comprise alpha blending the electromagnetic image data and the acoustic image data. Combining the image data can include overlaying one image data set onto the other, such as in a picture-in-picture mode or in locations in which certain conditions (e.g., alarm conditions) are satisfied. The display image can be presented to a user, for example, via a display that is supported by a housing that supports the acoustic sensor array and/or via a display separate from the sensor array, such as the display of an external device (e.g., a smartphone, tablet, computer, etc.).

Additionally or alternatively, the display image can be saved in a local (e.g., on-board) memory and/or a remote memory for future viewing. In some embodiments, the saved display image can include metadata that allows for future adjustment of the display image properties, such as blending ratios, back-propagation distance, or other parameters used to generate the image. In some examples, raw acoustic signal data and/or electromagnetic image data can be saved with the display image for subsequent processing or analysis.

While shown as a method for generating a final image combining acoustic image data and electromagnetic image data, it will be appreciated that the method of FIG. 6 could be used to combine acoustic image data with one or more sets of image data spanning any portion of the electromagnetic spectrum, such as visible light image data, infrared image data, ultraviolet image data, and the like. In some such examples, multiple sets of image data, such as visible light image data and infrared image data, can be both combined with acoustic image data to generate a display image via methods similar to that described with respect to FIG. 6.

In some examples, receiving acoustic signals via a sensor array (680) can include a step of selecting an acoustic sensor array with which to receive acoustic signals. As described, for example, with respect to FIGS. 3A-C, acoustic analysis systems can include a plurality of acoustic sensor arrays that can be suited for analyzing acoustic signals of varying frequencies. Additionally or alternatively, in some examples, different acoustic sensor arrays can be useful for analyzing acoustic signals propagating from different distances. In some embodiments, different arrays can be nested inside one another. Additionally or alternatively, partial arrays can be selectively used to receive acoustic image signals.

For example, FIG. 3A shows first array 320 and a second array 322 nested within the first array. In an exemplary embodiment, the first array 320 can include a sensor array configured (e.g., spaced) for receiving acoustic signals and generating acoustic image data for frequencies in a first frequency range. Second array 322 can include, for example, a second sensor array configured to be used alone or in combination with all or part of the first array 320 for generating acoustic image data for frequencies in a second frequency range.

Similarly, FIG. 3C shows a first array 392, a second array 394 at least partially nested within the first array 392, and a third array 396 at least partially nested within the first array 392 and the second array 394. In some embodiments, the first array 392 can be configured for receiving acoustic signals and generating acoustic image data for frequencies in a first frequency range. The second array 394 can be used with all or part of the first array 392 for receiving acoustic signals and generating acoustic image data for frequencies in a second frequency range. The third array 396 can be used alone, with all or part of the second array 394, and/or with all or part of the first array 392 for receiving acoustic signals and generating acoustic image data for frequencies in a third frequency range.

In some embodiments, in a nested array configuration, acoustic sensor elements from one array may be positioned between the acoustic sensor elements, such as elements of third array 396 being generally between elements of first array 392. In some such examples, the acoustic sensor elements in a nested array (e.g., third array 396) may be positioned in the same plane as, in front of, or behind the acoustic sensor elements in the array into which it is nested (e.g., first array 392).

In various implementations, arrays used for sensing higher frequency acoustic signals generally require less distance between individual sensors. Thus, with respect to FIG. 3C, for instance, third array 396 may be better suited for performing acoustic imaging processes involving high frequency acoustic signals. Other sensor arrays (e.g., first array 392) may be sufficient for performing acoustic imaging processes involving lower frequency signals, and may be used in order to reduce the computational demand of processing signals from a smaller number of acoustic sensor elements when compared to array 396. Thus, in some examples, high-frequency sensor arrays may be nested within low-frequency sensor arrays. As described elsewhere herein, such arrays may generally be operated individually (e.g., via switching between active arrays) or together.

In addition or alternatively to selecting an appropriate sensor array based on an expected/desired frequency spectrum for analysis, in some examples, different sensor arrays may be better suited for performing acoustic imaging processes at difference distances to the target scene. For example, in some embodiments, if the distance between an acoustic sensor array and a target scene is small, outer sensor elements in the acoustic sensor array may receive significantly less useful acoustic information from the target scene than sensor elements more centrally located.

On the other hand, if the distance between an acoustic sensor array and a target scene is large, closely spaced acoustic sensor elements may not provide separately useful information. That is, if first and second acoustic sensor elements are close together, and the target scene is generally far away, the second acoustic sensor element may not provide any information that is meaningfully different from the first. Thus, data streams from such first and second sensor elements may be redundant and unnecessarily consume processing time and resources for analysis.

In addition to impacting which sensor arrays may be best suited for performing acoustic imaging, as described elsewhere herein, the distance to target may also be used in performing the back-propagating for determining acoustic image data from received acoustic signals. However, in addition to being an input value into a back-propagation algorithm, the distance-to-target may be used to select an appropriate back-propagation algorithm to use. For instance, in some examples, at far distances, spherically-propagating sound waves may be approximated as being substantially planar compared to the size of an acoustic sensor array. Thus, in some embodiments, when the distance-to-target is large, back-propagation of received acoustic signals can include an acoustic beamforming calculation. However, when closer to the source of the sound waves, a planar approximation of the sound wave may not be appropriate. Thus, different back-propagation algorithms may be used, such as near-field acoustic holography.

Figure 7:
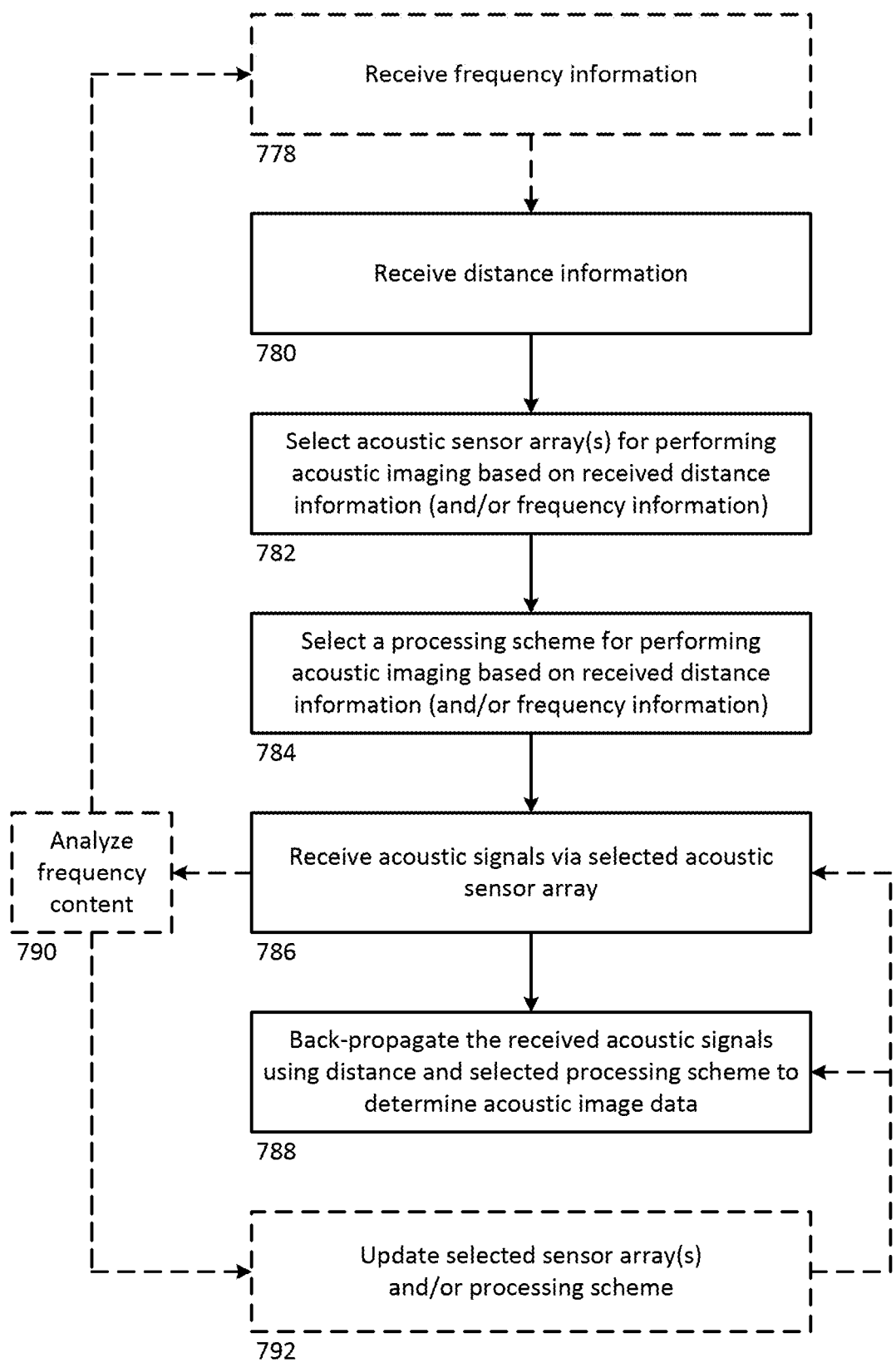
FIG. 7 is a process-flow diagram showing an exemplary process for generating acoustic image data from received acoustic signals.

As described, a distance-to-target metric can be used in a variety of ways in an acoustic imaging process, such as determining active sensor array(s), determining a back-propagation algorithm, performing the back-propagation algorithm, and/or registering a resulting acoustic image with electromagnetic image data (e.g., visible light, infrared, etc.). FIG. 7 is a process-flow diagram showing an exemplary process for generating acoustic image data from received acoustic signals.

The process of FIG. 7 includes receiving distance information (780), for example, from a distance measuring device or entered distance information, such as via a user interface. The method further includes the step of selecting one or more acoustic sensor array(s) for performing acoustic imaging based on the received distance information (782). As described, in various examples, selected array(s) can include a single array, a combination of multiple arrays, or portions of one or more arrays.

The method of FIG. 7 further includes the step of selecting a processing scheme for performing acoustic imaging based on the received distance information (784). In some examples, selecting a processing scheme can include selecting a back-propagation algorithm for generating acoustic image data from acoustic signals.

After selecting an acoustic sensor array (782) and processing scheme (784) for performing acoustic imaging, the method includes the steps of receiving acoustic signals via the selected acoustic sensor array (786). The received acoustic signals are then back-propagated using the distance and the selected processing scheme to determine acoustic image data (788).

In various embodiments, steps of FIG. 7 can be performed by a user, an acoustic analysis system (e.g., via processor 212), or a combination thereof. For example, in some embodiments, a processor can be configured to receive distance information (780) via a distance measuring tool and/or a user input. In some examples, a user can input a value to override a measured distance to use as the distance information, for instance, if the distance to an object is known and/or is difficult to analyze via the distance measuring tool (e.g., small object size and/or large distance to target, etc.). The processor can be further configured to automatically select an appropriate acoustic sensor array for performing acoustic imaging based on the received distance information, for example, using a lookup table or other database. In some embodiments, selecting an acoustic sensor array comprises enabling and/or disabling one or more acoustic sensor elements in order to achieve a desired acoustic sensor array.

Similarly, in some examples, the processor can be configured to automatically select a processing scheme (e.g., back-propagation algorithm) for performing acoustic imaging based on the received distance information. In some such examples, this can include selecting one from a plurality of known processing schemes stored in memory. 1 Additionally or alternatively, selecting a processing scheme may amount to adjusting portions of a single algorithm to arrive at a desired processing scheme. For example, in some embodiments, a single back-propagation algorithm may include a plurality of terms and variable (e.g., based on distance information). In some such examples, selecting a processing scheme (784) can include defining one or more values in the single algorithm, such as adjusting coefficients for one or more terms (e.g., setting various coefficients to zero or one, etc.).

Thus, in some embodiments, an acoustic imaging system can automate several steps of an acoustic imaging process by suggesting and/or automatically implementing a selected acoustic sensor array and/or a processing scheme (e.g., a back-propagation algorithm) based on received distance data. This can speed up, improve, and simplify acoustic imaging processes, eliminating the requirements of an acoustic imaging expert to carry out an acoustic imaging process. Thus, in various examples, the acoustic imaging system can automatically implement such parameters, notify the user that such parameters are about to implemented, ask a user for permission to implement such parameters, suggest such parameters for manual input by a user, or the like.

Automatic selection and/or suggestion of such parameters (e.g., processing scheme, sensor array) can be useful to optimize localization of the acoustic image data with respect to other forms of image data, processing speed, and analysis of the acoustic image data. For instance, as described elsewhere herein, accurate back-propagation determination (e.g., using a proper algorithm and/or an accurate distance metric) can reduce parallax errors between acoustic image data and other (e.g., electromagnetic, such as visible light, infrared, etc.) image data. Additionally, utilizing proper algorithms and/or sensor arrays such as may be automatically selected or suggested by an acoustic analysis system can optimize the accuracy of the thermal image data, allowing for analysis of the received acoustic data.

Figure 8:
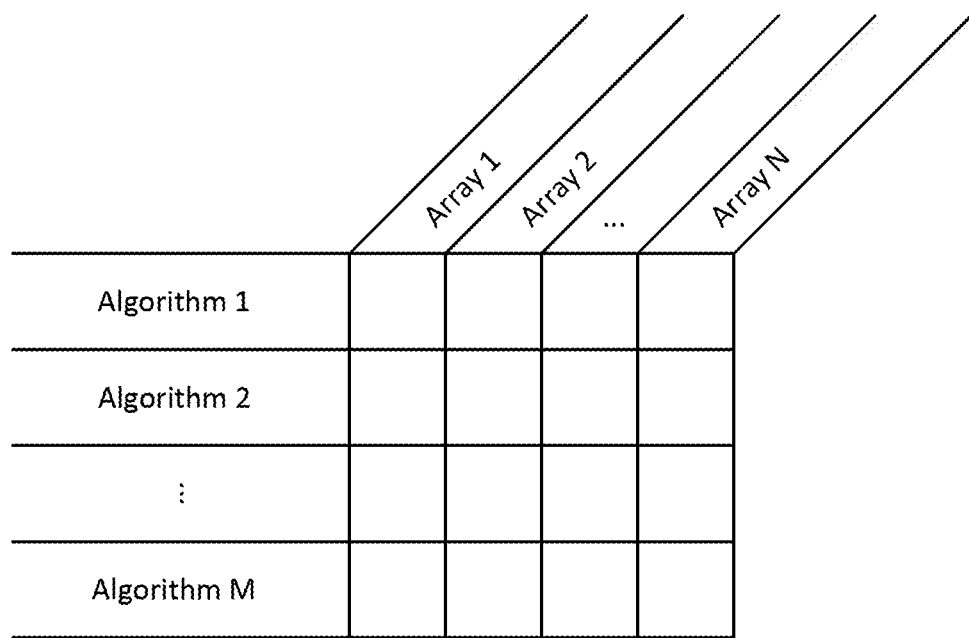
FIG. 8 shows an exemplary lookup table for determining an appropriate algorithm and sensor array for use during an acoustic imaging process.

As described, in some examples, an acoustic analysis system can be configured to automatically select an algorithm and/or a sensor array for performing acoustic imaging processes based on received distance information. In some such embodiments, a system includes a lookup table, for example, stored in memory, for determining which of a plurality of back-propagation algorithms and acoustic sensor arrays to use for determining acoustic image data. FIG. 8 shows an exemplary lookup table for determining an appropriate algorithm and sensor array for use during an acoustic imaging process.

In the illustrated example, the lookup table of FIG. 8 includes N columns, each representing different arrays: Array 1, Array 2, . . . , Array N. In various examples, each array comprises a unique set of acoustic sensor elements arranged. Different arrays may comprise sensor elements arranged into a lattice (e.g., array 392 and array 396 in FIG. 3C). Arrays within the lookup table can also include combinations of sensor elements from one or more such lattices. In general, in some embodiments, each of arrays Array 1, Array 2, . . . , Array N corresponds to a unique combination of acoustic sensor elements. Some of such combinations can include an entire set of sensor elements arranged in a particular lattice, or can include a subset of sensor elements arranged in a particular lattice. Any of a variety of combinations of acoustic sensor elements are possible options for use as a sensor array in the lookup table.

The lookup table of FIG. 8 further includes M rows, each representing a different algorithm: Algorithm 1, Algorithm 2, . . . , Algorithm M. In some examples, different algorithms may include different processes for performing back-propagation analysis of received acoustic signals. As described elsewhere herein, in some examples, some different algorithms can be similar to one another while having different coefficients and/or terms for modifying the back-propagation results.

The exemplary lookup table of FIG. 8 includes M×N entries. In some embodiments, the acoustic analysis system utilizing such a lookup table is configured to analyze received distance information and classify the distance information into one of M×N bins, wherein each bin corresponds to an entry in the lookup table of FIG. 8. In such examples, when the acoustic analysis system receives distance information, the system can find the entry (i, j) in the lookup table corresponding to the bin in which the distance information lies, and determine the appropriate algorithm and sensor array for use during an acoustic imaging process. For example, if the received distance information corresponds to the bin associated with entry (i, j), the acoustic analysis system can automatically utilize or suggest using Algorithm i and Array j for an acoustic imaging process.

In various such examples, distance information bins can correspond to uniformly sized distance ranges, for example, a first bin corresponding to distances of within one foot, a second bin corresponding to distances between one and two feet, and so on. In other examples, bins need not correspond to uniformly sized distance spans. Additionally, in some embodiments, fewer than M×N bins can be used. For example, in some embodiments, there may be an algorithm (e.g., Algorithm x) that is not ever used with a particular array (e.g., Array y). Thus, in such an example, there would be no corresponding distance information bin corresponding to entry (x, y) in the M×N lookup table.

In some embodiments, statistical analysis on the populated distance bins can be used for identifying a most common distance or distance range within the target scene. In some such embodiments, the distance bin having the highest number of corresponding locations (e.g., a highest number of locations with acoustic signals) can be used as distance information in the process of FIG. 7. That is, in some embodiments, a utilized acoustic sensor array and/or processing scheme may be implemented and/or recommended based on statistical analysis of the distance distribution of various objects in the target scene. This can increase the likelihood that sensor array and/or processing scheme used for acoustic imaging of a scene is appropriate for the largest number of locations within the acoustic scene.

Additionally or alternatively, parameters other than distance information can be used to select appropriate sensor arrays and/or processing schemes to use in generating acoustic image data. As described elsewhere herein, various sensor arrays can be configured to be sensitive to certain frequencies and/or frequency bands. In some examples, different back-propagation calculations similar can be used according to different acoustic signal frequency content. Thus, in some examples, one or more parameters can be used to determine a processing scheme and/or acoustic sensor array.

In some embodiments, the acoustic analysis system can be used to initially analyze various parameters of received acoustic signals processing/analysis. With reference back to FIG. 7, a method for generating acoustic image data can include a step of, after receiving acoustic signals (786), analyzing frequency content of the received signals (790). In some such examples, if the acoustic sensor array(s) and/or processing schemes have been selected (e.g., via steps 782 and/or 784, respectively), the method can include the steps of updating the selected array(s) and/or updating the selected processing scheme (792), for example, based on the analyzed frequency content.

After updating the sensor array(s) and/or processing scheme, the method can perform various actions using the updated parameters. For example, if the selected sensor array(s) is updated (792) based on analyzed frequency content (790), then new acoustic signals can be received from the (newly) selected acoustic sensor array (786), which can then be back-propagated to determine acoustic image data (788). Alternatively, if the processing scheme is updated at 792, already-captured acoustic signals can be back-propagated according to the updated processing scheme to determine updated acoustic image data. If both the processing scheme and the sensor array(s) are updated, new acoustic signals can be received using the updated sensor array and can be back-propagated according to the updated processing scheme.

In some embodiments, an acoustic analysis system can receive frequency information (778) without analyzing frequency content of received acoustic signals (790). For instance, in some examples, an acoustic analysis system can receive information regarding a desired or expected frequency range for future acoustic analysis. In some such examples, the desired or expected frequency information can be used to select one or more sensor arrays and/or a processing scheme that best fits the frequency information. In some such examples, the step(s) of selecting acoustic sensor array(s) (782) and/or selecting a processing scheme (784) can be based on received frequency information in addition or alternatively to received distance information.

In some examples, received acoustic signals (e.g., received via the acoustic sensor elements) can be analyzed, for example, via a processor (e.g., 210) of an acoustic analysis system. Such analysis can be used to determine one or more properties of the acoustic signals, such as frequency, intensity, periodicity, apparent proximity (e.g., a distance estimated based on received acoustic signals), measured proximity, or any combinations thereof. In some examples, acoustic image data can be filtered, for instance, to only show acoustic image data representing acoustic signals having a particular frequency content, periodicity, or the like. In some examples, any number of such filters can be applied simultaneously.

As described elsewhere herein, in some embodiments, a series of frames of acoustic image data can be captured over time, similar to acoustic video data. Additionally or alternatively, even if acoustic image data is not repeatedly generated, in some examples, acoustic signals are repeatedly sampled and analyzed. Thus, with or without repeated acoustic image data generation (e.g., video), parameters of acoustic data, such as frequency, can be monitored over time.

Figure 9A:
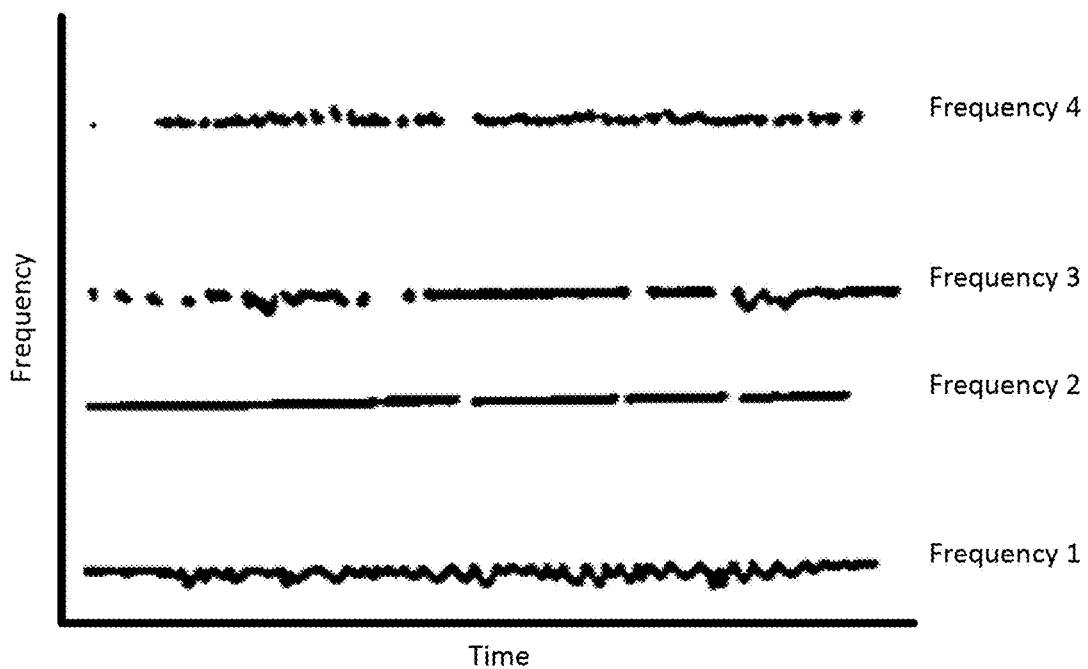
FIG. 9A is an exemplary plot of frequency content of received image data over time in an acoustic scene.

FIG. 9A is an exemplary plot of frequency content of received image data over time in an acoustic scene. As shown, the acoustic scene represented by the plot of FIG. 9A generally includes four sustained frequencies over time, labeled as Frequency 1, Frequency 2, Frequency 3, and Frequency 4. Frequency data, such as the frequency content of a target scene, can be determined via processing received acoustic signals, for example, using a Fast Fourier Transform (FFT) or other known method of frequency analysis.

Figure 9B:
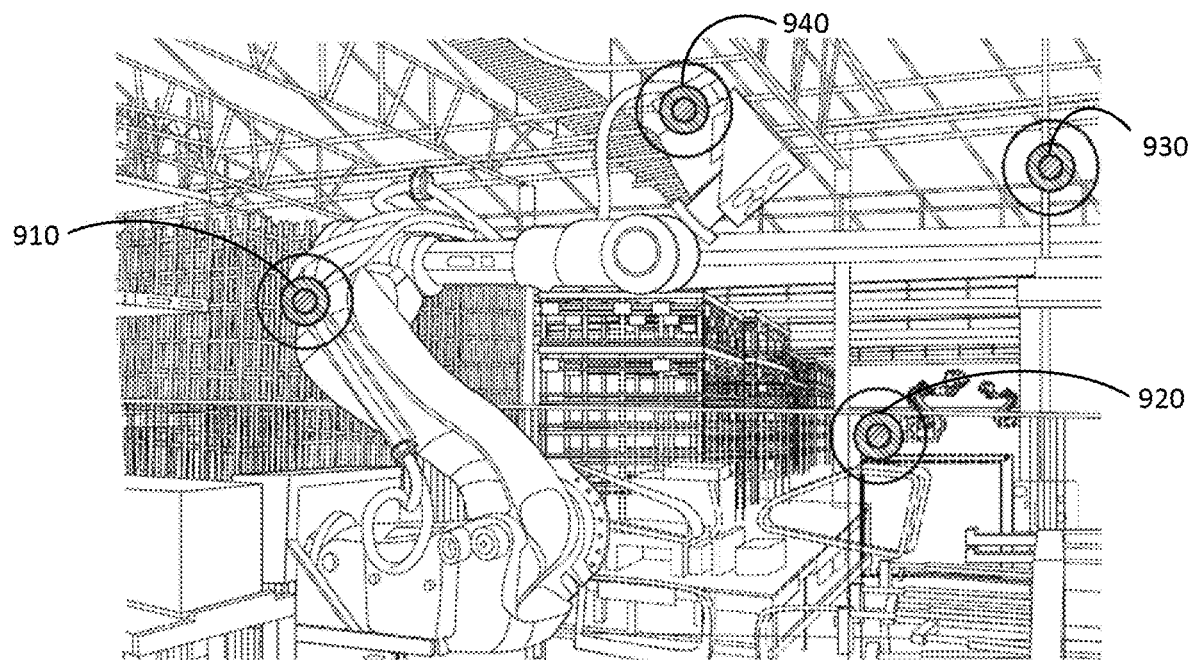
FIG. 9B shows an exemplary scene including a plurality of locations emitting acoustic signals.

FIG. 9B shows an exemplary scene including a plurality of locations emitting acoustic signals. In the illustrated image, acoustic image data is combined with visible light image data, and shows acoustic signals present at locations 910, 920, 930, and 940. In some embodiments, acoustic analysis system is configured to display acoustic image data of any detected frequency range. For instance, in an exemplary embodiment, location 910 includes acoustic image data including Frequency 1, location 920 includes acoustic image data including Frequency 2, location 930 includes acoustic image data including Frequency 3, and location 940 includes acoustic image data including Frequency 4.

In some such examples, displaying acoustic image data representative frequency ranges is a selectable mode of operation. Similarly, in some embodiments, acoustic analysis system is configures to display acoustic image data representative of frequencies only within a predetermined frequency band. In some such examples, displaying acoustic image data representing a predetermined frequency range comprises selecting one or more acoustic sensor arrays for receiving acoustic signals from which to generate acoustic image data. Such arrays can be configured to receive a selective frequency range. Similarly, in some examples, one or more filters can be employed to limit the frequency content used to generate the acoustic image data. Additionally or alternatively, in some embodiments, acoustic image data comprising information representative of a broad range of frequencies can be analyzed and shown on the display only if the acoustic image data satisfies a predetermined condition (e.g., falls within a predetermined frequency range).

Figure 9C:
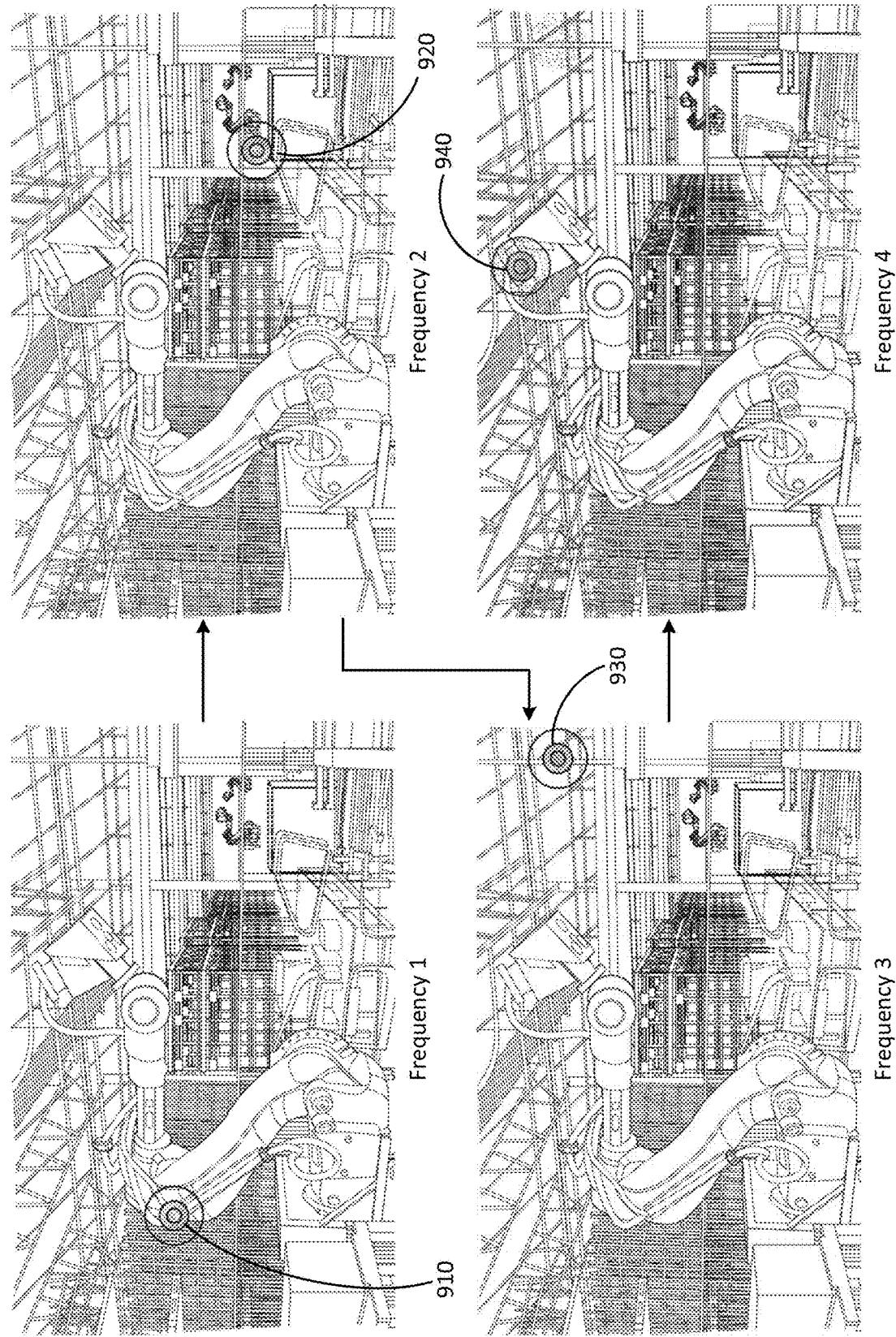
FIG. 9C shows a plurality of combined acoustic and visible light image data at a plurality of predefined frequency ranges.

FIG. 9C shows a plurality of combined acoustic and visible light image data at a plurality of predefined frequency ranges. A first image includes acoustic image data at a first location 910 that includes frequency content of Frequency 1. A second image includes acoustic image data at a second location 920 that includes frequency content of Frequency 2. A third image includes acoustic image data at a third location 930 that includes frequency content of Frequency 3. A fourth image includes acoustic image data at a fourth location 940 that includes frequency content of Frequency 4.

In an exemplary embodiment, a user may select various frequency ranges, such as ranges including Frequency 1, Frequency 2, Frequency 3, or Frequency 4, for filtering acoustic image data representative of frequency content other than the selected frequency range. Thus, in such examples, any of the first, second, third, or fourth images may be displayed as a result of a desired frequency range being selected by a user.

Additionally or alternatively, in some examples, an acoustic analysis system may cycle between a plurality of display images, each having different frequency content. For instance, with respect to FIG. 9C, in an exemplary embodiment, an acoustic analysis system may display, in a sequence, the first, second, third, and fourth images, such as shown by the arrows in FIG. 9C.

In some examples, display images can includes a text or other display representative of the frequency content being displayed in the image so that a user may observe which locations in the image include acoustic image data representative of certain frequency content. For example, with respect to FIG. 9C, each image may show a textual representation of the frequency represented in the acoustic image data. With respect to FIG. 9B, an image showing a plurality of frequency ranges may include indications of the frequency content at each location including acoustic image data. In some such examples, a user may select a location in the image, for example, via a user interface, for which to view the frequency content present at that location it the acoustic scene. For example, a user may select first location 910, and the acoustic analysis system may present the frequency content of the first location (e.g., Frequency 1). Thus, in various examples, a user can use the acoustic analysis system in order to analyze the frequency content of an acoustic scene, such as by viewing where in the scene corresponds to certain frequency content and/or by viewing what frequency content is present at various locations.

During exemplary acoustic imaging operation, filtering acoustic image data by frequency can help reduce image clutter, for example, from background or other unimportant sounds. In an exemplary acoustic imaging procedure, a user may wish to eliminate background sounds, such as floor noise in an industrial setting. In some such instances, background noise can include mostly low frequency noise. Thus, a user may choose to show acoustic image data representative of acoustic signals greater than a predetermined frequency (e.g., 10 kHz). In another example, a user may wish to analyze a particular object that generally emits acoustic signals within a certain range, such as corona discharge from a transmission line (e.g., as shown in FIGS. 5A-D5). In such an example, a user may select a particular frequency range (e.g., between 11 kHz and 14 kHz for corona discharge) for acoustic imaging.

In some examples, an acoustic analysis system can be used to analyze and/or present information associated with the intensity of received acoustic signals. For example, in some embodiments, back-propagating received acoustic signals can include determining an acoustic intensity value at a plurality of locations in the acoustic scene. In some examples, similar to frequency described above, acoustic image data is only included in a display image if the intensity of the acoustic signals meets one or more predetermined requirements.

In various such embodiments, a display image can include acoustic image data representative of acoustic signals above a predetermined threshold (e.g., 15 dB), acoustic signals below a predetermined threshold (e.g., 100 dB), or acoustic signals within a predetermined intensity range (e.g., between 15 dB and 40 dB). In some embodiments, a threshold value can be based on a statistical analysis of the acoustic scene, such as above or below a standard deviation from the mean acoustic intensity.

Similar to as described above with respect to frequency information, in some embodiments, restricting acoustic image data to represent acoustic signals satisfying one or more intensity requirements can include filtering received acoustic signals so that only received signals that satisfy the predetermined conditions are used to generate acoustic image data. In other examples, acoustic image data is filtered to adjust which acoustic image data is displayed.

Additionally or alternatively, in some embodiments, acoustic intensity at locations within an acoustic scene can be monitored over time (e.g., in conjunction with a video acoustic image representation or via background analysis without necessarily updating a display image). In some such examples, predetermined requirements for displaying acoustic image data can include an amount or rate of change in acoustic intensity at a location in an image.

Figure 10A:
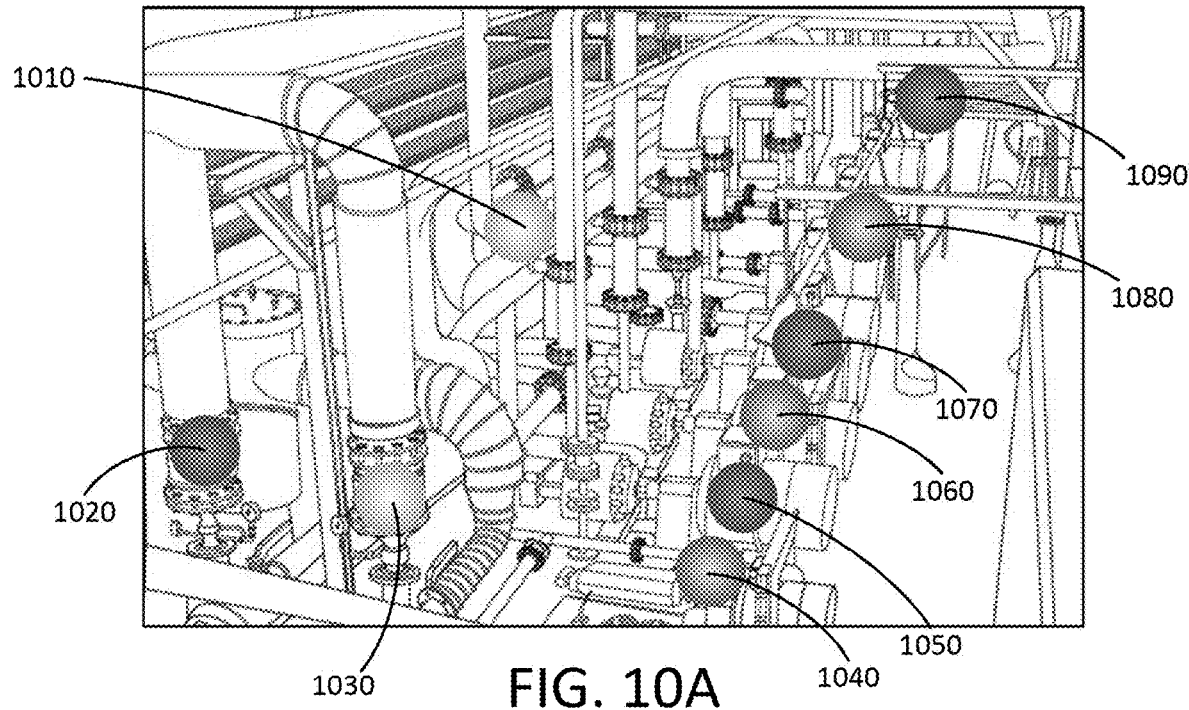
FIGS. 10A and 10B are exemplary display images including combined visible light image data and acoustic image data.
Figure 10B:
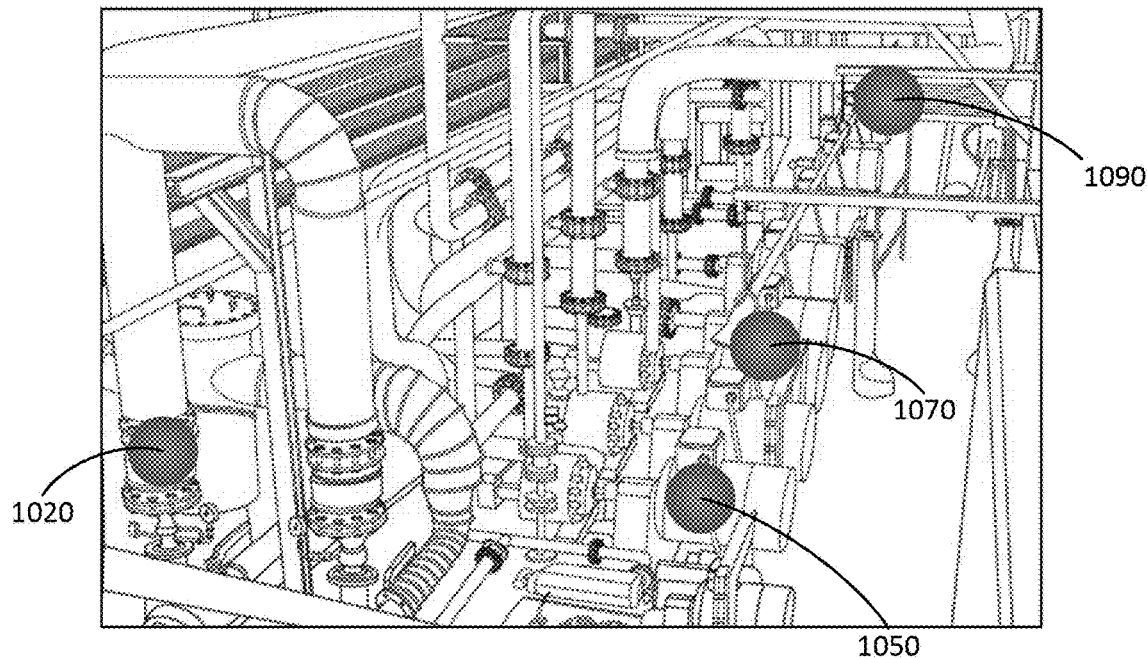

FIGS. 10A and 10B are exemplary display images including combined visible light image data and acoustic image data. FIG. 10A shows a display image including acoustic image data shown at a plurality of locations 1010, 1020, 1030, 1040, 1050, 1060, 1070, 1080, and 1090. In some examples, intensity values can be palettized, for example, wherein an acoustic intensity value is assigned a color based on a predetermined palettization scheme. In an exemplary embodiment, intensity values can be categorized according to intensity ranges (e.g., 10 dB-20 dB, 20 dB-30 dB, etc.). Each intensity range can be associated with a particular color according to a palettization scheme. Acoustic image data can include a plurality of pixels, wherein each pixel is colorized in the color associated with the intensity range into which the intensity represented by the pixel of acoustic image data falls. In addition or alternatively to being differentiated by color, different intensities can be distinguished according to other properties, such as transparency (e.g., in an image overlay in which acoustic image data is overlaid onto other image data) or the like.

Additional parameters may also be palettized, such as a rate of change of acoustic intensity. Similar to intensity, varying rates of change in acoustic intensity can be palettized such that portions of the scenes exhibiting different rates and/or amounts of acoustic intensity change are displayed in different colors.

In the illustrated example, the acoustic image data is palettized according to an intensity palette, such that acoustic image data representative of different acoustic signal intensities are shown in a different color and/or shade. For instance, acoustic image data at locations 1010 and 1030 show a palletized representation of a first intensity, locations 1040, 1060, and 1080 show a palletized representation of a second intensity, and locations 1020, 1050, 1070, and 1090 show a palletized representation of a third intensity. As shown in the exemplary representation in FIG. 10A, each location showing a palettized representation of acoustic image data shows circular pattern having a color gradient extending outward from the center. This can be due to the decay of acoustic intensity as the signals propagate from a source of the acoustic signals.

In the example of FIG. 10A, acoustic image data is combined with visible light image data to generate a display image, which may be presented to a user, for example, via a display. A user may view the display image of FIG. 10A in order to view which locations in a visible scene are producing acoustic signals, and the intensities of such signals. Thus, a user may quickly and easily observe which locations are producing sounds and compare the intensities of the sounds coming from various locations in the scene.

Similar to as described with respect to frequencies elsewhere herein, in some embodiments, acoustic image data may be presented only if the corresponding acoustic signals meet a predetermined intensity condition. FIG. 10B shows an exemplary display image similar to the display image of FIG. 10A and including visible light image data and acoustic image representing acoustic signals above a predetermined threshold. As shown, of locations 1010, 1020, 1030, 1040, 1050, 1060, 1070, 1080, and 1090 in FIG. 10A that include acoustic image data, only locations 1020, 1050, 1070, and 1090 include acoustic image data representing acoustic signals that meet a predetermined condition.

In an exemplary scenario, FIG. 10A can include all acoustic image data above a noise floor threshold at each of locations 1010-990, while FIG. 10B shows the same scene as FIG. 10A, but only showing acoustic image data having an intensity greater than 40 dB. This can help a user identify which sources of sound in an environment (e.g., in the target scene of FIGS. 10A and 10B) are contributing certain sounds (e.g., the loudest sounds in a scene).

In addition or alternatively to being compared directly to an intensity threshold (e.g., 40 dB), as described elsewhere herein, in some such examples, predetermined requirements for displaying acoustic image data can include an amount or rate of change in acoustic intensity at a location in an image. In some such examples, acoustic image data may be presented only if a rate of change or an amount of change in acoustic intensity at a given location satisfies a predetermined condition (e.g., is greater than a threshold, less than a threshold, within a predetermined range, etc.). In some embodiments, amount or rate of change of acoustic intensity can be palettized and displayed as or in conjunction with intensity acoustic image data. For instance, in an exemplary embodiment, when a rate of change is used as a threshold to determine in which locations to include acoustic image data, the acoustic image data can include a palettized intensity rate of change metric for display.

In some examples, a user may manually set an intensity requirement (e.g., minimum value, maximum value, range, rate of change, amount of change, etc.) for the acoustic image data to be displayed. As discussed elsewhere herein, including acoustic image data that only meets the intensity requirement can be achieved during acoustic image data generation (e.g., via filtering received acoustic signals) and/or can be performed by not displaying generated acoustic image data representing acoustic signals that do not meet the set requirement(s). In some such examples, filtering a display image according to intensity values can be performed after the acoustic image data and visible light image data have been captured and stored in memory. That is, data stored in memory can be used to generate display images including any number of filtering parameters, such as only showing acoustic image data meeting predefined intensity conditions and the like.

In some examples, setting a lower bound for intensity in an acoustic image (e.g., only displaying acoustic image data representative of acoustic signals above a predetermined intensity) can eliminate the inclusion of undesired background or ambient sounds and/or sound reflections from the acoustic image data. In other instances, setting an upper bound for intensity in an acoustic image (e.g., only displaying acoustic image data representative of acoustic signals below a predetermined intensity) can eliminate the inclusion of expected loud sounds in acoustic image data in order to observe acoustic signals ordinarily masked by such loud sounds.

Several display functions are possible. For example, similar to the frequency analysis/display discussed with respect to FIG. 9C, in some examples, the acoustic analysis system can cycle through a plurality of display images, each showing acoustic image data satisfying different intensity requirements. Similarly, in some examples, a user may scroll through a series of acoustic intensity ranges in order to view the locations in the acoustic image data having acoustic intensity in the given range.

Figure 11A:
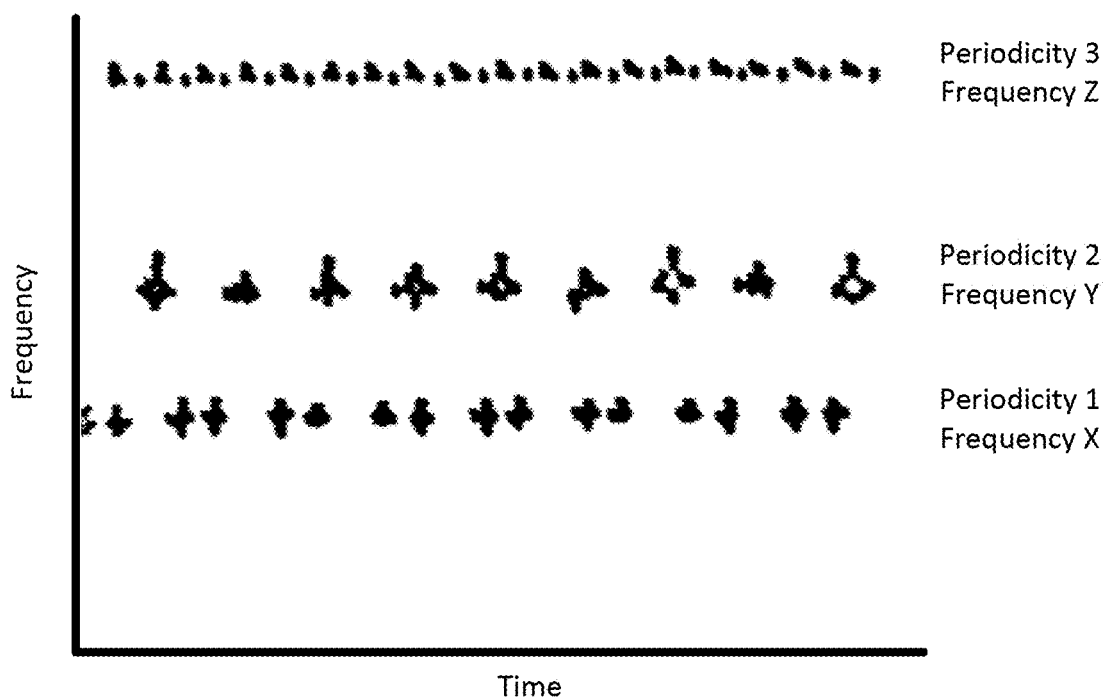
FIGS. 11A and 11B show exemplary plots of frequency vs. time of acoustic data in an acoustic scene.
Figure 11B:
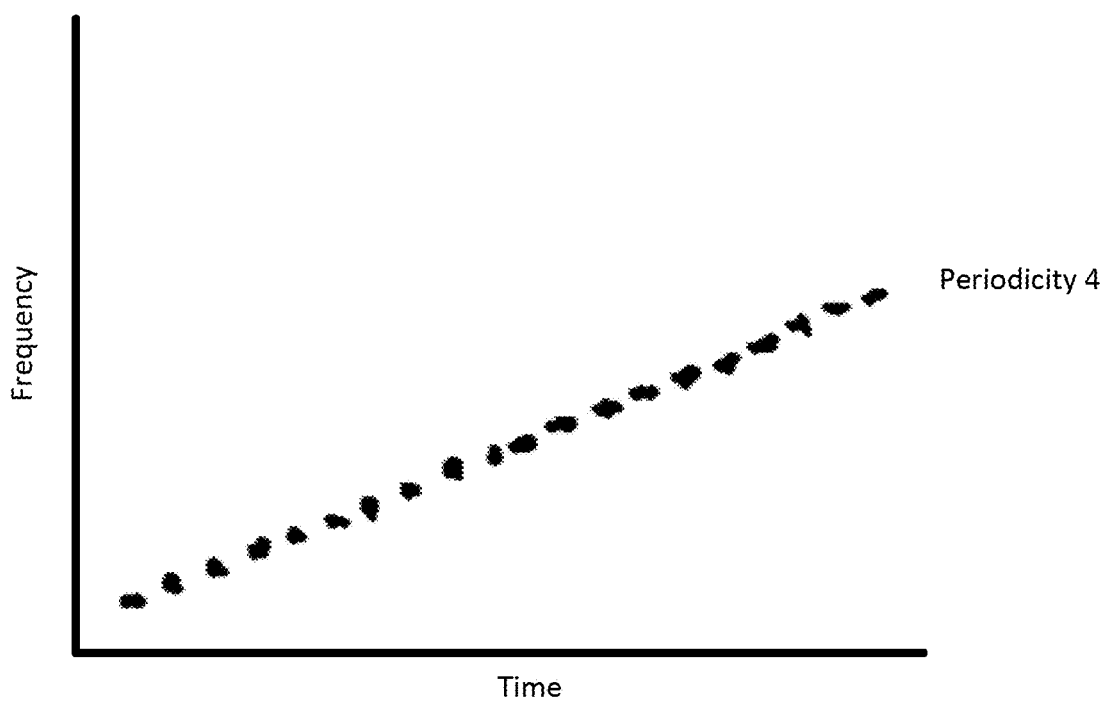

Another parameter that can be used to analyze acoustic data is a periodicity value of an acoustic signal. FIGS. 11A and 11B show exemplary plots of frequency vs. time of acoustic data in an acoustic scene. As shown in the plot of FIG. 11A, the acoustic data includes signals at a frequency X having a first periodicity, signals at a frequency Y having a second periodicity, and signals at a frequency Z having a third periodicity. In the illustrated example, acoustic signals having different frequencies may also include different periodicity in the acoustic signals.

In some such examples, acoustic signals can be filtered based on periodicity in addition or alternatively to frequency content. For instance, in some examples, multiple sources of acoustic signals in an acoustic scene may produce acoustic signals at a particular frequency. If a user wishes to isolate one such sound source for acoustic imaging, the user may choose to include or exclude acoustic image data from a final display image based on the periodicity associated with the acoustic data.

FIG. 11B shows a plot of frequency vs. time of an acoustic signal. As shown, the frequency increases over time approximately linearly. However, as shown, the signal includes an approximately constant periodicity over time. Thus, such a signal may or may not appear in an acoustic image depending on selected display parameters. For instance, the signal may at some points in time satisfy a frequency criteria for being displayed, but at other points in time, be outside of a displayed frequency range. However, a user could choose to include or exclude such a signal from acoustic image data based on the periodicity of the signals regardless of the frequency content.

In some examples, extracting acoustic signals of a particular periodicity can be helpful in analyzing a particular portion of a target scene (e.g., a particular piece of equipment or type of equipment that typically operates at a certain periodicity). For example, if an object of interest operates at a certain periodicity (e.g., once per second), excluding signals having periodicity distinct from this can improve acoustic analysis of the object of interest. For example, with reference to FIG. 11B, if an object of interest operates at periodicity 4, isolating signals having periodicity 4 for analysis may yield improved analytics of the object of interest. For example, the object of interest may emit sounds having periodicity 4, but increasing frequency, such as shown in FIG. 11B. This can imply that the properties of the object may be changing (e.g., increased torque or load, etc.) and should be inspected.

In an exemplary acoustic imaging process, background noises (e.g., floor noise in an industrial setting, wind in an outdoor environment, etc.) are generally not periodic while certain objects of interest within a scene emit period acoustic signals (e.g., machinery operating at a regular interval). Thus, a user may choose to exclude non-periodic acoustic signals from an acoustic image in order to remove background signals and more clearly present acoustic data of interest. In other examples, a user may be looking to find the source of a constant tone, and so may choose to exclude period signals from acoustic image data that may obscure viewing of a constant tone. In general, a user may choose to include in acoustic image data acoustic signals that are above a certain periodicity, below a certain periodicity, or within a desired range of periodicities. In various examples, periodicity can be identified by either a length of time between periodic signals or a frequency of occurrence of periodic signals. Similar to frequency as shown in FIG. 11B, an analysis of intensity at a given periodicity (e.g., due to an object of interest operating at that periodicity) can similar be used to track how acoustic signals from the object change over time. In general, in some embodiments, periodicity can be used to perform rate-of-change analysis for a variety of parameters, such as frequency, intensity, and the like.

As describe elsewhere herein, in some examples, various portions of a target scene can be associated with different distances from an acoustic imaging sensor. For example, in some embodiments, distance information can include three-dimensional depth information regarding various portions in a scene. Additionally or alternatively, a user may be able to measure (e.g., with a laser distance tool) or manually input distance values associated with a plurality of locations in a scene. In some examples, such different distance values for various portions of the scene can be used to adjust the back-propagation calculations at such locations to accommodate the specific distance value at that location.

Additionally or alternatively, if different portions of the scene are associated with different distance values, then proximity from the acoustic sensor array (e.g., measured proximity and/or apparent proximity) can be another differentiable parameter between such portions. For example, with respect to FIG. 10B, locations 1020, 1050, 1070, and 1090 are each associated with a different distance value. In some examples, similar to frequency or periodicity discussed elsewhere herein, a user can select a particular distance range from which to include acoustic image data on a display. For example, a user may select to only display acoustic image data representative of acoustic signals closer than a predetermined distance, further than a predetermined distance, or within a predetermined range of distances.

In addition, in some embodiments, similar to as described with respect to frequencies in FIG. 9C, an acoustic analysis system can be configured to cycle through a plurality of distance ranges, only showing acoustic image data representing acoustic signals emitted from a location in the target scene meeting a current distance range. Such cycling through various displays can help a user visually distinguish information between different acoustic signals. For example, in some cases, objects may appear to be close together from the line of sight from an associated electromagnetic imaging tool (e.g., a visible light camera module), and thus acoustic image data combined with electromagnetic image data of such objects may be difficult to distinguish. However, if the objects are separated by a depth difference, cycling through different depth ranges of acoustic image data can be used to isolate each source of acoustic data from the other.

In general, an acoustic analysis system can be configured to apply various settings in order to include and/or exclude acoustic image data representative of acoustic signals that meet one or more predefined parameters. In some examples, acoustic analysis system can be used to select a plurality of conditions which must be met by acoustic signals in order for acoustic image data representative of such signals is displayed, for example, in a display image.

For instance, with respect to FIGS. 10A and 10B, only acoustic signals above a threshold intensity in the scene of FIG. 10A are shown in FIG. 10B. However, additional or alternative restriction is possible. For example, in some embodiments, a user may additionally filter the acoustic image data so that acoustic image data is only shown for acoustic signals having frequency content within a predetermined frequency range and/or having a predetermined periodicity. In an exemplary embodiment, restricting to predetermined frequencies and/or periodicities of interest, acoustic image data may be eliminated from additional locations, such as 1020 and 1090.

In general, a user can apply any number of acoustic data requirements for including or excluding acoustic image data from a display image, including parameters such as intensity, frequency, periodicity, apparent proximity, measured proximity, sound pressure, particle velocity, particle displacement, sound power, sound energy, sound energy density, sound exposure, pitch, amplitude, brilliance, harmonics, rates of change of any such parameters, or the like. Additionally, in some embodiments, user may combine requirements using any appropriate logical combinations, such as AND, OR, XOR, etc. For instance, a user may wish to display only acoustic signals having (intensity above a predetermined threshold) AND (frequency within a predetermined range).

Additionally or alternatively, the acoustic analysis system can be configured to cycle through one or more parameter ranges to illustrate different portions of the target scene, such as shown with respect to cycling through a plurality of frequencies in FIG. 9C. In general, one or more parameters can be cycled through in such a manner. For instance, a parameter (e.g., intensity) can be separated into a plurality of ranges (e.g., 10 dB-20 dB and 20 dB-30 dB), and the acoustic analysis system can cycle through such ranges, displaying all acoustic image data falling within a first range, then all acoustic image data falling within a second range, and so on.

Similarly, in some embodiments, an acoustic analysis system can be configured to combine parameter requirements by cycling through nested ranges. For instance, in an exemplary embodiment, acoustic image data that satisfies a first intensity range AND a first frequency range can be displayed. The displayed frequency range can be cycled through while limiting the displayed acoustic image data to acoustic signals satisfying the first intensity range. After cycling through the frequency ranges, the intensity range can be updated to a second intensity range, such that the displayed acoustic image data satisfies the second intensity range and the first frequency range. Similar to the process incorporating the first intensity range, the frequency ranges can be similarly cycled through while maintaining the second intensity range. This process can be continued until all combinations of frequency ranges and intensity ranges have been satisfied. Similar such processes can be performed for any of a plurality of parameters.

Additionally or alternatively, in some embodiments, an acoustic analysis system can be configured to identify and distinguish a plurality of sounds in the acoustic scene. For instance, with respect to FIG. 9B, the acoustic analysis system can be configured to identify four discrete sounds at locations 910, 920, 930, and 940. The system can be configured to cycle through a plurality of displays, each showing acoustic image data at a single discrete location, similar to as shown in FIG. 9C, though not necessarily dependent on any parameter values. Similarly, such cycling between acoustic image data at individual locations can be performed after one or more parameter requirements limit the acoustic image data that is displayed.

For example, with respect to FIGS. 10A and 10B, before an intensity threshold is applied, an acoustic analysis system may cycle through a plurality of acoustic image scenes (e.g., as display images including the acoustic image scenes with visible light image data), wherein each scene includes acoustic image data at a single location. In some embodiments, according to the illustrated example of FIG. 10A, a cycle of 10 separate images, each image including image data at a different one of locations 1010, 1020, 1030, 1040, 1050, 1060. 1070, 1080, and 1090. However, according to some embodiments, after the intensity filter is applied so that only locations having intensity greater than a threshold are displayed (e.g., as in FIG. 10B), the acoustic analysis system may update the cycling process to only cycle through images corresponding to locations that meet the filtering threshold. That is, with respect to FIG. 10B, the cycling process may update to only cycle between four images, each showing discrete acoustic image data at locations 1020, 1050, 1070, and 1090, respectively.

Thus, in various embodiments, each of the locations in a target scene that includes acoustic image data, either before or after applying one or more filters to restrict which acoustic image data is shown, is shown in one of a plurality of cycled-through display images. Such cyclical display of individual acoustic source locations can assist a user viewing the images in identifying the source of particular sound. In some embodiments, each image in the cycle includes only a single source of acoustic data, and in some such embodiments, further includes one or more parameters of the acoustic data, such as frequency content, intensity, periodicity, apparent proximity, or the like.

In addition or alternatively to cycling between images showing acoustic image data satisfying certain conditions, in some examples, locations of acoustic signal sources can be detected in acoustic image data and displayed in acoustic image data in isolation from other acoustic signals. For example, with respect to FIG. 10A, in some embodiments, acoustic image data representative of acoustic signals emanating from each of locations 1010-990 can be identified and cycled through. For instance, in an exemplary operating process, display images including acoustic image data at one of locations 1010-990 can be cycled through, either automatically or at the direction of a user, for individual analysis of each source of acoustic signals. In various embodiments, the order in which different locations of acoustic image data are displayed while cycling can be dependent on a variety of parameters, such as by location, proximity, intensity, frequency content, or the like.

Additionally or alternatively, in some examples, acoustic image data from individual locations can by cycled through after applying one or more filters to isolate only acoustic image data meeting one or more predetermined conditions.

For example, with respect to FIG. 10B, locations 1020, 1050, 1070, and 1090 are shown as including acoustic image data representing acoustic signals meeting a predetermined intensity requirement. In some embodiments, such a display requirement can be applied to the individual cycling through of source locations of acoustic signals. For example, with further reference to FIG. 10B, display images including image data from only one of locations 1020, 1050, 1070, and 1090 satisfying an acoustic intensity condition can by cycled through for individual analysis at each location.

In an exemplary process with reference to FIGS. 10A and 10B, acoustic image data collected from a scene can be generally shown in FIG. 10A at locations 1010, 1020, 1030, 1040, 1050, 1060, 1070, 1080, and 1090. Such locations can include acoustic image data representative of acoustic signals having a variety of acoustic parameters, such as a variety of intensities, frequency content, periodicity, and the like.

As described elsewhere herein, a user may wish to isolate acoustic signals having one or more particular acoustic parameters, such as acoustic signals having a minimum acoustic intensity. Acoustic image data representing acoustic signals not meeting such conditions can be excluded from the image, for example, leaving acoustic image data at locations 1020, 1050, 1070, and 1090 as shown in FIG. 10B. However, a user may wish to further identify the source of a particular sound meeting the display condition (e.g., having intensity above a threshold). Thus, the user may choose to display the acoustic image data associated with locations 1020, 1050, 1070, and 1090 one-by-one in order to view the source location of and analyze each sound individually. In various embodiments, the user may choose to cycle manually through such locations, or a processor may automatically update the display image to sequentially display acoustic image data of individual locations. This may help a user further eliminate and disregard acoustic signals not of interest, but that happen to meet one or more filtering parameters applied to the image.

While described with respect to intensity and FIGS. 10A and 10B, in general, display images including acoustic image data from a single location selected from a plurality of locations can be cycled through one-by-one for individual analysis. The plurality of locations for which representative acoustic image data is included can be the entire set of locations corresponding to sources of acoustic signals in an acoustic scene, or can be a subset of such locations, for example, including only locations having acoustic signals satisfying one or more conditions. Such conditions can depend on any one or more acoustic parameters, such as intensity, frequency content, periodicity, proximity, or the like, and can be met based on various parameters being below a predetermined value, above a predetermined value, or within a predetermined range of values.

In various examples, modifying the display image to selectively include acoustic image data in a display image can be done in a variety of ways. In some embodiments, display images (e.g., including electromagnetic image data and acoustic image data) can be real-time images, in which electromagnetic image data and acoustic image data is continually updated to reflect changes in the scene. In some examples, when certain conditions are used to determine whether or not acoustic image data is included in the display image, received acoustic signals are analyzed to determine whether or not to include acoustic image data at various locations in the updated real-time image. That is, as new display image is generated based on newly received acoustic signals and electromagnetic radiation, the construction of a display image can depend on analysis of the acoustic signals to determine which acoustic signals meet any specific conditions placed on the display image (e.g., intensity thresholds, etc.). The display image can then be generated including acoustic image data only where appropriate according to such conditions.

In other examples, display images can be generated from data stored in memory, such as previously captured acoustic data and electromagnetic image data. In some such examples, the previously-acquired acoustic data is analyzed with respect to various conditions to be placed on the acoustic image data, and is combined with electromagnetic image data in locations in which the previously-captured acoustic data meets such conditions. In such embodiments, a single scene can be viewed in many ways, for example, by analyzing different acoustic parameters. The display image representative of the previously-captured acoustic image data can be updated based on any updated conditions placed on the display image for whether or not to include acoustic image data in various locations in the display image.

In some embodiments, one or more acoustic parameters used to selectively include acoustic image data in a display image may be used to modify the display image and/or image capturing techniques. For example, in real-time imaging examples, various conditions for determining whether or not to include acoustic image data in a display can include distance-to-target (e.g., apparent distance or measured distance) and/or frequency content. As described elsewhere herein, some such parameters can be used in selecting an acoustic sensor array and/or processing scheme for generating acoustic image data. Thus, in some such examples, when acoustic image data is only represented based on such parameters meeting one or more predetermined conditions, an acoustic sensor array and/or a processing scheme for generating acoustic image data can be selected based on such conditions.

For example, in an exemplary embodiment, if acoustic image data is only to be included in a real-time image in locations at which corresponding acoustic signals include frequency content within a first frequency range, one or more acoustic sensor arrays can be selected for acquiring acoustic signals that are best suited for the first frequency range. Similarly, if acoustic image data is only to be included in a real-time image at locations in which a source of acoustic signals is within a first distance range, one or more acoustic sensor arrays can be selected for acquiring acoustic signals that are best suited for acoustic imaging in the first distance range. Additionally or alternatively, as described, for example, with respect to FIG. 6, processing schemes for generating acoustic image data can be selected based on desired frequency or distance conditions. Such selected acoustic imaging sensor array(s) sand processing schemes can be subsequently used to receive acoustic signals and generate acoustic image data for the updated real-time display image in order to optimize the acoustic image data that is included.

Similarly, in some embodiments in which a display image is generated from historical data previously stored in memory, various conditions determining in which locations to include acoustic image data in the display image can be used to update the acoustic image data representative of the acoustic scene. For instance, in some embodiments, data stored in memory comprises raw acoustic data received by the acoustic sensor array(s) from the time the acoustic signals were received. Based on the conditions for determining whether or not acoustic image data is included at various locations in the display image (e.g., desired distance and/or frequency ranges), a processing scheme (e.g., a back-propagation algorithm) can be selected for use with the raw data stored in memory for generating acoustic image data optimized to the desired parameters to be displayed.

It will be appreciated that, while generally described and shown using visible light image data and acoustic image data, the processes described with respect to FIGS. 9A-C, 10A and 10B can be used including any of a variety of electromagnetic image data. For example, in various embodiments, similar processes could be performed with infrared image data or ultraviolet image data instead of visible light image data. Additionally or alternatively, combinations of electromagnetic spectrums can be used in such processes, such as blended infrared image data and visible light image data. In general, in various examples, acoustic image data can be selectively shown (e.g., included when corresponding acoustic signals meet one or more predetermined parameters) in combination any combination of electromagnetic image data.

In some embodiments, an acoustic analysis system is configured to store one or more acoustic signals and/or acoustic image data in a database, for example, in local memory and/or accessible from an external or remote device. Such acoustic signals can include acoustic image data representative of an acoustic scene during normal operation and/or other parameters associated with an acoustic scene, such as frequency data, intensity data, periodicity data, and the like. In various examples, database scenes can include acoustic image data and/or other acoustic parameters (e.g., intensity, frequency, periodicity, etc.) representative of a broad scene (e.g., a factory) and/or a more specific scene (e.g., a particular object).

In some embodiments, a database scene can be generic to a particular type of equipment, such as a particular model of equipment. Additionally or alternatively, database scenes can be specific to individual objects, even if different such objects are different instances of the same object (e.g., two separate machines that are the same model). Similarly, database scenes can be more specific, for example, including a particular operating state of an object. For instance, if a particular object has multiple modes of operation, a database can include multiple scenes of such an object, one for each of the modes of operation.

In various embodiments, database scenes can be a single acoustic image and/or associated acoustic parameters. In other examples, database scenes can include composite data formed from a plurality of previously captured acoustic images and/or associated parameters. In general, database scenes (e.g., acoustic images and/or parameters) can include an acoustic representation of the scene during normal operation. In some examples, the database can include other elements associated with the scene, such as a corresponding visible light image, infrared image, ultraviolet image, or combinations thereof, for example. In some embodiments, database generation and/or comparisons can be performed similar to the database generation and comparisons of infrared image data described in U.S. patent application Ser. No. 15/190,792, filed Jun. 23, 2016, and entitled "THERMAL ANOMALY DETECTION," which is assigned to the assignee of the instant application and is hereby incorporated by reference in its entirety. In some embodiments, a database can be generated by capturing acoustic image data and/or one or more associated acoustic parameters (e.g., frequency, intensity, periodicity, etc.) of a scene while objects within the scene are operating correctly. In some such examples, a user may tag the captured database image to associate the image with one or more objects, locations, scenes, or the like, so that the captured acoustic image and/or associated parameter(s) can be identified in the future for database analysis and comparisons.

Newly generated acoustic image data can be compared to acoustic image data stored in the database to determine whether or not the acoustic profile of the acoustic scene is within typical operating standards. Additionally or alternatively, acoustic parameters, such as intensity, frequency, periodicity, and the like, from a live acoustic scene and/or a newly-generated acoustic image can be compared to similar parameters in the database.

Figure 12A:
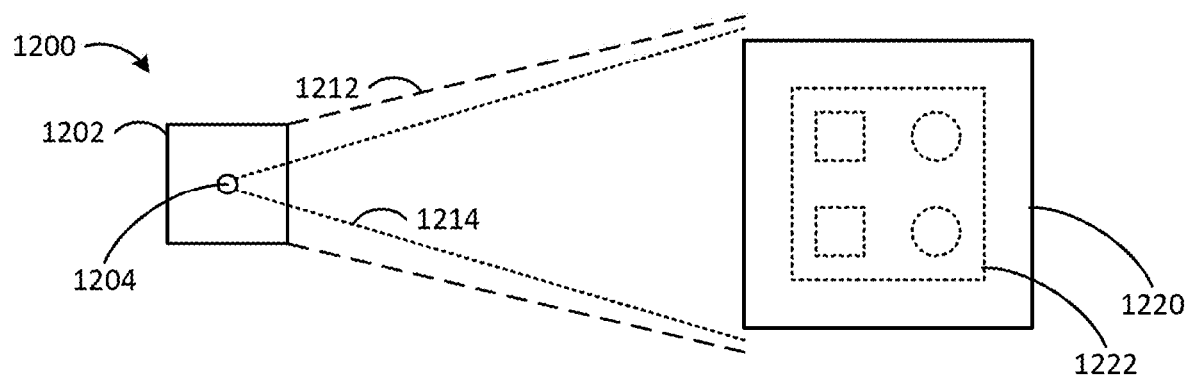
FIGS. 12A, 12B, and 12C show multiple exemplary ways for comparing acoustic image data to historical acoustic image data stored in a database.
Figure 12B:
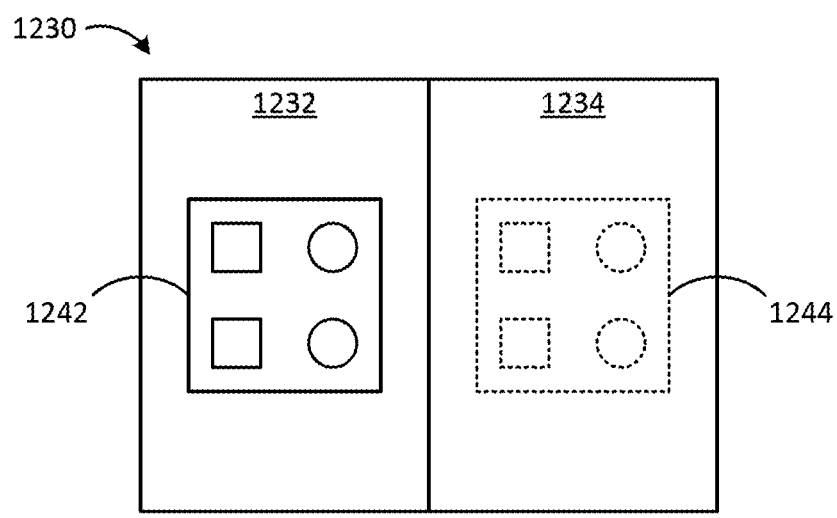
Figure 12C:
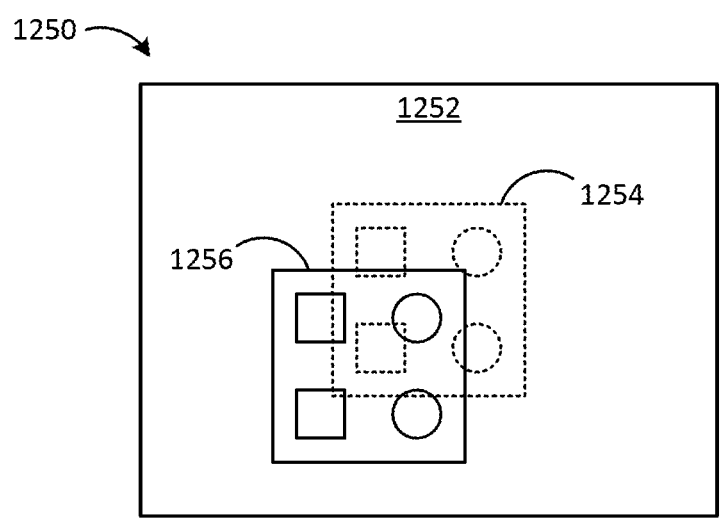

Comparing current acoustic image data to historical acoustic image data (e.g., a previously-captured image, a composite image generated from a plurality of previously-captured images, a factory-provided expected image, etc.) stored in a database can be done a plurality of ways. FIGS. 12A-12C show multiple exemplary ways for comparing acoustic image data to historical acoustic image data stored in a database. FIG. 12A shows an acoustic imaging tool 1200 including an acoustic sensor array 1202 having an acoustic field of view 1212 and an electromagnetic imaging tool 1204 having an electromagnetic field of view 1214. As shown, the electromagnetic field of view 1214 and the acoustic field of view 1212 include a target scene 1220 including an object of interest 1222. In some embodiments, the acoustic imaging tool 1200 is permanently fixed in a location such that the object of interest 1222 is in the electromagnetic field of view 1214 and the acoustic field of view 1212. In some embodiments, the acoustic imaging tool 1200 can be powered via inductive or parasitic power, can be wired into AC main power in a building, or the to be configured to continually monitor object 1222.

Fixed acoustic imaging tool 1200 can be configured to periodically capture acoustic and/or electromagnetic image data of object 1222. Because the acoustic imaging tool 1200 is generally fixed in place, images captured at different times will be from approximately the same vantage point. In some examples, acoustic image data captured via acoustic imaging tool 1200 can be compared to a database of acoustic image data representative of approximately the same scene, for example, to detect anomalies or abnormalities in the acoustic scene. This can be performed, for example, as described in U.S. patent application Ser. No. 15/190,792, which is incorporated by reference.

FIG. 12B shows an exemplary display, for example, on a handheld acoustic imaging tool. The display 1230 includes two sections, 1232 and 1234. In the illustrated example, section 1234 shows a database image 1244 of an object of interest, while section 1232 comprises a live display 1242 of real-time acoustic image data of an object. In such a side-by-side view, a user may compare the live image 1242 to the database image 1244 in order to view any differences between a typical acoustic signals (e.g., as shown in database image 1244) and the current real-time image 1242. Similarly, the user can compare if the live image 1242 approximately matches the database image 1244. If so, the user may capture the live acoustic image for further analysis and/or comparison to the database image 1244.

FIG. 12C shows another exemplary display, for example, on a handheld acoustic imaging tool. The display 1250 of FIG. 12C shows a database image 1254 and a live image 1256 on the same display 1252. In the example of FIG. 12C, a user can similarly compare the acoustic image data in the live image 1256 to the acoustic image data in the database image 1254 in order to view differences. Additionally, the user may adjust alignment of the acoustic imaging tool in order to align the object in the live image 1256 with the object in the database image 1254 for further analysis and comparison.

As a result of the processes in FIGS. 12A-12C, live and/or recently captured acoustic images can be compared to previous acoustic image data, such as from a database. In some examples, such processes can be used to register the live and/or recently captured acoustic image with the database image for automated comparison. Other processes that can be used to "recapture" acoustic image data from a similar vantage point as the database image are described in U.S. patent application Ser. No. 13/331,633, filed Dec. 20, 2011, and entitled, "THERMAL IMAGING CAMERA FOR INFRARED REPHOTOGRAPHY," U.S. patent application Ser. No. 13/331,644, filed Dec. 20, 2011, and entitled, "THERMAL IMAGING CAMERA FOR INFRARED REPHOTOGRAPHY," and U.S. patent application Ser. No. 13/336,607, filed Dec. 23, 2011, and entitled, "THERMAL IMAGING CAMERA FOR INFRARED REPHOTOGRAPHY," each of which is assigned to the assignee of the instant application and is incorporated by reference in its entirety.

Comparing real-time acoustic image data and/or acoustic signatures to a corresponding acoustic image and/or acoustic signature of a comparable scene/object can be used to provide fast and simplified analysis of the state of operation of the scene/object. For example, a comparison may indicate that certain locations within the acoustic scene are emitting acoustic signals that have a different intensity or frequency spectrum than during typical operation, which can be indicative of a problem. Similarly, locations in the scene may be emitting acoustic signals that are typically silent. Additionally or alternatively, comparison of overall acoustic signatures of a live scene and a historic scene from a database can generally indicate changes in acoustic parameters in the scene, such as frequency content, acoustic intensity, and the like.

In some examples, an acoustic analysis system is configured to compare the recent/real-time acoustic scene with a database. In some embodiments, the acoustic analysis system is configured to characterize the differences between the recent/real-time scene and the database scene and diagnose one or more possible problems in the current scene based on the comparison. For instance, in some embodiments, a user may pre-select an object of interest or a target scene for comparison to an acoustic database. The acoustic analysis system can, based on the selected object/scene, compare the database image and/or other parameters to the recent/current image and/or other parameters to analyze the scene. Based on the selected object/scene from the database, the acoustic analysis system may be capable of identifying one or more differences between the database image/parameters and the recent/current image/parameters and associate the identified difference(s) with one or more likely causes of the differences.

In some examples, the acoustic analysis system can be pre-programmed with a plurality of diagnostic information, for example, associating various differences between database images/parameters and recent/current images/parameters with likely causes and/or solutions to causes. Additionally or alternatively, a user may load such diagnostic information, for example, from a repository of diagnostic data. Such data may be provided, for example, by a manufacturer of the acoustic analysis system, the manufacturer of an object of interest, or the like. In still further examples, an acoustic analysis system can additionally or alternatively learn diagnostic information, for example, via one or more machine learning processes. In some such examples, a user may diagnose one or more issues in a target scene after observing acoustic deviations of the scene from typical, and may input data representative of the one or more issues and/or one or more solutions into the acoustic analysis system. The system can be configured to, over time and via multiple data entries, learn to associate different discrepancies between recent/current images and/or parameters and those stored in a database with certain problems and/or solutions. Upon diagnosing an issue and/or determining a proposed solution, the acoustic analysis system can be configured to output a suspected problem and/or proposed solution to a user, for example, via a display. Such a display can be on a handheld acoustic inspection tool or a remote device (e.g., a user's smartphone, tablet, computer, etc.). Additionally or alternatively, such a display indicating a potential problem and/or solution can be communicated to a remote site, such as an off-site operator/system monitor, for example, via a network.

In some example diagnostic characterizations, an acoustic analysis system may observe a particular periodic squeaking sound indicating additional lubrication is needed on an operating machine. Similarly, a constant, high-pitched signal could indicate a gas or air leak in a target scene. Other issues may similarly have recognizable acoustic signatures, such as a broken bearing within an object under analysis, such that viewing the acoustic signature via an acoustic imaging system (e.g., a handheld acoustic imaging tool) can help diagnose any abnormalities in a system or object.

An acoustic analysis system capable of comparing received acoustic signals to a baseline (e.g., acoustic image data and/or parameters from a database) and performing diagnostic information and/or suggesting a corrective action can eliminate the need for an experienced expert to analyze acoustic data of a scene. Rather, an acoustic inspection and analysis can be performed by a system operator with limited or no experience in analyzing acoustic data.

Figure 13:
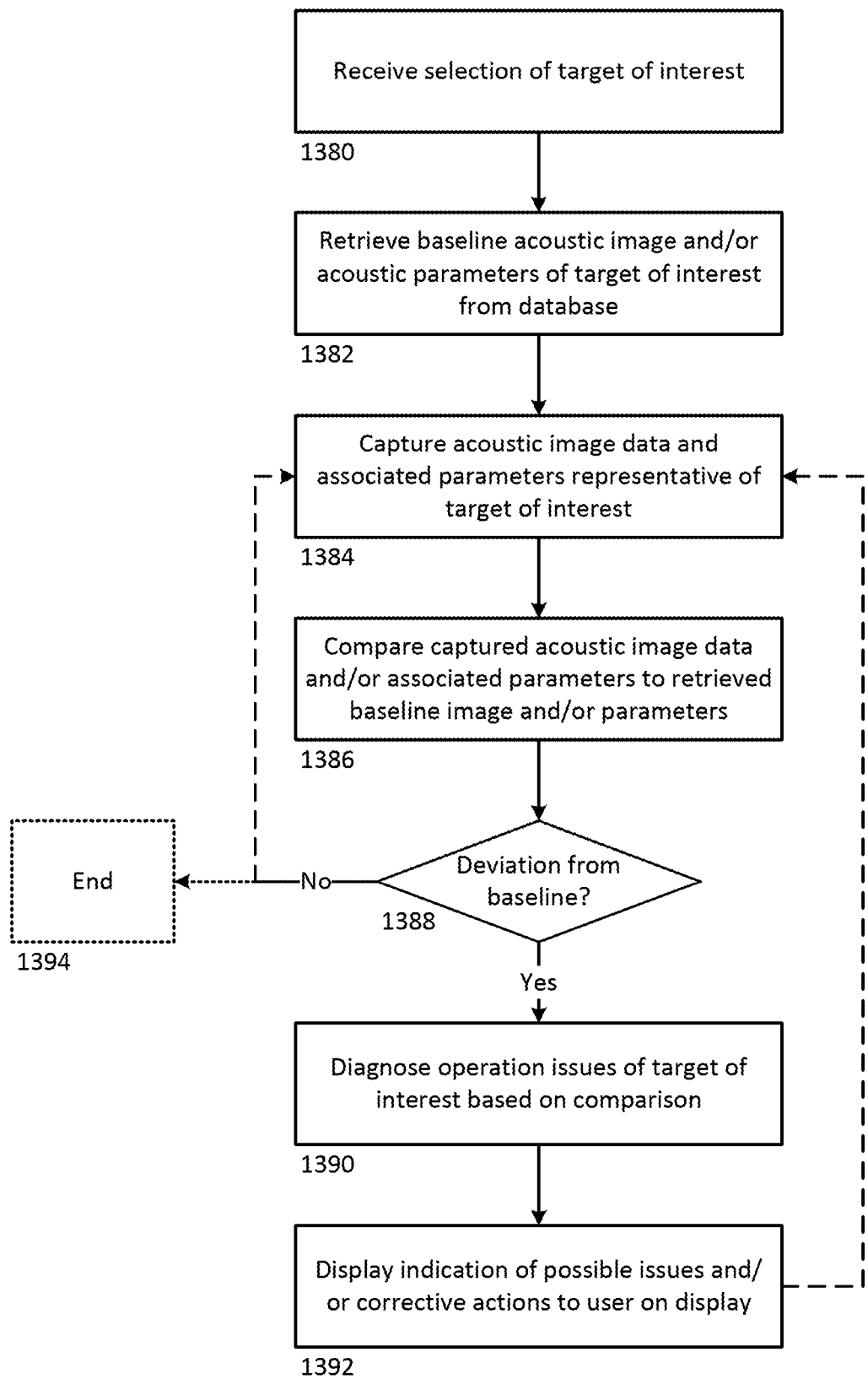
FIG. 13 is a process-flow diagram showing exemplary operation of comparing received acoustic image data to a database for object diagnostics.

FIG. 13 is a process-flow diagram showing exemplary operation of comparing received acoustic image data to a database for object diagnostics. The method includes receiving a selection of a target of interest (1380) and retrieving a baseline acoustic image and/or acoustic parameters of the target of interest from a database (1382). For example, a user may wish to perform acoustic analysis of a particular object of interest, and may select such an object from a predefined list of objects having available baseline acoustic image and/or parameters available in the database.

The method further includes the step of capturing acoustic image data and associated parameters representative of the target of interest (1384), for example, using a handheld acoustic imaging tool. After capturing the acoustic image data and associated parameters (1384), the method includes comparing the captured acoustic image data and/or associated parameters to retrieved baseline image and/or parameters (1386).

The method of FIG. 13 further includes, if the captured acoustic image data and/or parameters deviate sufficiently from the baseline (1388), diagnosing operation issues of the target of interest based on the comparison (1390). The method can further include the step of displaying an indication of possible issues and/or corrective actions to a user (1392). In some embodiments, the a comparison display, for example, a difference image showing the difference between the current acoustic image data and baseline acoustic image data can be additionally or alternatively displayed to a user.

In some such examples determining if there is deviation from the baseline (1388) comprises comparing one or more acoustic parameters of the captured data to like parameters in the baseline data and determining if the difference between the captured and baseline parameters exceeds a predetermined threshold. In various examples, different parameters may include different thresholds, and such thresholds can be absolute thresholds, statistical thresholds, or the like. In some embodiments, comparisons can be done on a location-by-location basis, and may be performed for a subset of locations within a scene.

For example, with respect to FIG. 9B, it is possible that only locations including acoustic image data and appearing on the object (e.g., locations 910 and 940) are analyzed with respect to operation of the object. In such an example, different acoustic parameters at each of locations to be compared (e.g., 910 and 940) are compared individually between captured and database images. For example, comparing the captured data and/or associated parameters to those from the database can include, with reference to FIG. 9B, comparing the frequency, intensity, and periodicity of location 910 in the captured image to the frequency, intensity, and periodicity, respectively, of location 910 in the database image. Similar comparisons can be performed at location 940 between the captured image and the database image. As described, each comparison can include a different metric for determining if there is sufficient deviation from the baseline (1388).

Diagnosing operation issues (1390) and displaying an indication of possible issues and/or corrective actions (1392) can be performed based on the combination of comparisons between captured and baseline image data and/or parameters. In some examples, such diagnostics can include a multi-dimensional analysis, such as combining comparisons of multiple parameters at a given location. For instance, in an exemplary embodiment, a certain condition might be indicated by both a deviation in frequency from the baseline that is greater than a first threshold and a deviation in intensity from the baseline that is greater than a second threshold.

In some examples, even after displaying an indication of possible issues and/or corrective actions (1392), the process can include capturing new acoustic image data and associated parameters (1384) and repeating the comparison and diagnostic processes. Thus, a user may observe whether or not any taken corrective actions are effectively changing the acoustic signature of the object in order to rectify an identified issue and/or bring the acoustic signature of the object into conformity with the baseline.

In some embodiments, if, after comparing the captured data to the baseline data (1386), there is not a sufficient deviation from the baseline (1388), the process may end (1394) with the conclusion that, based on the current acoustic signature of the object, the object is operating normally. Additionally or alternatively, new acoustic image data and associated parameters of the target of interest can be captured (1384) and the comparison and diagnostic process can be repeated. In some examples, continued repeated analysis can be performed using a fixed acoustic analysis system, for example, including the acoustic imaging tool 1200 in FIG. 12A.

Comparisons of acoustic data (e.g., image data and/or other acoustic parameters) can help a user more easily identify if an object is function correctly, and if not, to diagnose issues with the object. In some examples, comparing to a baseline can help a user disregard "normal" sounds in a scene, such as expected operating sounds or floor/background sounds that may be irrelevant to an operating issue of the object.

During operation, observation of acoustic image data and/or associated acoustic parameters or observing the results of a comparison between current and database acoustic scenes may indicate locations of interest to a user for further inspection. For example, a comparison acoustic image showing deviations from the database image may indicate one or more locations in scene that are operating abnormally. Similarly, viewing an acoustic image having an acoustic signature at one or more locations that are unexpected may indicate a location of interest to a user. For example, with reference to FIG. 10B, a user observing FIG. 10B on a display of an acoustic imaging system may realize that a particular location (e.g., 1020) is unexpected emitting acoustic signals, or similarly, a comparison to a baseline image indicates unexpected parameters of the acoustic signals at that location (e.g., unexpected frequency, intensity, or the like).

In some such examples, the user may move closer to such a location in order to more closely inspect the location for abnormalities. Upon moving closer to the object, the distance-to-target value may be updated to reflect the new distance between an acoustic array and the target location. The acoustic sensor array and/or the back-propagation algorithm may be updated based on the updated distance-to-target. Additionally or alternatively, updated acoustic analysis from a closer location may yield different analysis of the acoustic signals from the target. For instance, high frequency acoustic signals (e.g., ultrasound signals) tend to attenuate over a relatively short distance from the source of the acoustic signals. Thus, as a user moves closer to the target for further inspection, additional signals (e.g., high frequency signals) may be visible to the acoustic sensor array. Such apparent changes in the observable scene may also result in adjusting the acoustic sensor array and/or the back-propagation algorithm used for acoustic imaging.

Accordingly, the sensor array and/or back-propagation algorithm used for acoustic imaging can be updated one or more times as the user moves closer to an object or region of interest. Each update may provide additional details regarding the object or region of interest that may not have been observable from a further distance away using a different sensor array and/or back-propagation algorithm. Moving closer to an object or region of interest, for example, based on initial observations of a broader scene, can also increase the acoustic intensity of the acoustic signals of interest relative to background sounds in the environment.

In some embodiments, an acoustic analysis system (e.g., a handheld acoustic imaging tool) can prompt a user to move more closely to an object or regions of interest within a scene. For example, upon comparing a current acoustic image to a baseline database image, the acoustic analysis system may identify one or more locations in the scene that deviate from baseline. The acoustic analysis system may highlight such one or more locations to a user, for example, via a display, and suggest the user move closer to the identified location(s) for further analysis. In some examples, the acoustic analysis system can classify the identified location, such as a sub-component of an object or a particular object within an environment, as having its own baseline profile stored in a database. The system may be configured to suggest and/or implement such a profile of the classified location to facilitate further analysis of the identified location when the user moves closer for additional inspection.

Systems and processes described herein can be used to improve the speed, efficiency, accuracy, and thoroughness of acoustic inspections. Various automated actions and/or suggestions (e.g., of a sensor array, a back-propagation algorithm, etc.) can increase the case of inspection to the point that an inexperienced user may perform a thorough acoustic inspection of an acoustic scene. Moreover, such processes can be used to analyze a broad scope of scenes, such as entire systems, individual objects, and sub-components of individual objects. Predefined and/or user-generated profiles of baseline acoustic data of acoustic scenes can assist even inexperienced users in identifying abnormalities in captured acoustic data.

Registration of acoustic image data with other data streams, such as visible light, infrared, and/or ultraviolet image data, can provide additional context and detail to what objects are emitting acoustic signals represented in acoustic image data. Combining acoustic sensor arrays and a distance measuring tool (e.g., a laser distance finder) can assist a user in quickly and easily determining a proper distance-to-target value for use during acoustic imaging processes. In various examples, an acoustic sensor array, distance measuring tool, processor, memory, and one or more additional imaging tools (e.g., visible light camera module, infrared camera module, etc.) can be supported by a single housing in a handheld acoustic imaging tool that can provide efficient acoustic analysis of a plurality of scenes. Such a handheld acoustic imaging tool can be moved from scene to scene for rapid analysis of multiple objects of interest. Similarly, using a handheld tool, a user can move closer to a location of interest within a scene for further inspection or analysis.

Various systems and methods for performing acoustic imaging and generating and displaying acoustic image data are described herein. Exemplary systems can include an acoustic sensor array that includes a plurality of acoustic sensor elements configured to receive acoustic signals from an acoustic scene and output acoustic data based on the received acoustic signals.

Systems can include an electromagnetic imaging tool configured to receive electromagnetic radiation from a target scene and output electromagnetic image data representative of the received electromagnetic radiation. Such imaging tools can include an infrared imaging tool, a visible light imaging tool, an ultraviolet imaging tool, or the like, or combinations thereof.

Systems can include a processor in communication with the acoustic sensor array and the electromagnetic imaging tool. The processor can be configured to receive electromagnetic image data from the electromagnetic imaging tool and acoustic data from the acoustic sensor array. The processor can be configured to generate acoustic image data of a scene based on the received acoustic data and received distance information representative of a distance to target, for example, via a back-propagation calculation. The acoustic image data can include a visual representation of the acoustic data such as by a palette or color scheme such as described elsewhere herein.

The processor can be configured to combine the generated acoustic image data and the received electromagnetic image data to generate a display image comprising both acoustic image data and electromagnetic image data, and communicate the display image to a display. Combining the acoustic image data and the electromagnetic image data can include correcting a parallax error between the acoustic image data and the electromagnetic image data, for example, based on the received distance information.

In some examples, distance information can be received from a distance measuring tool in communication with the processor. Distance measuring tools can include, for example, an optical distance measuring device, such as a laser distance measuring device, and/or an acoustic distance measurement device. Additionally or alternatively, a user can enter distance information manually, for example, via a user interface.

Systems can include a laser pointer to help identify locations of points of interest such as sounds or sound profiles based upon selected parameters such as frequency, decibel level, periodicity, distance, or the like, or combinations thereof. Such a laser pointer can be used to pinpoint and align the field of view of the scene with the appropriate sound visualization as displayed on the display. This may be useful in environments where an object under inspection is at a distance relative to the acoustic imaging device or if it is not clear where the visualization of the sound on the display is relative to the actual scene.

In some examples, the laser pointer can be visualized on the display. Such visualization can include the generating a laser pointer spot (e.g., via the processor) on the display representative the laser pointer in the actual scene. In some examples, the position of the laser pointer can be enhanced on the display, for instance, with an icon representative of the laser pointer in the scene or another aligned display marker to better determine the location on the display relative to the actual scene.

As described elsewhere herein, a thermal imaging system can be configured to create a false-color (e.g., palettized), symbolic, or other non-numerical visual representation of acoustic data generated by one or more acoustic sensors, such as by creating acoustic image data. Additionally or alternatively, a system can provide a user with audio feedback, such as via speakers, headphones, a wired or remotely-communicating headset, or the like. The transmission of such audio or heterodyne audio can be synchronized to the visual representation of the detected and displayed sounds.

In various examples, acoustic data can be visualized in a variety of ways, for example, to facilitate understanding of such data and prevent a viewer from making incorrect assumptions about the nature of the sounds being visualized. In some examples, different types of visualization can provide an intuitive understanding of the visualized sounds.

In some embodiments, a generated display includes a non-numerical visual representation with contextual numerical and/or alphanumerical data in order to provide a thorough presentation of information regarding sounds being visualized, which can assist a user in determining and/or implementing one or more appropriate courses of action.

Various display features, including various non-numeric graphical representations (e.g., symbols, palettization, etc.) and alphanumeric information can be combined. In some embodiments, the display features present in a given representation of a scene can be customized by a user, for instance, from a plurality of selectable settings. Additionally or alternatively, preset combinations of display features can be selectable by a user to automatically include a desired combination of information in a display image. In various embodiments, aspects of a display image are adjustable by a user, for example, via a virtual interface (e.g., provided via a touchscreen) and/or via physical controls.

Figure 14:
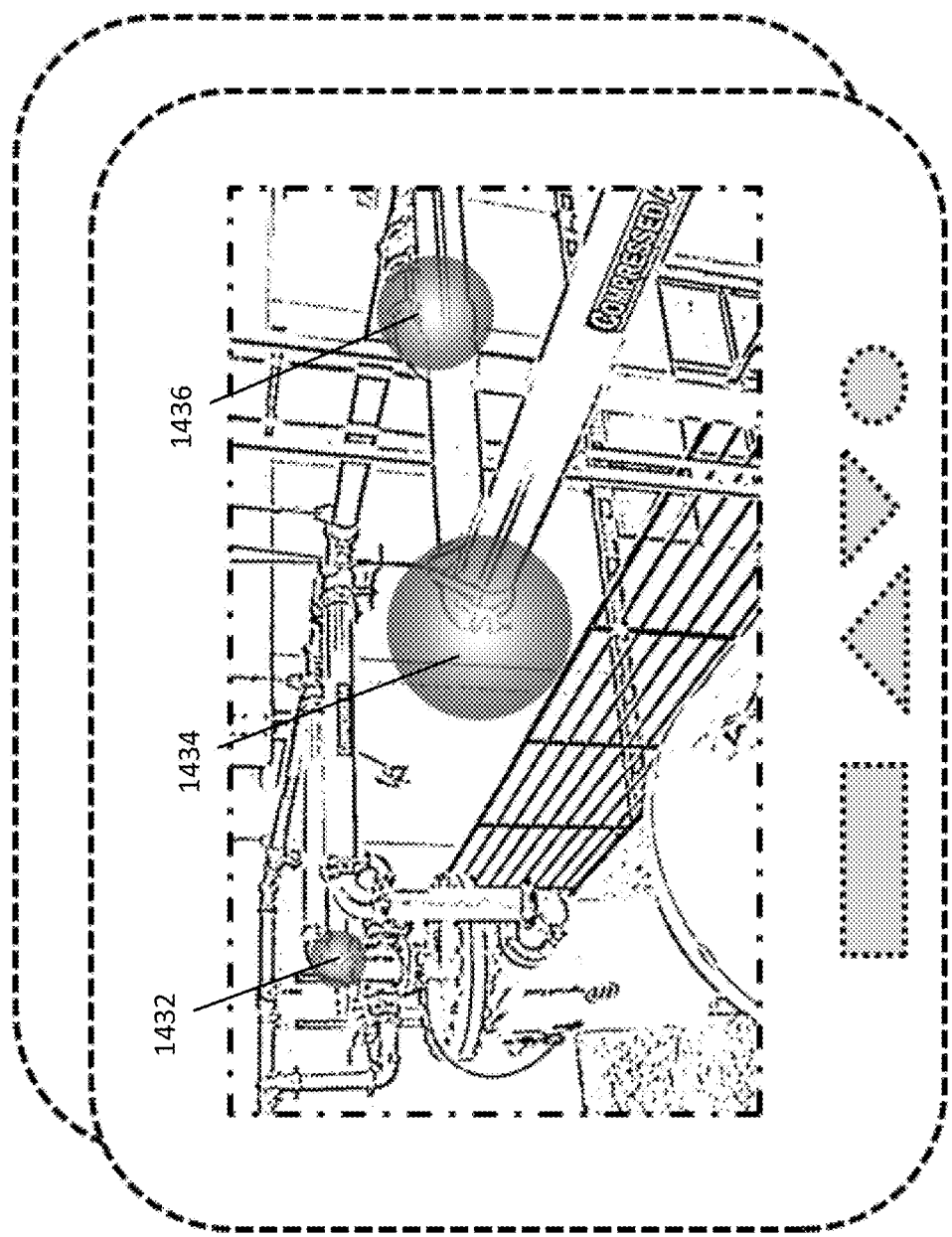
FIG. 14 shows a visualization of acoustic data using a gradient palettization scheme.

FIG. 14 shows a visualization of acoustic data using a gradient palettization scheme. As shown, an acoustic parameter (e.g., intensity) is shown via a gradient palettization scheme. In an exemplary gradient palettization scheme, a parameter value will have a unique color associated therewith according to the palettization scheme. A change in the parameter value at a given pixel will generally result in a change in the color associated with that pixel to represent the new parameter value. As shown in the example of FIG. 14, the acoustic parameter value appears to change radially from a center position in acoustic signal at positions 232, 234, 236. Other examples of gradient palettization are described U.S. patent application Ser. No. 15/802,153, filed Nov. 2, 2017, and assigned to the assignee of the instant application.

Figure 15:
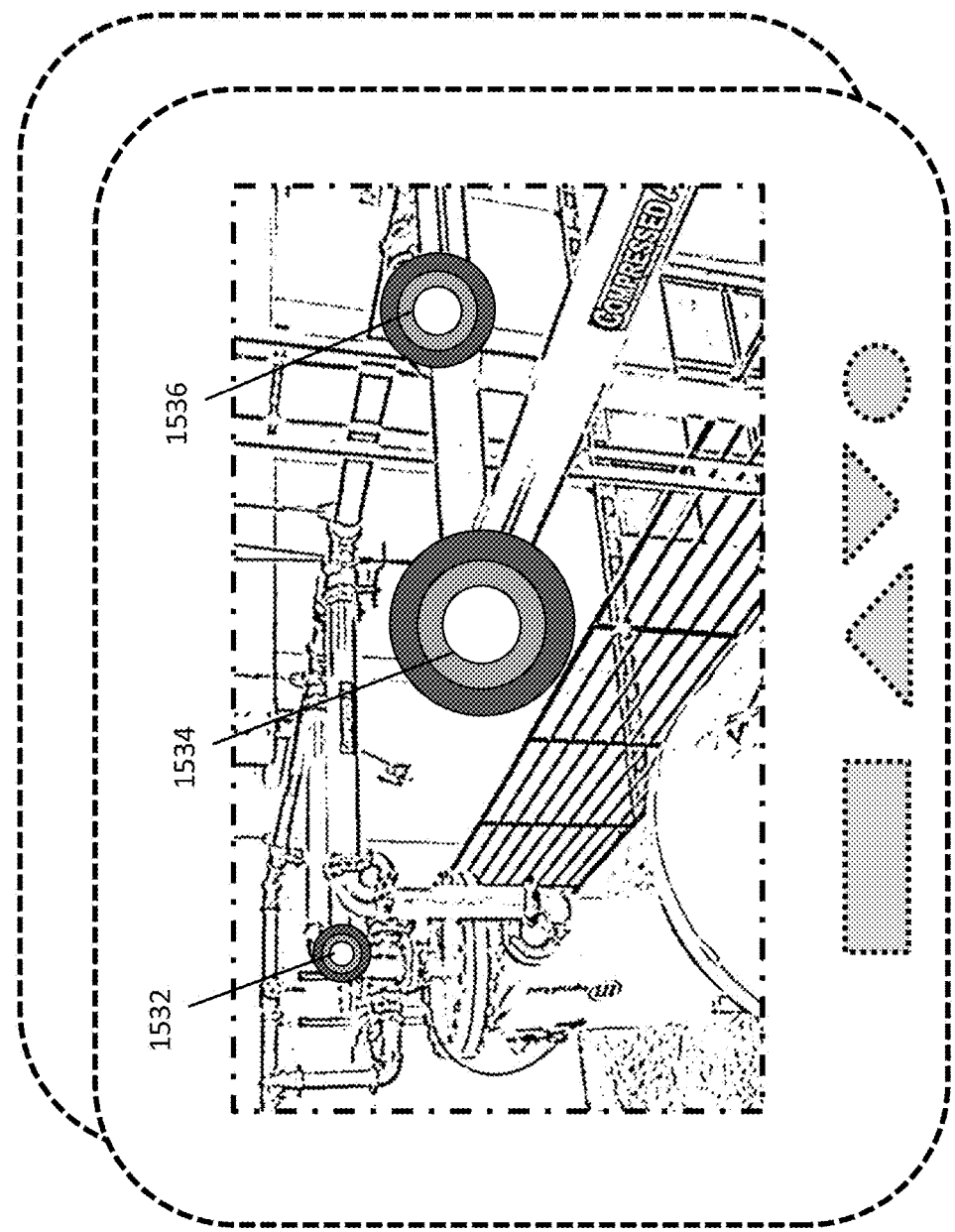
FIG. 15 shows a visualization of acoustic data using a plurality of shaded concentric circles.

FIG. 15 shows a visualization of acoustic data using a plurality of shaded concentric circles. In some such examples, as opposed to a gradient palettization scheme having a color associated with a parameter value, each solid color the concentric circles shown in FIG. 15 can represent pixels having acoustic parameter values within a range of values associated with that color. In the illustrated examples, an acoustic parameter (e.g., intensity) associated with acoustic signals at locations 332, 334, 336 changes radially from the center of the acoustic signal. In an exemplary palettization scheme, pixels shown in red represent an acoustic parameter value within a first range of parameter values, pixels shown in yellow represent an acoustic parameter value within a second range of parameter values, and pixels shown in green represent an acoustic parameter value within a third range of parameter values, however, other display techniques are possible, including additional or alternative colors, patters, or the like. In various embodiments, ranges of values can correspond to absolute ranges, such as intensity values between 10 dB and 20 dB, or can be relative ranges, such as intensity values between 90% and 100% of the maximum intensity.

Figure 16:
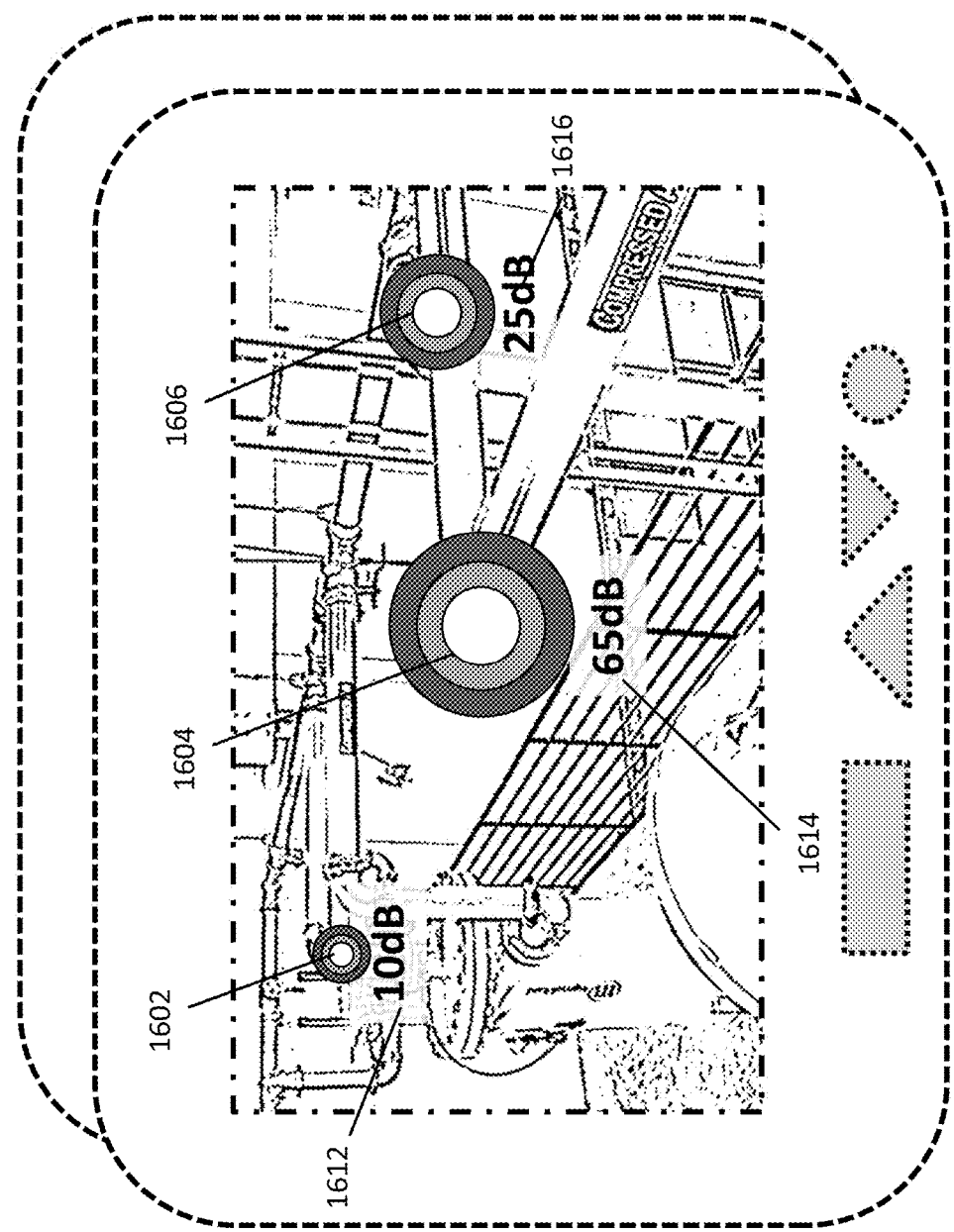
FIG. 16 shows an exemplary visualization including both non-numeric information and alphanumeric information.

As described elsewhere herein, in some embodiments, a display image including electromagnetic image data and acoustic image data can include both a visual indication of an acoustic signal and an alphanumeric representation of one or more parameters associated with the acoustic signal. FIG. 16 shows an exemplary visualization showing both non-numeric information (e.g., palettization via parameter value ranges) and alphanumeric information. In the illustrated example, an alphanumeric sound intensity value label is associated with each of three locations having palettized acoustic image data (e.g., intensity data). As shown, acoustic signals have corresponding visual indicators representing an acoustic parameter associated therewith (1602, 1604, 1606), as well as alphanumeric information (1612, 1614, 1616, respectively). In an exemplary embodiment, the alphanumeric information can provide a numerical value, such as maximum intensity value, associated with the location at which the palettized acoustic data is displayed. In some examples, a user may select one or more locations at which to display the palettization and/or the alphanumeric data. For example, a user may choose to annotate a display image using alphanumeric representations of an acoustic parameters associated with one or more acoustic signals within the scene.

Figure 17:
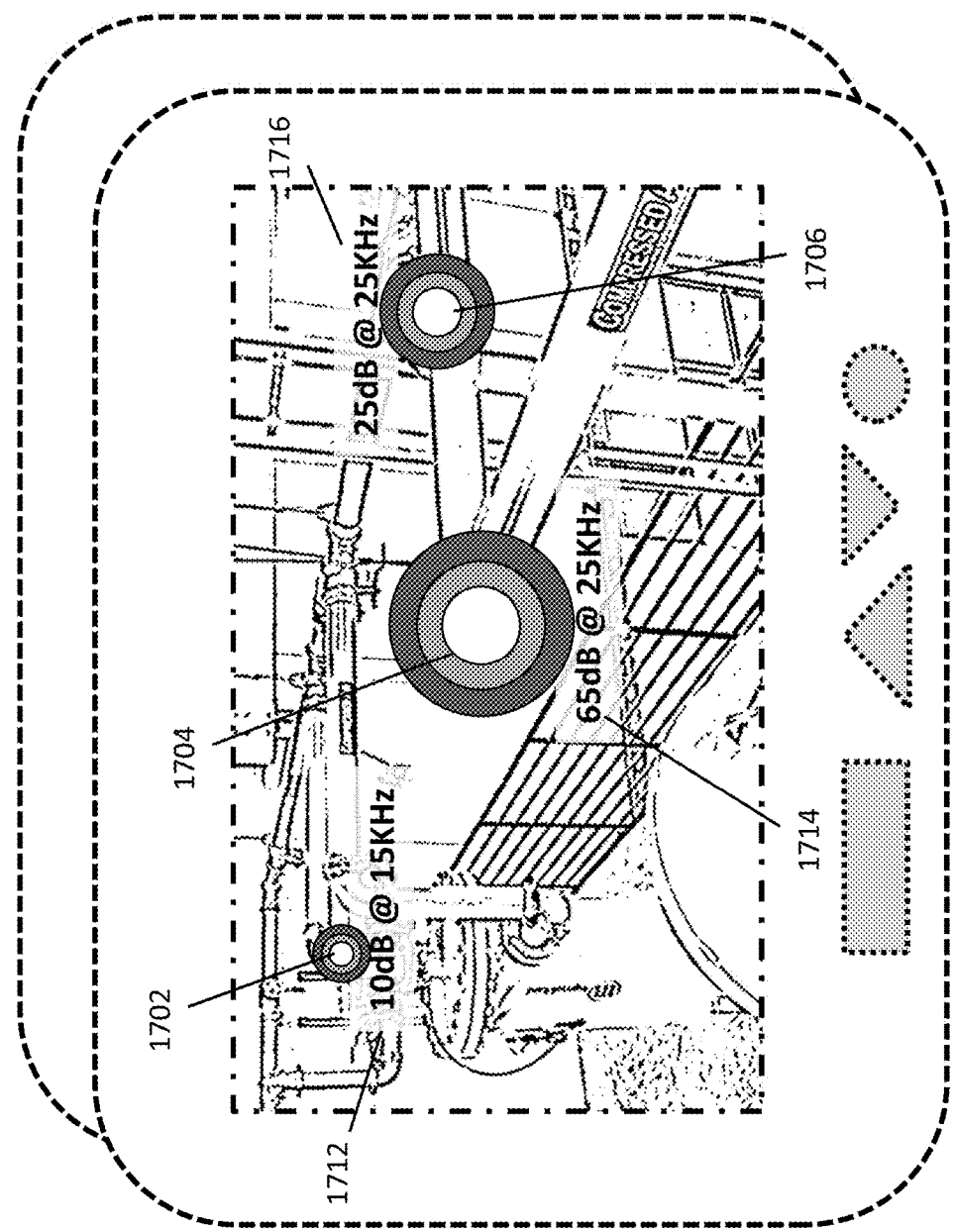
FIG. 17 shows another example visualization including both non-numeric information and alphanumeric information.

In some examples, alphanumeric information can represent a plurality of parameters (e.g., acoustic parameters) associated with an acoustic signal at a given location in a scene. FIG. 17 shows an example visualization including both non-numeric information (e.g., palettization via parameter value ranges) and alphanumeric information. In the illustrated example, a sound intensity value and a corresponding frequency value (e.g., an average frequency or a peak frequency) are shown in alphanumeric information 1712, 1714, 1716 associated with each of three locations having palettized acoustic data (e.g., intensity data) shown via indicators 1702, 1704, 1706, respectively. Similar to as discussed with respect to FIG. 16, the inclusion of various such data at various locations can be initiated by a user. For example, a user may choose to annotate a display image using alphanumeric representations of one or more acoustic parameters associated with one or more acoustic signals within the scene.

Figure 18:
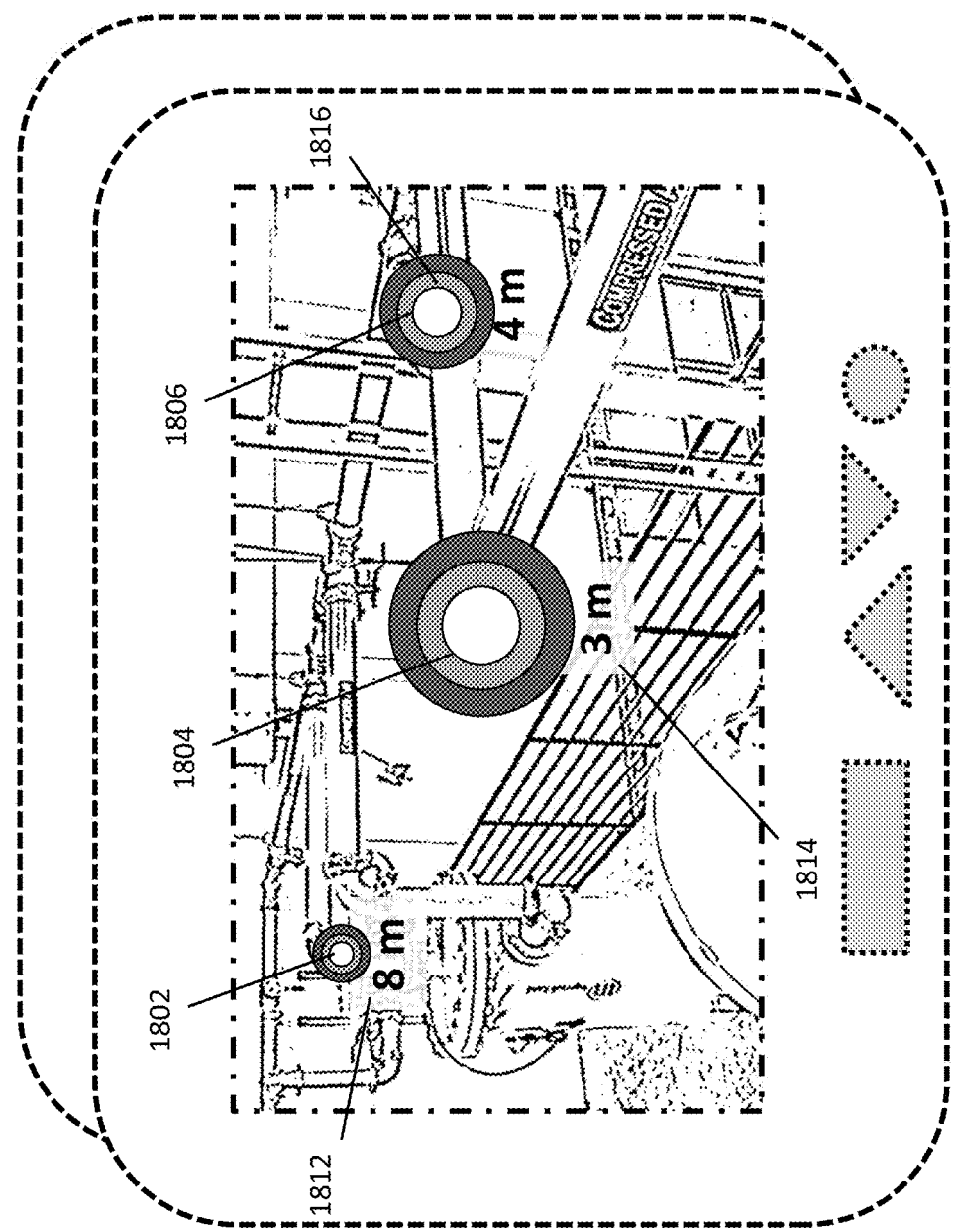
FIG. 18 shows another example visualization including both non-numeric information and alphanumeric information.

FIG. 18 shows another exemplary visualization showing both non-numeric information (e.g., palettization via parameter value ranges) and alphanumeric information. In the illustrated example, a distance measurement is included with alphanumeric information 1812, 1814, 1816 associated with each of three locations having palettized acoustic data (e.g., intensity data), shown via indicators 1802, 1804, 1806, respectively. Similar as discussed with respect to FIG. 16, the inclusion of various such data at various locations can be selected by a user, for example, as part of a display image annotation.

Figure 19:
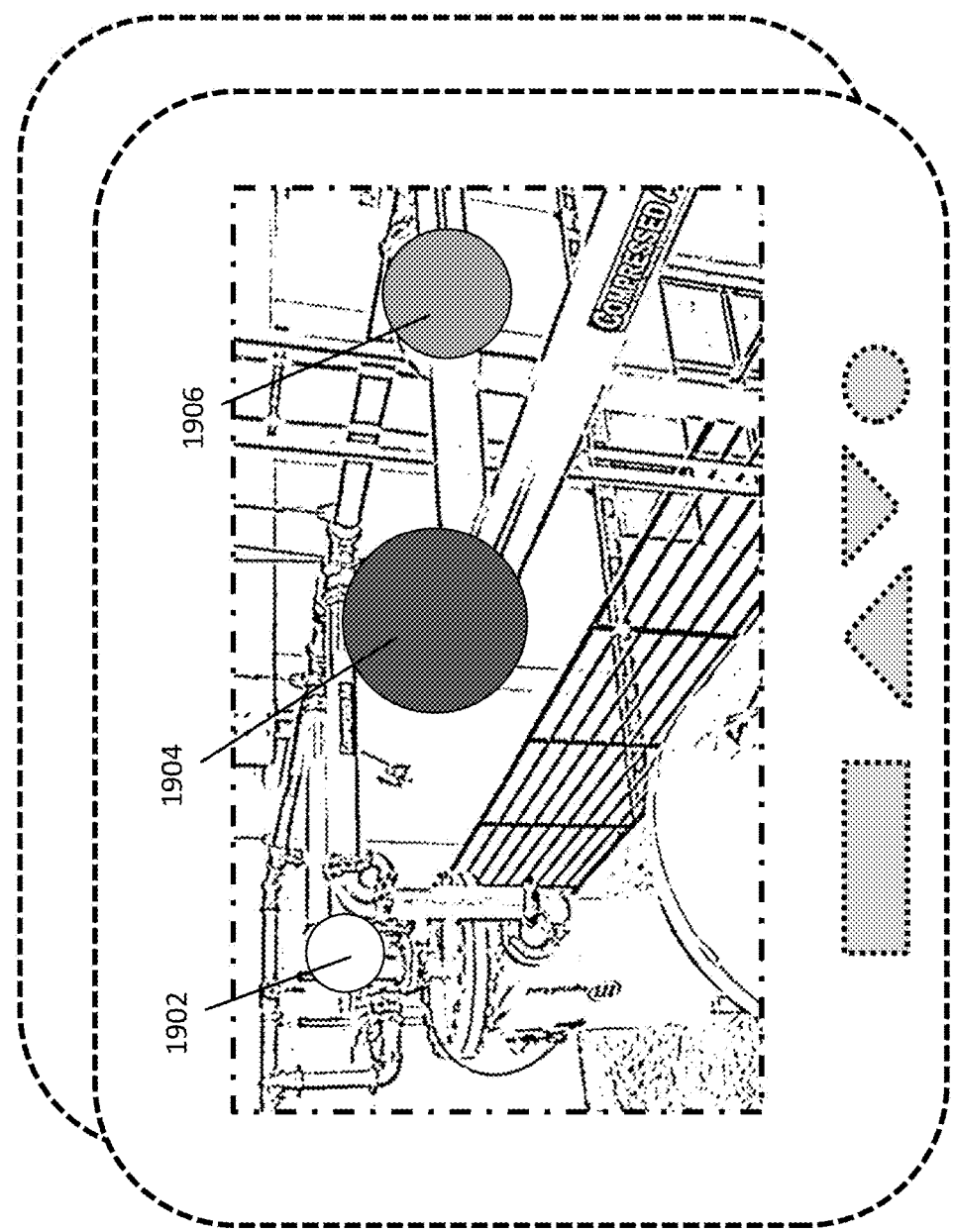
FIG. 19 shows an exemplary visualization showing indicators of different size and color representative of different acoustic parameter values.

In some examples, non-numeric representations can be used to communicate information related to a plurality of acoustic parameters. For instance, FIG. 19 shows an exemplary visualization showing indicators 1902, 1904, 1906 (in this case, circles) of different size and color representative of different acoustic parameter values. In an exemplary embodiment, the size of the indicator corresponds to the intensity of the acoustic signal at a given location, while the color of the indicator corresponds to a peak or average frequency. In an exemplary embodiment, indicator size can show relative values such that comparing the size of one indicator to the size of another represents the relative difference between the represented acoustic parameter values at the locations associated with the indicators. Additionally or alternatively, alphanumeric information can be included to provide absolute or relative acoustic parameter values.

Figure 20:
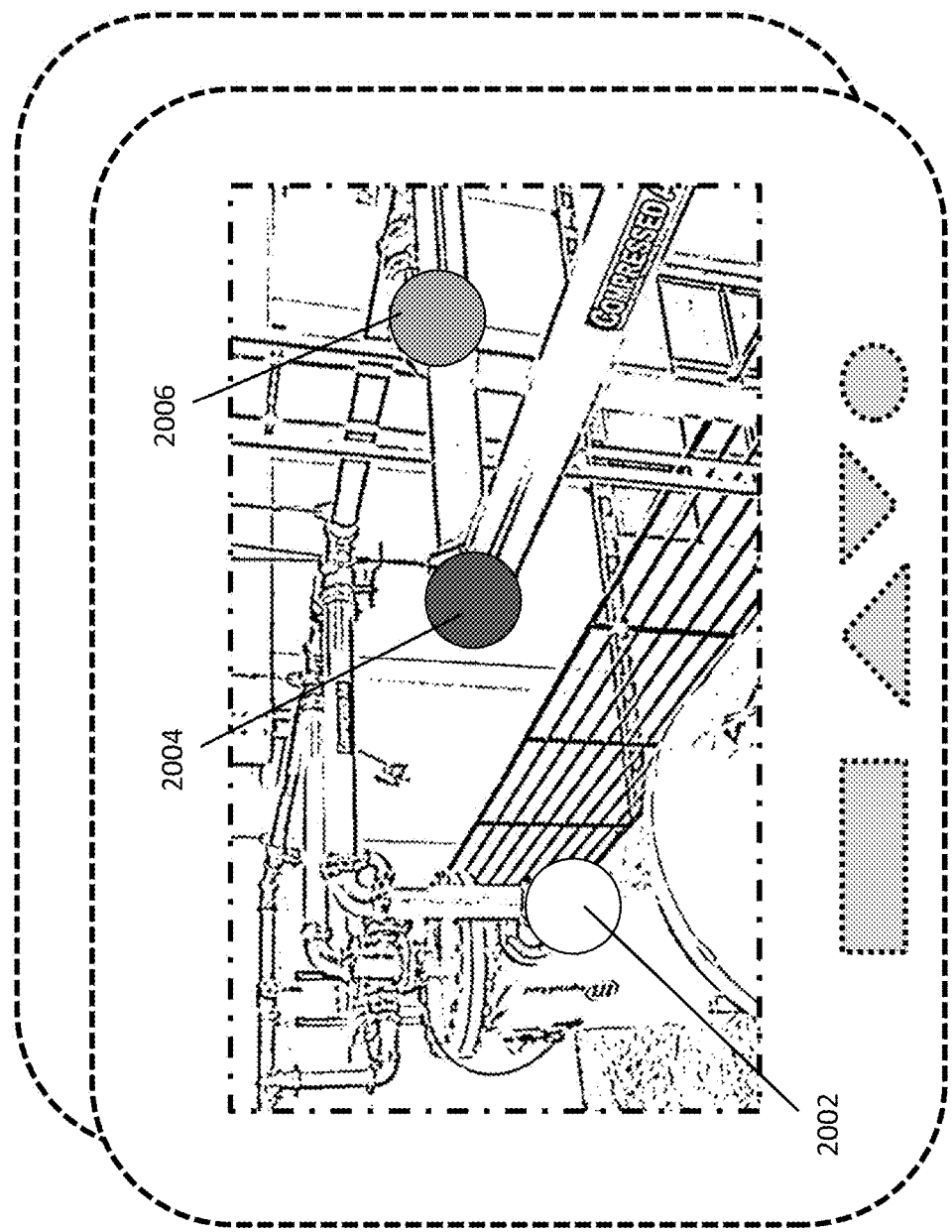
FIG. 20 shows an exemplary visualization showing a plurality of indicators having different colors indicative of a severity indicated by acoustic signals from the corresponding locations.

In some embodiments, a colorized indicator can be used to represent the severity of one or more detected acoustic signals and/or associated acoustic parameters, such as an amount of deviation from a baseline parameter. FIG. 20 shows an exemplary visualization showing a plurality of indicators 2002, 2004, 2006 having different colors indicative of the severity indicated by acoustic signals from the corresponding locations. For instance, in an exemplary embodiment, a red indicator indicates a critical severity based on one more acoustic parameters (e.g., when compared to a baseline, such as a baseline of typical operating conditions), a yellow indicator indicates moderate severity, and a green indicator represents minor severity. In other examples, other color schemes or appearance characteristics (e.g., indicator transparency, indicator size, etc.) can be used to visually distinguish severity of an acoustic signal. In the illustrated example, indicator 2004 represents greatest level of severity, indicator 2006 represents the next greatest, and indicator 2002 represents the least severe acoustic signal.

Figure 21:
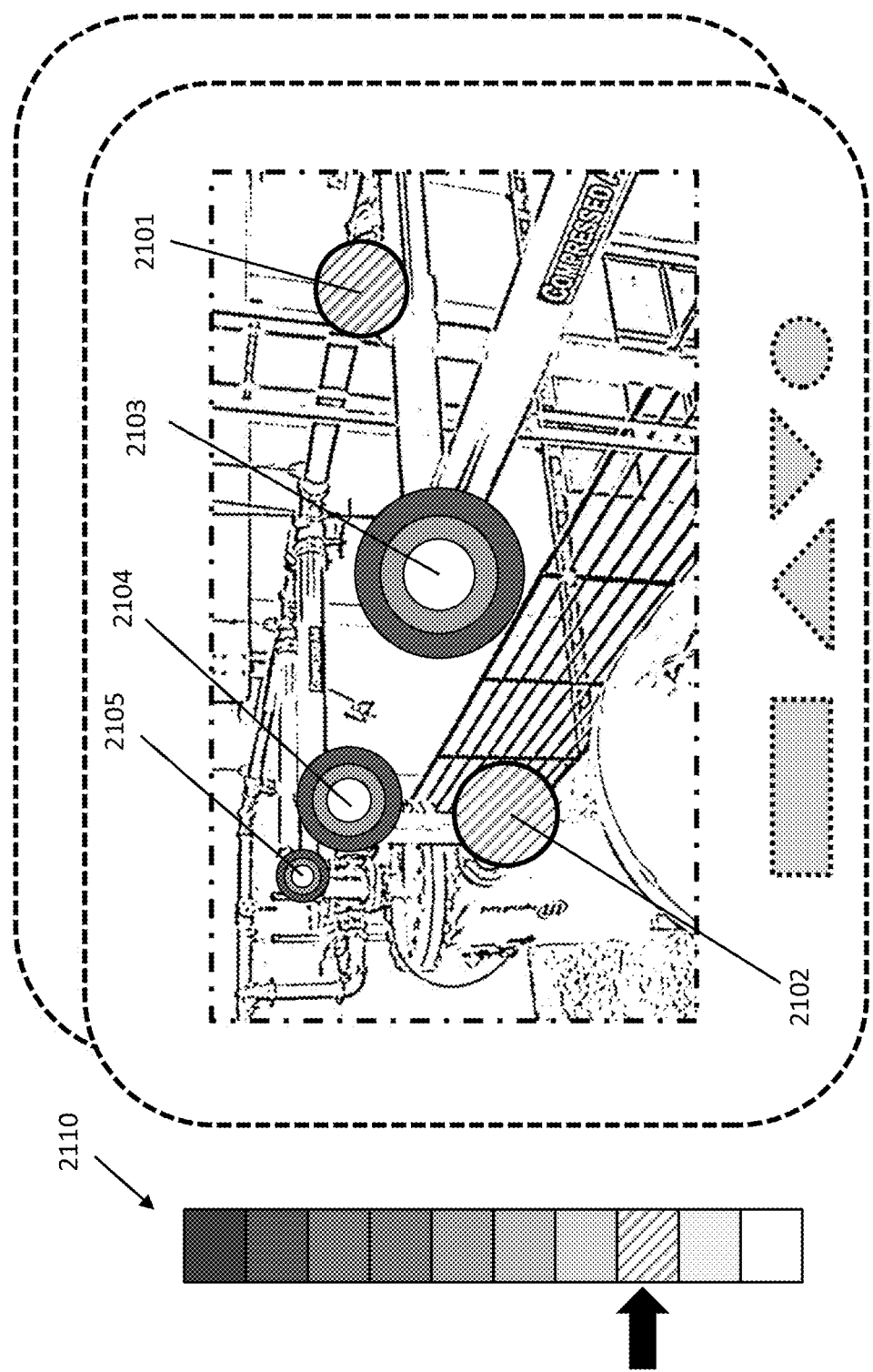
FIG. 21 shows a scene including indicators at a plurality of locations within the scene showing acoustic signals meeting a predetermined condition in a distinguishing way.

As described elsewhere herein, in various embodiments, one or more acoustic parameters can be displayed on a visual representation of an acoustic scene, for example, by way of a palettized color or grayscale display. In some embodiments, a system can be configured to identify one or more locations in a scene meeting one or more acoustic conditions, such as an identified frequency range, intensity range, distance range, or the like. In some examples, various locations corresponding to an acoustic profile (e.g., satisfying a particular set of conditions or parameters) can be identified. Such identified locations can be presented in a distinguishing manner from the acoustic image data palettization scheme otherwise used in creating a display image. For example, FIG. 21 shows a scene including indicators at a plurality of locations within the scene. Indicators 2101, 2102, 2103, 2104, and 2105 are positioned within the scene. Indicators 2103, 2104, and 2105 include palettized acoustic image data, for example, representing values of one or more acoustic parameters corresponding to scale 2110. Indicators 2101 and 2102 are shown having a unique presentation scheme distinguishable from the palettization scheme appearing at locations 2103, 2104, and 2105. In such an embodiment, a user may quickly and easily identify those locations in an image satisfying one or more desired conditions. In some such examples, a user may select the one or more desired conditions for displaying in a distinguishing way based on a selection of a range of values, for example, from a scale such as 2110.

Figure 22:
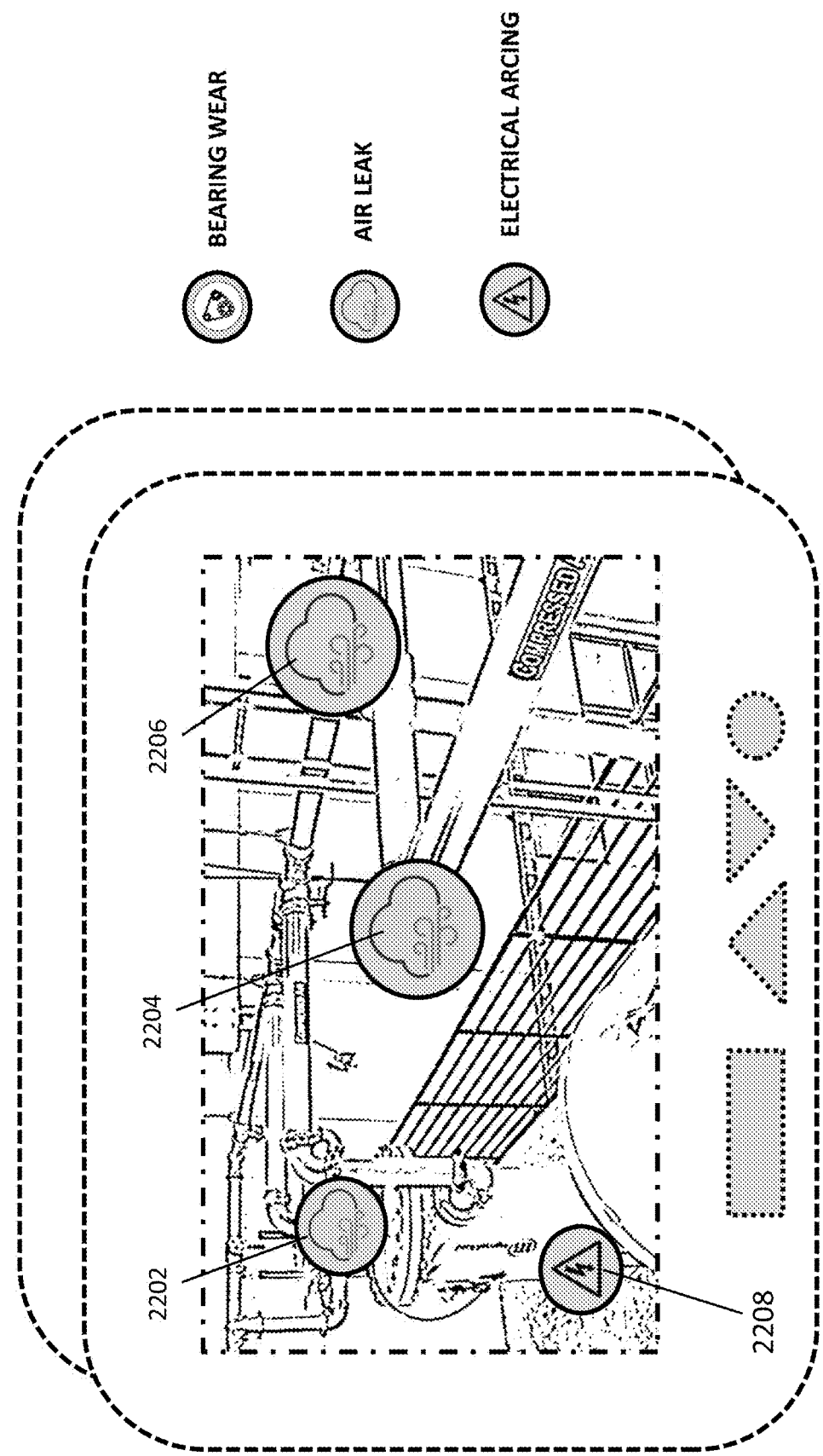
FIG. 22 shows a display image including a plurality of icons positioned within the display image indicating recognized acoustic profiles within the scene.

Additionally or alternatively, a location meeting the conditions of a particular sound profile can be presented with an icon representative of the met condition, such as a corresponding acoustic profile. For example, FIG. 22 shows a plurality of icons 2202, 2204, 2206, 2208 positioned within a display image indication recognized acoustic profiles within the scene. Exemplary profiles as shown in FIG. 22 include bearing wear, air leak, and electrical arcing. Such profiles can be identified by acoustic signals satisfying a set of one or more parameters associated with such profiles in order to be categorized into such profiles.

Figure 23:
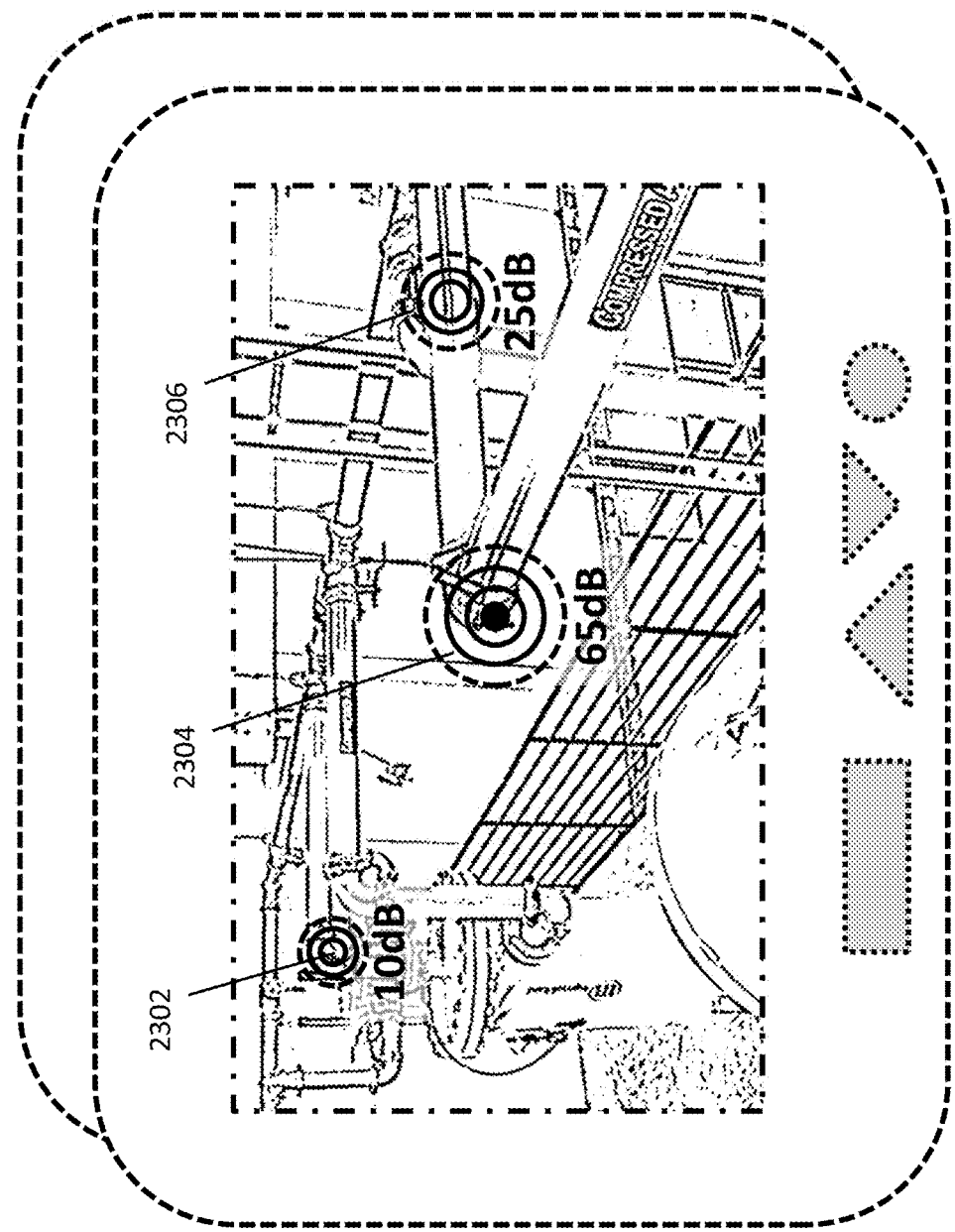
FIG. 23 shows another exemplary display image showing acoustic data via a plurality of indicators using concentric circles and alphanumeric information representing acoustic intensity associated with each of the acoustic signals.

FIG. 23 shows another exemplary display showing acoustic data via a plurality of indicators 2302, 2304, and 2306 using concentric circles and alphanumeric information representing acoustic intensity associated with each of the acoustic signals. As described elsewhere herein, in some examples, the size of an indicator can represent one or more acoustic parameters present at the corresponding location. In some embodiments, indicators can be monochromatic, and indicate acoustic parameters in one or more other ways, such as by indicator size, line weight, line type (e.g., solid, dashed, etc.).

Figure 24:
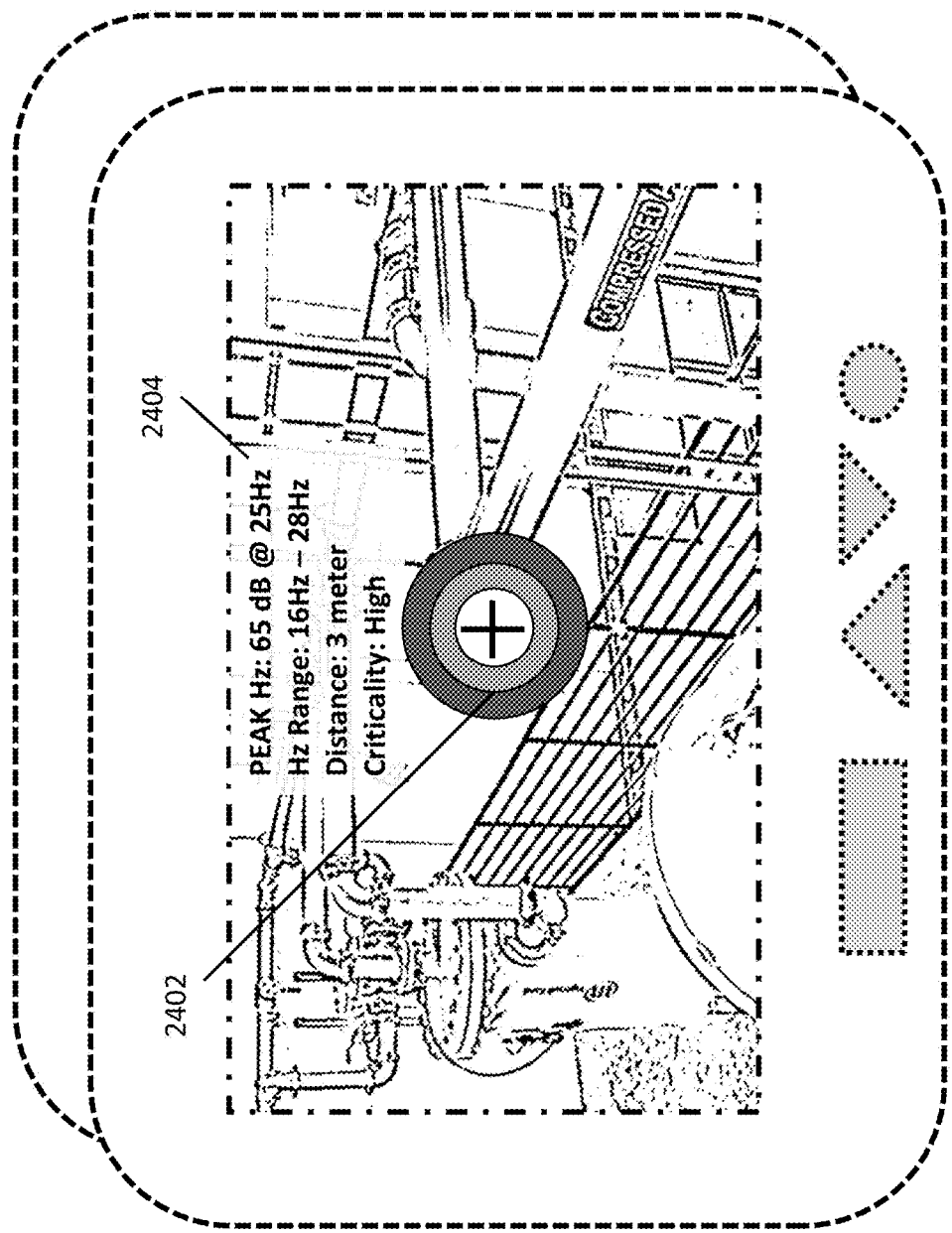
FIG. 24 shows an example display image having an indicator and additional alphanumeric information associated with the represented acoustic signal.

In some examples, a display can include alphanumeric information based on a selection made by a user. For instance, in some embodiments, a system (e.g., via a processor) can include information representing one or more acoustic parameters of an acoustic signal located at a particular location in response to a user selection of an indicator on a display (e.g., via a user interface) at such a location. FIG. 24 shows an example display image having an indicator and additional alphanumeric information associated with the represented acoustic signal. In an example, indicator 2402 on a display can be selected (e.g., represented via crosshairs, which can be indicative of a selection, such as via a touch screen input) for further analysis. The display shows alphanumeric information 2404 including a list of data associated with the location corresponding to the indicator, including a peak intensity and corresponding frequency, a frequency range, a distance to location measurement, and a level of criticality indicated by the acoustic signals from that location.

In some examples, a display image can include a plurality of indicators representing a corresponding plurality of acoustic signals in the scene. In some embodiments, in such a case, a user may select one or more indicators (e.g., via a touchscreen or other user interface), and in response to detecting the selection, the processor can present additional information regarding the acoustic signal. Such additional information can include an alphanumeric of one or more acoustic parameters. In some examples, such additional information can be displayed for multiple acoustic signals simultaneously. In other examples, such additional information for a given acoustic signal is hidden when another acoustic signal is selected.

Figure 25A:
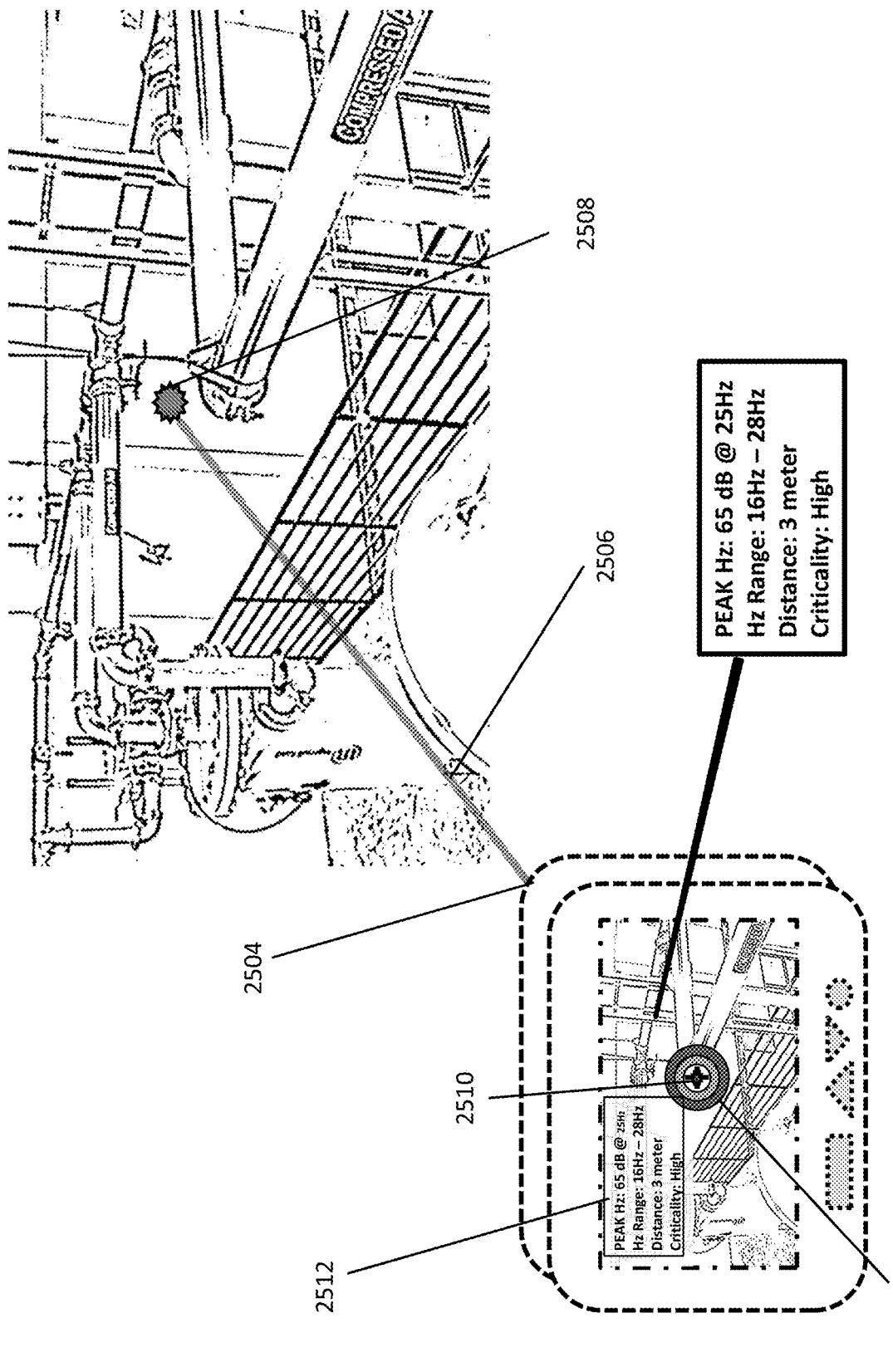
FIG. 25A shows a system including a display in which an indicator within a display image is selected and a laser pointer emitting a laser toward a scene.
Figure 25B:
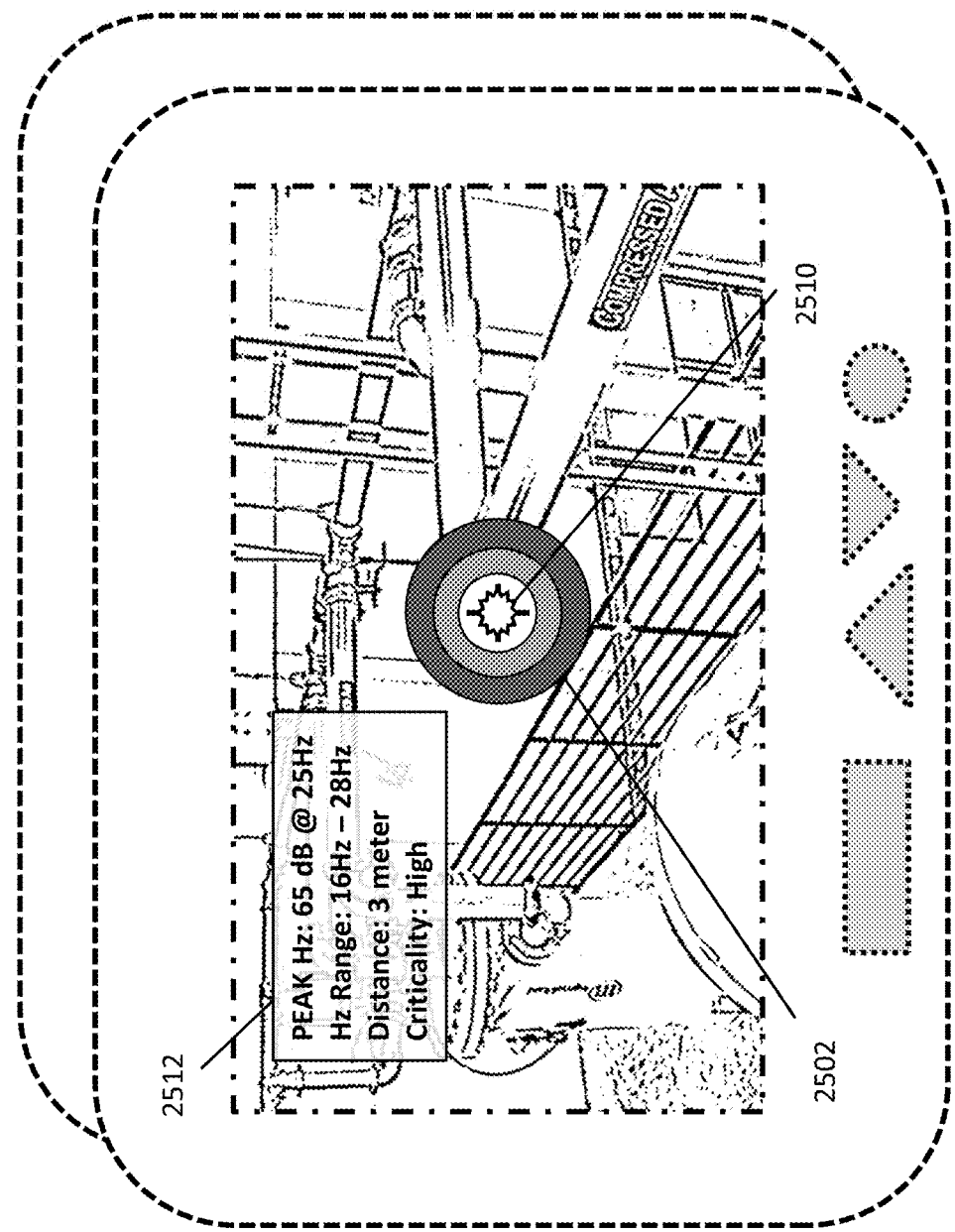
FIG. 25B shows the display shown in the system view of FIG. 25.

As described elsewhere herein, in some examples, systems can include a laser pointer. In some examples, laser pointers can have a fixed orientation, or can have an adjustable pointing, for example, controllable via the processor. In some examples, the system can be configured to aim the laser pointer at a location in the target scene associated with a selected location in an image. FIG. 25A shows a system (in some examples, embodied as a handheld tool) including a display, such as the display shown in FIG. 24, in which an indicator 2502 is selected. A laser pointer 2504 emits a laser beam 2506 toward the scene, wherein the laser creates a laser spot 2508 in the scene corresponding to the location of the selected indicator 2502 in the image. This can help a user visualize the location of the selected and/or analyzed acoustic signals in the environment. In some embodiments, the laser spot 2508 is detectable by an electromagnetic imaging tool, and is visible on the display along with the displayed indicator 2502 and alphanumeric information 2512 including acoustic parameter information. In some examples, the acoustic imaging system is configured to detect or predict the location of the laser in the scene, and provide a visual indication 2510 of the laser location. FIG. 25B shows a display image such as that shown in the system view of FIG. 25A.

In embodiments in which the laser pointer has a fixed orientation, the user can view the display image having a visual indication of the laser location as feedback so that the user can adjust the pointing of the laser to coincide with the selected acoustic signal.

Figure 26:
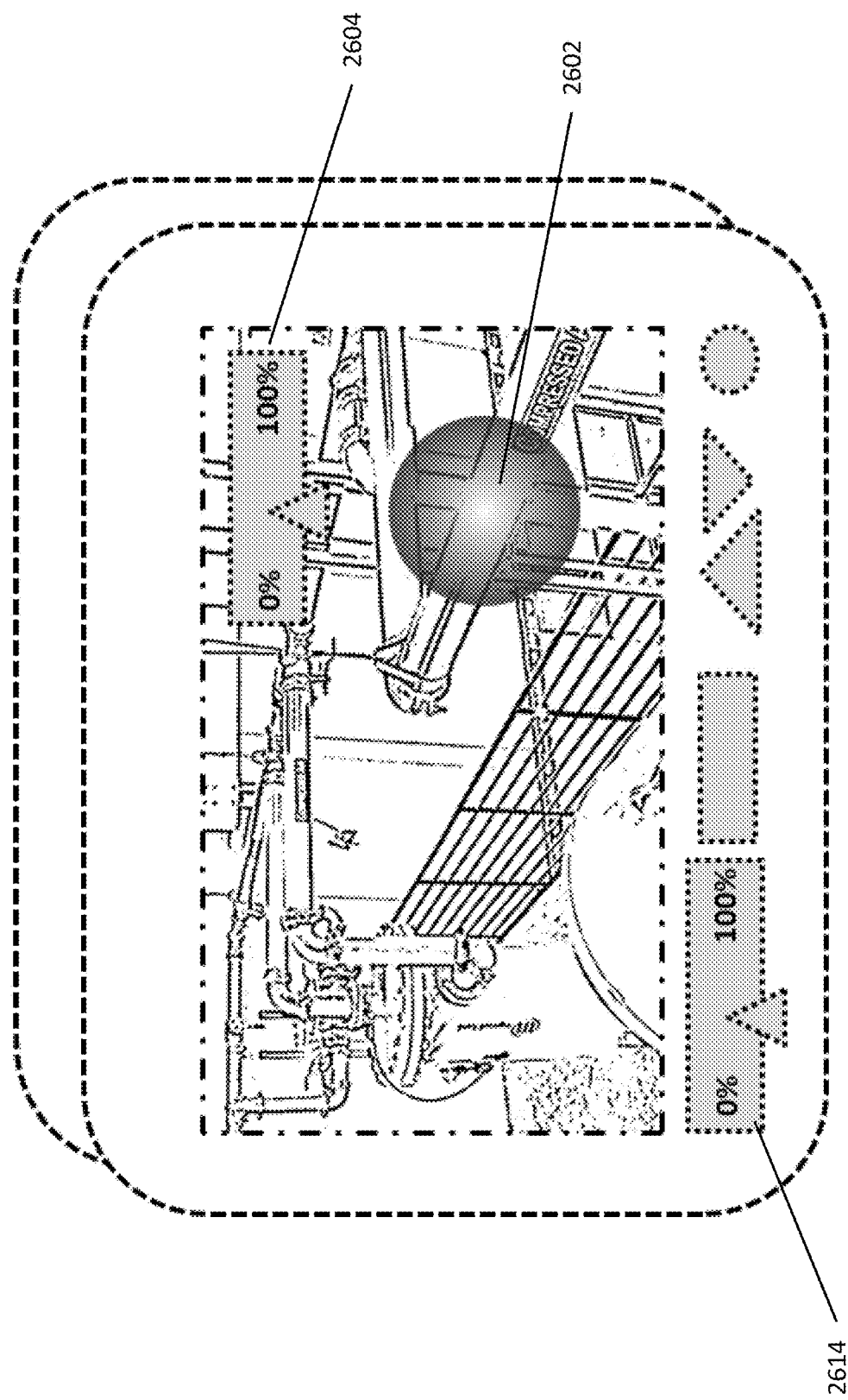
FIG. 26 shows a display image including an indicator having a gradient palettization scheme representing acoustic image data and including acoustic image blending control.

As described elsewhere herein, in some embodiments, acoustic image data can be combined with electromagnetic image data for presentation in a display image. In some examples, the acoustic image data can include an adjustable transparency such that various aspects of the electromagnetic image data are not completely obscured by FIG. 26 shows acoustic image data represented by an indicator 2602 at a location in the scene, wherein the indicator 2602 includes a gradient palettization scheme. A system can include a display device, which can be integral with or separate from an acoustic imaging tool, configured to present display data including electromagnetic image data and acoustic image data.

In some embodiments, the device (e.g., a handheld acoustic imaging tool) can include a physical blending control 2614 (e.g., one or more buttons, knobs, sliders, etc., which can be included as part of a user interface) and/or a virtual blending control 2604, such as via a touchscreen or other virtually-implemented interface. In some embodiments, such functionality can be provided by an external display device, such as a smartphone, tablet, computer, or the like.

Figure 27:
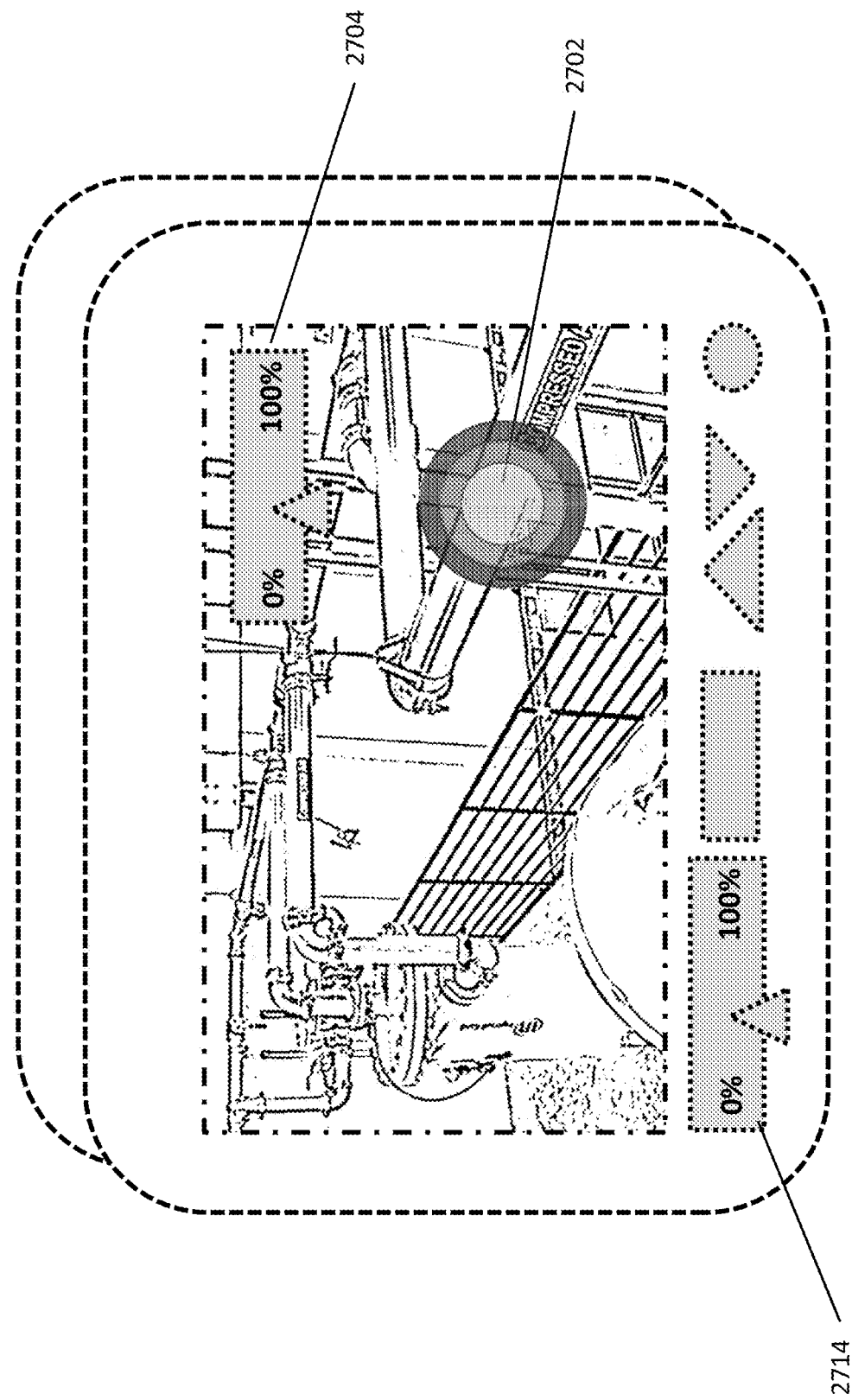
FIG. 27 shows a display image including an indicator having a concentric circle palettization scheme representing acoustic image data and including acoustic image blending control.

FIG. 27 shows a virtual and/or physical blending control tools for a display image including a partially-transparent concentric circle palettization scheme. Similar to as described with respect to FIG. 26, an indicator 2702 can represent an acoustic signal within a scene. An acoustic imaging system can include a physical blending control 2714 and/or a virtual blending control 2704 that can be used to adjust the transparency of the acoustic image data (e.g., indicator 2702) within the display image.

Figure 28:
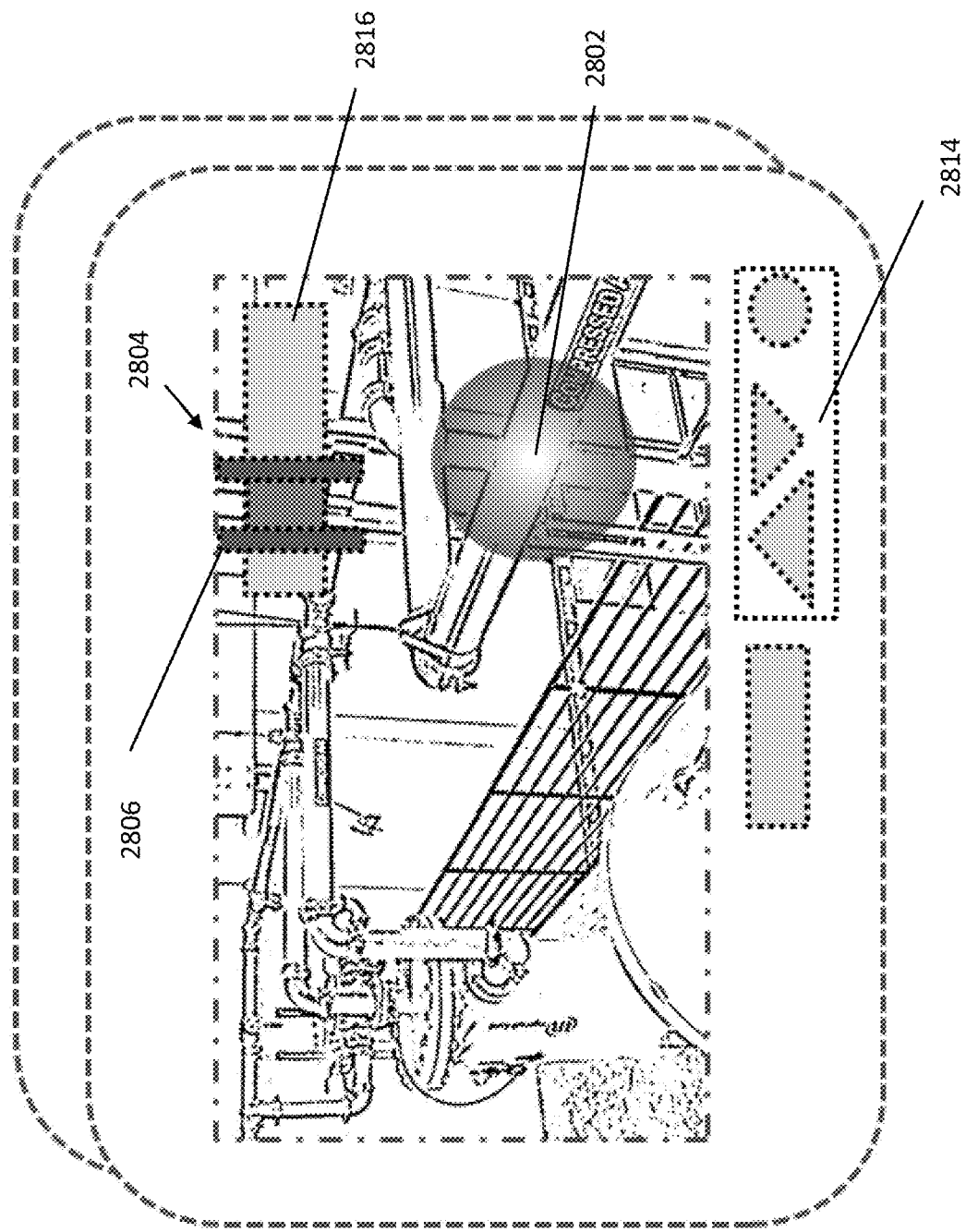
FIG. 28 shows a display image including an indicator having a gradient palettization indicating a location in the scene meeting one or more filter conditions.

Additionally or alternatively, physical and/or virtual interfaces can be used to adjust one or more display parameters. For instance, in some embodiments, one or more filters can be applied to selectively display acoustic image data satisfying one or more conditions, such as described elsewhere herein. FIG. 28 shows a scene including an indicator 2802 having a gradient palettization indicating a location in the scene satisfying one or more filters (e.g., having one or more acoustic or other parameters meeting one or more corresponding thresholds or predetermined conditions). In various examples, the filtering can be selected and/or adjusted via a physical control 2814 (e.g., via one or more buttons, knobs, switches, etc.) and/or a virtual control 2804 (e.g., a touchscreen). In the illustrated example, the filter includes displaying acoustic image data for only those acoustic signals having an acoustic parameter (e.g., frequency) falling within a predefined range 2806 of the acoustic parameter. As shown, the predefined range 2806 is a subset of possible filter ranges 2816. In some examples, a user may adjust the limits of the predefined range 2806, for example, via virtual 2804 or physical 2814 control to adjust the effects of the filter.

Figure 29:
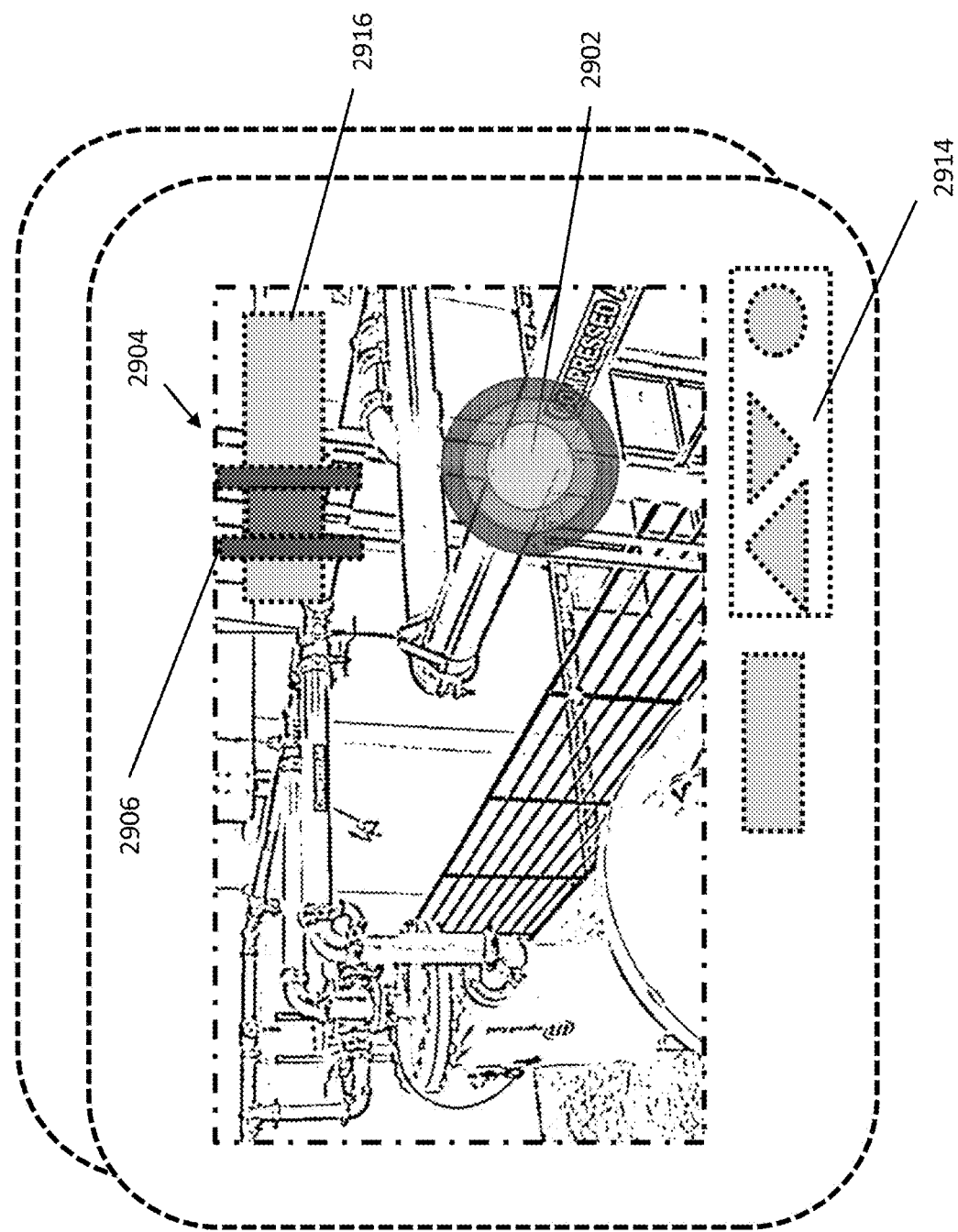
FIG. 29 shows a display image including an indicator having a concentric circle palettization indicating a location in the scene meeting one or more filter conditions.

FIG. 29 shows a virtual and/or physical filter adjustment for a display image including a partially-transparent concentric circle palettization scheme. As shown, indicator 2902 is shown within the scene based on acoustic parameters falling within a predetermined range 2906 of value based on a filter. The filter can be adjustable within a range of values 2916, for example, via virtual 2904 and/or physical 2914 controls.

Figure 30:
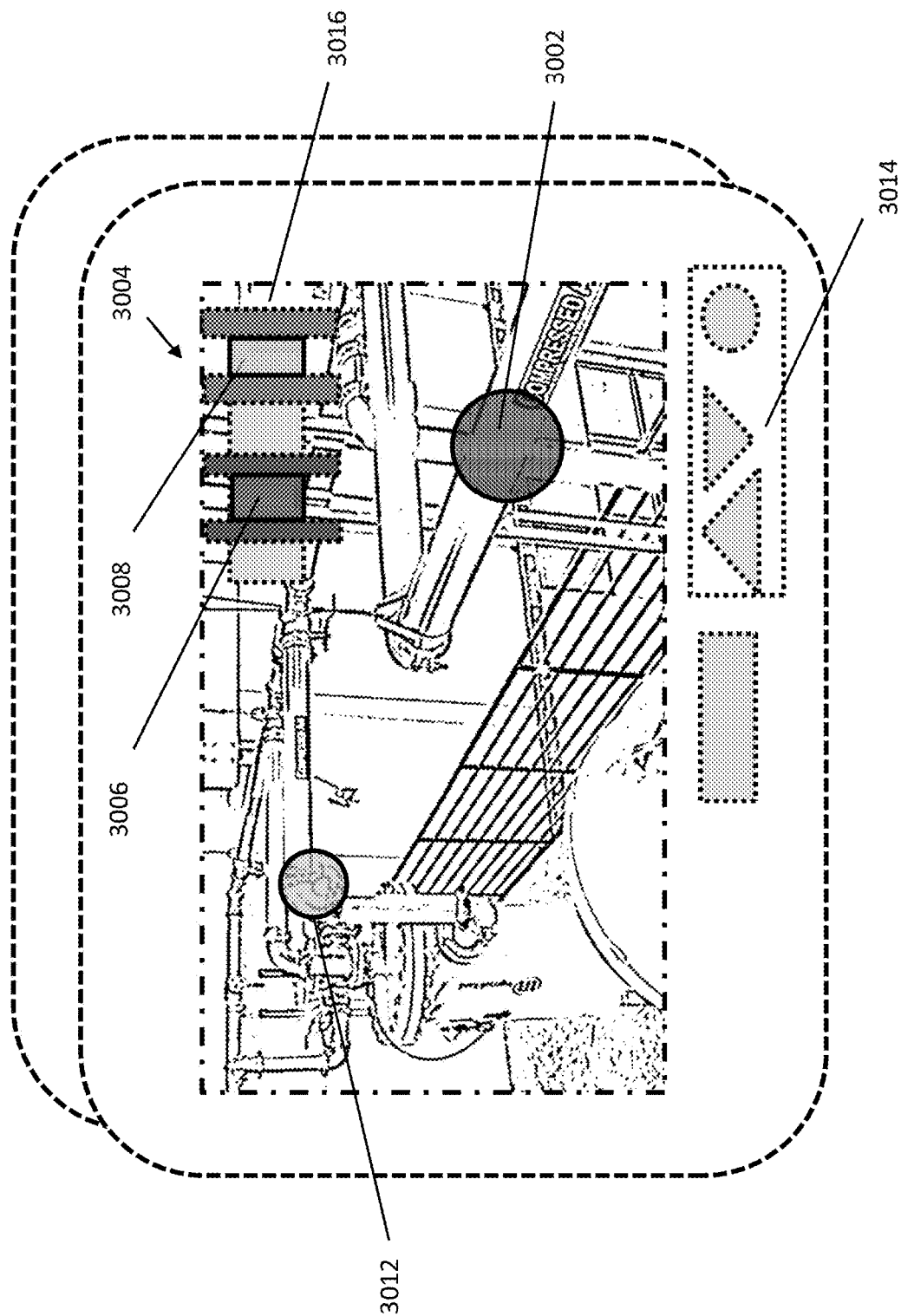
FIG. 30 shows a display image including two indicators, each having a gradient palettization indicating a location in the scene meeting a different filter condition.

In some embodiments, a plurality of filters can be utilized for customizing a display image including palettized acoustic image data. FIG. 30 shows a display image showing a first indicator and a second indicator. As described elsewhere herein, one or more filters can be applied to the display image (e.g., via physical filter controls and/or virtual filter controls) to customize the displayed data. In the illustrated example of FIG. 30, the filtering includes establishing a first filter range 3006 and a second filter range 3008. In some example, filter ranges can be adjustable within a range of values 3016, for example, via virtual 3004 and/or physical 3014 controls.

Such filter ranges can represent any of a variety of parameters, such as frequency, amplitude, proximity, etc. As shown, the first filter range and the second filter range are each associated with a color (which, in some examples, can be adjustable by a user), and indicators 3002, 3012 are positioned at locations in the image at which corresponding acoustic signals meet the one or more filter conditions associated with each filter range. As shown, the first indicator 3002 represents acoustic signals that satisfies the first filter range 3006 (shown in a darker shade), while the second indicator 3012 represents acoustic signals that satisfy the second filter range 3008 (shown in a lighter shade). Thus, a user may be able to quickly identify locations in a scene having acoustic data satisfying a variety of conditions at once, while also identifying which locations satisfy which conditions.

Figure 31:
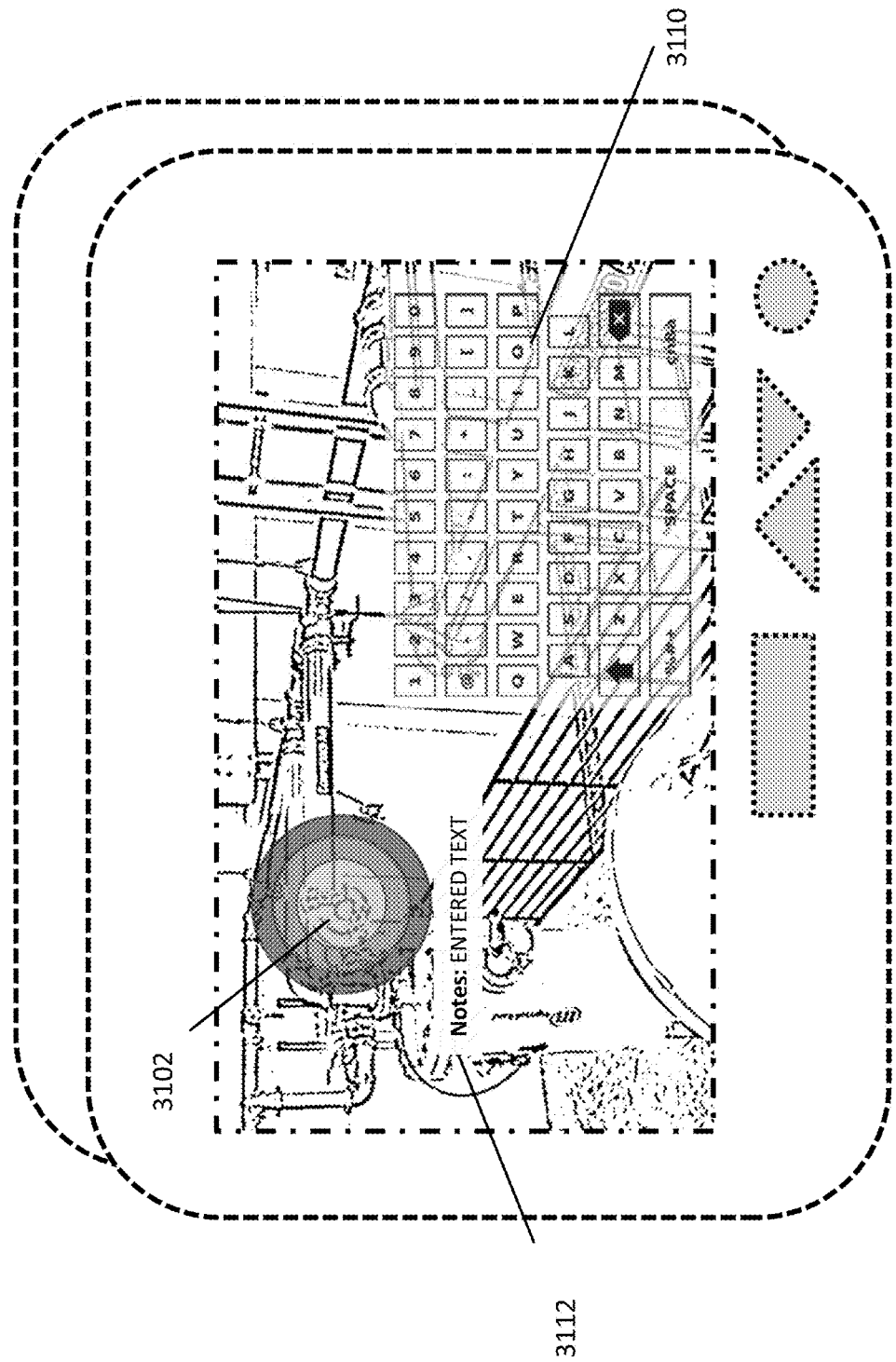
FIG. 31 shows a display interface including a display image and a virtual keyboard.

In some examples, a display device, such as an acoustic imaging tool or an external display device, can include a virtual keyboard as an input device, such as shown in FIG. 31. FIG. 31 shows a display interface including an indicator 3102 representing one or more acoustic parameters of an acoustic signal in the scene. A virtual keyboard 3110 is included in the display, which can be used to add alphanumeric information 3112 to the display image. Utilizing such a virtual keyboard can allow a user to enter customize annotations, such as various inspection notes, labels, date/time stamps, or other data that can be stored with the image. In various examples, the virtual keyboard can be used to add text that is included in the image data and/or is appended to the image data, such as by being stored in metadata associated with a display image.

Various devices can be used to present a display image that includes various combinations of acoustic image data and other data, such as alphanumeric data, image data from one or more electromagnetic spectrums, symbols, or the like. In some examples, a handheld acoustic imaging tool can include a built-in display for presenting a display image. In other examples, information to be displayed, or data that is processed for generating a display (e.g., raw sensor data) can be communicated to an external device for display. Such external devices can include, for example, a smartphone, tablet, computer, wearable device, or the like. In some embodiments, the display image is presented in combination with real-time electromagnetic image data (e.g., visible light image data) in an augmented realty-type display.

Figure 32:
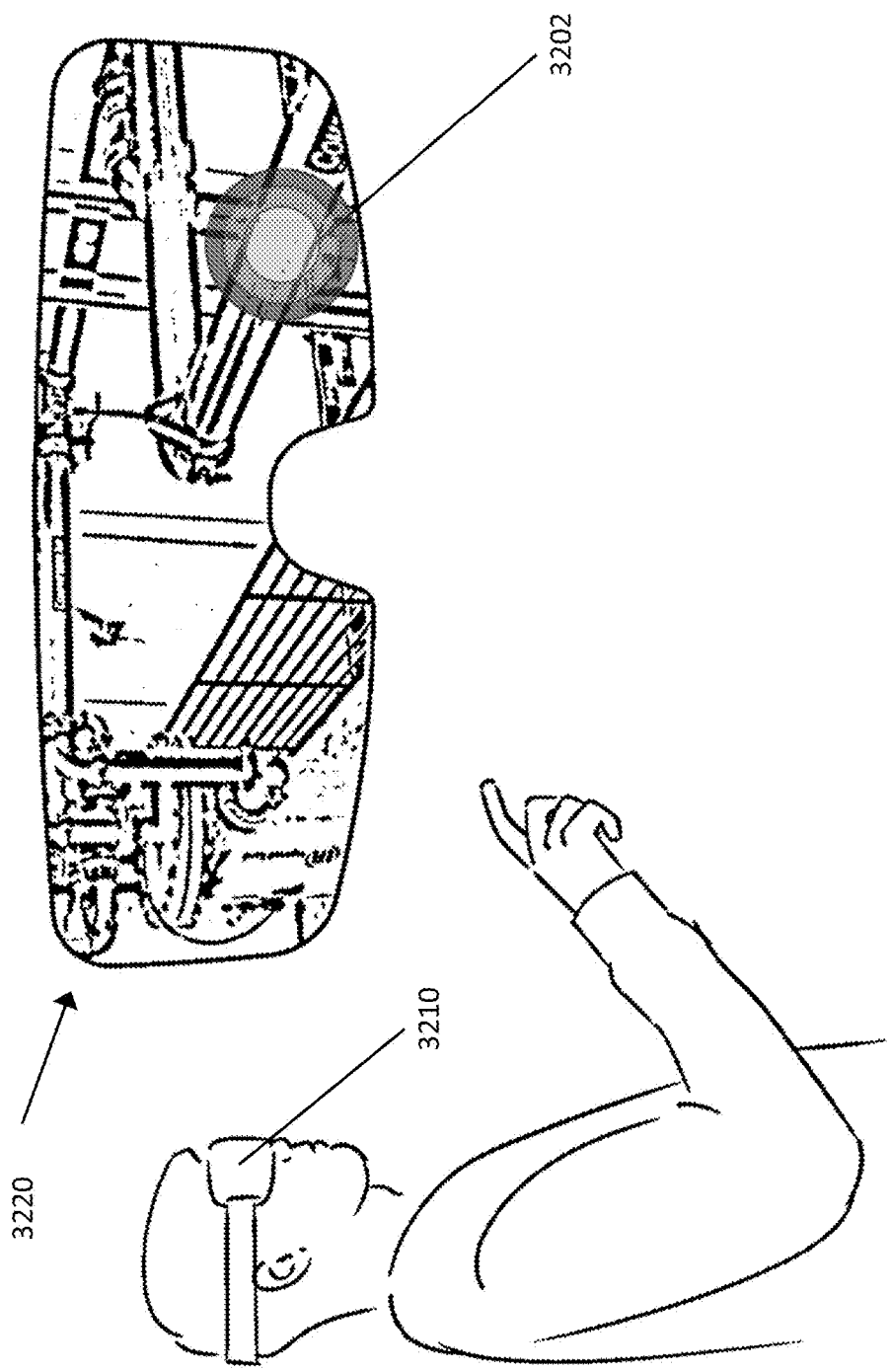
FIG. 32 shows a display embedded into eyewear that can be worn by a user and display a display image.

FIG. 32 shows a display embedded into eyewear 3210 that can be worn by a user. In some examples, eyewear can include one or more embedded imaging tools, such as described in U.S. Patent Publication No. 20160076937, entitled "DISPLAY OF IMAGES FROM AN IMAGING TOOL EMBEDDED OR ATTACHED TO A TEST AND MEASUREMENT TOOL," and assigned to the assignee of the instant application, relevant portions of which are incorporated herein by reference. In some such examples, an integrated display can show a real-time display image 3220. For example, the display can show electromagnetic image data (e.g., visible light image data) representative of the scene toward which the user is facing, and can simultaneously display (e.g., via blending, overlay, etc.) one or more additional data streams, such as acoustic image data (e.g., including indicator 3202) or the like, to provide added information to the user. In some embodiments, eyewear such as shown in FIG. 32 includes a transparent display screen, so that when no display image is provided to the display, a user can view a scene directly with his or her eyes through eyewear rather than being presented with real-time visible light image data. In some such examples, additional data, such as acoustic image data, alphanumeric data, etc., can be displayed on the otherwise-transparent display in the user's field of view so that the user views such data in addition to his or her view of the scene through the display.

As described elsewhere herein, in various examples, various data presented in a display image can be combined in a variety of ways, including blending with other data streams (e.g., blending acoustic image data with visible light image data). In some examples, the strength of the blending can vary between different locations within a single display image. In some embodiments, a user can adjust the blending ratios of each of a plurality of locations (e.g., each of a plurality of indicators of detected acoustic signals) manually. Additionally or alternatively, blending can be a function of one or more parameters, such as frequency, amplitude, proximity, etc.

Figure 33A:
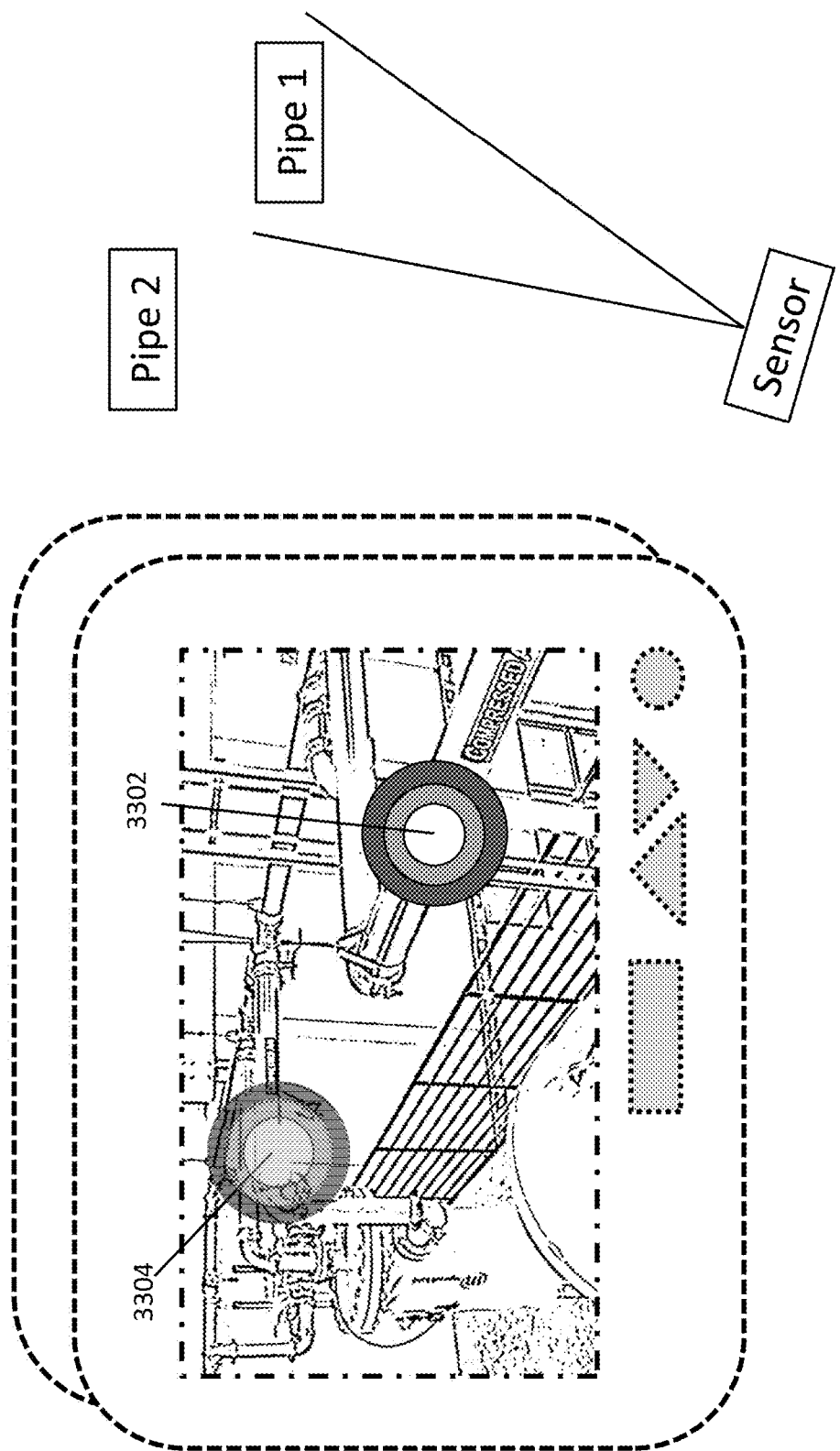
FIGS. 33A and 33B show a dynamic display image including indicators having dynamic intensity based on the pointing of an acoustic sensor array.
Figure 33B:
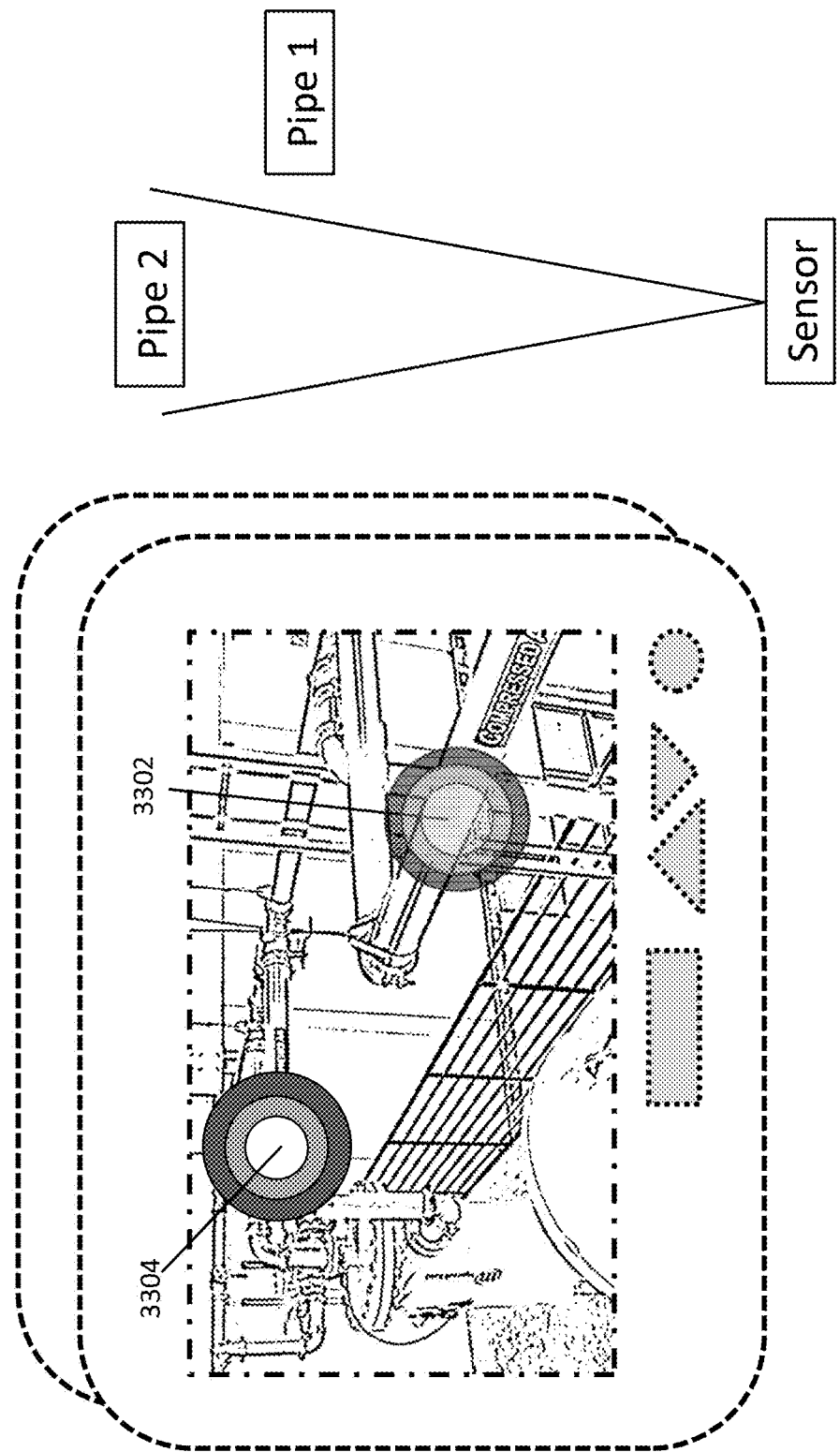

In some embodiments, an acoustic imaging tool can be configured to identify a degree to which the sensor array is pointing at each of a plurality of locations emitting detected acoustic signals and blend corresponding acoustic image data with, for example, visible light image data, accordingly. FIG. 33A shows an exemplary display including a first indicator 3302 and a second indicator 3304 representing acoustic signals in an acoustic scene. In FIG. 33A, the acoustic sensor is pointing more directly at pipe 1, corresponding to the location of the first indicator 3302, when compared to pipe 2, corresponding to the location of the second indicator 3304. As such, in the display scheme of FIG. 33A, the first indicator 3302 is displayed more prominently (e.g., has a higher blending coefficient or a lower transparency) than the second indicator 3304. Conversely, in FIG. 33B the acoustic sensor is pointing more directly at pipe 2, corresponding to the location of the second indicator 3304, when compared to pipe 1, corresponding to the location of the first indicator 3302. As such, in the display scheme of FIG. 33B, the second indicator 3304 is displayed more prominently (e.g., has a higher blending coefficient or a lower transparency) than the first indicator 3302. In general, in some embodiments, an acoustic imaging system can determine a metric indicative of the degree to which the sensor is pointed at a given location (e.g., corresponding to an indicator in the acoustic image data) and adjust the blending ratios corresponding to such locations accordingly (e.g., the greater the degree of pointing corresponds to a higher blending ratio).

In some examples, the processor can save sound profiles detected in a scene. For instance, in an exemplary embodiment, a user can save detected acoustic data (e.g., displayed as acoustic image data) as a sound profile corresponding to one or more parameters. In some such examples, such a sound profile can be labeled according to and/or associated with one or more characteristics of the scene, such as the presence of an air leak, etc. Additionally or alternatively, predefined sound profiles can be loaded into a system memory during factory assembly of an acoustic imaging system and/or can be downloaded to or otherwise communicated to an acoustic imaging system.

In some examples, sound profiles can comprise one or more sounds present in a scene. Various sound profiles can be defined by one or more acoustic parameters, such as frequency, decibel level, periodicity, distance, or the like (e.g., an exemplary sound profile can include a frequency value within a predetermined range and a periodicity within a predetermined range associated with that profile). Sound profiles can be defined by one or more sounds in a scene, and in some examples, each of a plurality of sounds can be defined by one or more parameters, such as frequency, decibel level, periodicity, distance, or the like. Multiple sounds in a given profile can be identified by like parameters (e.g., two sounds each having a respective frequency range and periodicity range) or can be identified by different parameters (e.g., one sound having a corresponding frequency range and another sound having a corresponding decibel level range and maximum distance value).

In some examples, the system can be configured to provide notifications regarding a sound profile, such as if one or more sounds in an acoustic scene correspond to a known sound profile. For instance, a notification can alert a user or technician of a recognized sound profile. Additionally or alternatively, the system can be configured to annotate acoustic image data, electromagnetic image data, and/or a display image based on a recognized sound profile. Notifications can include an audible sound, visualization on the display screen, an LED light, or the like.

In some examples, a system processor can be configured to analyze the criticality of an acoustic signature, for example, in view of one or more sound profiles. Correspondence between acoustic data (e.g., with respect to a sound profile) and criticality of system operation can be learned, for example, based on machine learning and/or user inputs.

In some examples, a processor can be configured to compare data in an acoustic scene to one or more known sound profiles patterns to analyze the scene, for example, for criticality of a detected signature. In various examples, the processor can be configured to notify a user based on potentially criticality. This can be based on, for example, comparing an identified acoustic signature to one or more stored baselines, relative values compared to user-defined thresholds, and/or values determined automatically, such as via machine learning algorithms and/or artificial intelligence programming (e.g., based on historical performance and errors and corresponding historical acoustic signatures).

In various such examples, the processor can be configured to analyze an acoustic scene relative to one or more sound profiles and estimate the impact of the discovered sound profile on the scene or object in the scene. Estimating the impact can include the potential criticality of the sound profile and/or the potential cost or loss of profit associated with the acoustic signature. In some examples, a system (e.g., via a processor) can be configured to recognize one or more air leaks in a scene (e.g., by comparing an acoustic signature to one or more sound profiles associated with air leaks in an acoustic scene). In some such examples, a system can automatically calculate and/or report various data, such as a detected number of air leaks, severity of one or more such air leaks, and/or an estimated cost savings associated with repairing such one or more leaks. In some examples, cost estimates can be based on pre-programmed values and/or user input values associated with detected leaks. In an exemplary application, a system can be configured to determine a cost impact of a compressed air leak per unit time (e.g., per hour) if not properly remedied.

In an example, an acoustic imaging system can be configured to determine various information regarding an air leak in an acoustic scene, such as a pressure, orifice diameter, or leakage rate. In some examples, one or more such values can be entered by a user, and the remaining value(s) can be calculated. For example, in an example, a user may enter a pressure value associated with a particular air line, and using the input pressure information, the system can be configured to determine an orifice diameter and leak rate based on acoustic data from the scene. Such determinations can be performed using, for example, a lookup table and/or equation stored in memory.

In an example scenario, a detected sound profile can be associated with an air leak at 100 PSIG through a ¼" diameter orifice. In some embodiments, an acoustic imaging system with access to such a stored sound profile can be programmed to recognize such a profile in an acoustic scene and estimate a cost per time associated with such a leak, for example, based on a lookup table. In a similar example, a detected sound profile can be associated with a ¼" diameter orifice based on an entered (e.g., via manual input) pressure of 100 PSIG. An acoustic imaging system with access to such a stored sound profile can be programmed to recognize such a profile in an acoustic scene and estimate a cost per time associated with such a leak, for example, based on a lookup table.

In some examples, an acoustic imaging system can be configured to perform a cost-savings analysis for fixing a plurality of detected leaks based on an equation and/or a lookup table. In some examples, such an equation and/or lookup table can be stored in memory of or otherwise accessible by an acoustic imaging system for performing a cost analysis of an identified leak.

In an example implementation, an acoustic imaging system can be configured to characterize one or more leaks detected in an environment, for example, during an inspection of a scene or facility. Such characterizations can be performed, for example, based on stored acoustic profiles corresponding to such leaks. Detected leaks (e.g., with determined leakage rates) can be used to calculate a cost savings of fixing such leaks. For example, an acoustic imaging system can be used to determine a number of leaks present and the leakage rate associated with such leaks, and calculate a cost savings associated with such leaks.

In an example, cost savings can be calculated by multiplying a number of leaks, leakage rate (cfm), an amount of energy associated with a leak (e.g., kW/cfm), number of operating hours, and cost per energy (e.g., $/kWh), as shown in Equation (1) below:

$$\text{Cost savings (\$)} = \quad (1)$$

$$\text{\# leaks} \times \text{leakage rate } (cfm) \times \text{kW}/cfm \times \text{\# hours} \times \text{\$/kWh}$$

An acoustic imaging system can be used to determine a number of leaks and the leakage rate (e.g., in cfm) associated with such leaks. Other parameters may be preprogrammed into the system (e.g., energy per air generation in kW/cfm), accessed via a database (e.g., current cost of energy in $/kWh), or assumed by the system (e.g., an average number of operating hours). A system can be programmed to calculate a cost savings associate with fixing such leaks.

In an example, a system has 100 leaks of 1/32" at 90 PSIG, 50 leaks of 1/16" at 90 PSIG, and 10 leaks of 1/4" at 100 PSIG. If assuming 7000 annual operating hours, an aggregate electric rate of $0.05/kWh, and compressed air generation requirement of approximately 18 kW/100 cfm, the cost savings associated with each leak, per Equation (1) is as follows:

Cost savings from 1/32" leaks =

$$100 \times 1.5 \times 0.61 \times 0.18 \times 7000 \times 0.05 = \$5,765$$

Cost savings from 1/16" leaks =

$$50 \times 5.9 \times 0.61 \times 0.18 \times 7000 \times 0.05 = \$11,337$$

Cost savings from 1/4" leaks =

$$10 \times 104 \times 0.61 \times 0.18 \times 7000 \times 0.05 = \$39,967$$

As noted in the example, the savings from the elimination of just 10 leaks of 1/4" account for almost 70% of the overall savings. As leaks are identified, in some example, an acoustic imaging system can be configured to analyze the leaks and identify which leaks yield a higher cost savings if fixed. In some examples, the system can rank or prioritize leaks with a higher cost savings and provide such rank or prioritization to a user. Additionally or alternatively, the system can be configured to provide notifications to a user regarding the cost savings of one or more of the identified leaks.

Figure 34:
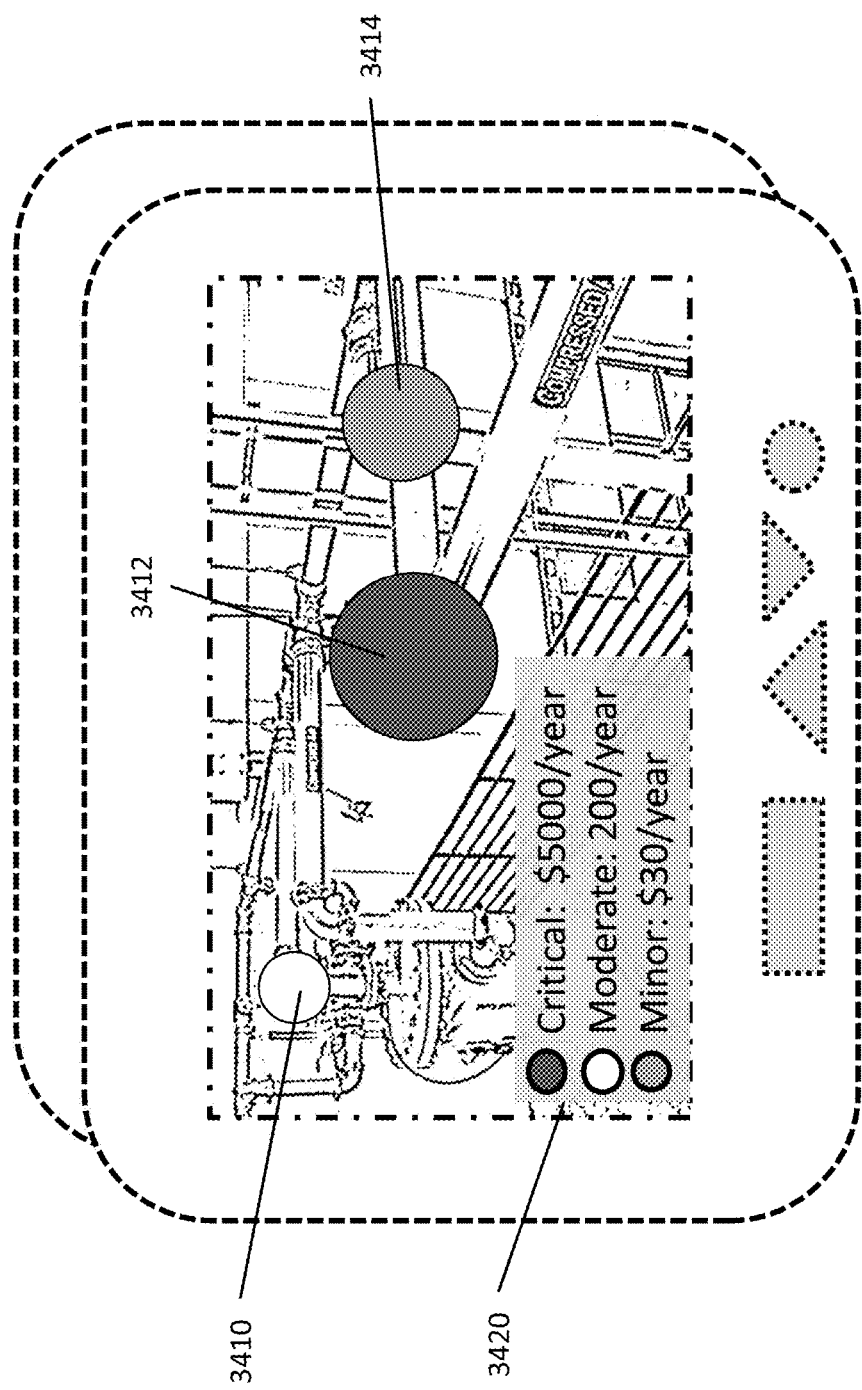
FIG. 34 shows an exemplary display image that provides an indication to a user or technician regarding the potential criticality of and the potential lost cost due to air leaks identified in the scene.

FIG. 34 shows an exemplary display image that provides an indication to a user or technician regarding the potential criticality of and the potential lost cost due to air leaks identified in the scene. In an exemplary embodiment, an acoustic imaging system (e.g., via a processor) detects the presence of leaks in the acoustic scene, for example, via recognition of acoustic signals resembling known sound profiles associated with leaks present in the acoustic scene. The system can be configured to analyze the detected acoustic signals to ascertain the criticality of the identified leaks, for example, by determining one or more sound profiles corresponding to the detected acoustic signals.

As described elsewhere herein, in some examples, acoustic image data can be palettized according to a determined criticality. In some embodiments, criticality of acoustic data can be determined according to one or more sound profiles. For instance, a user may choose a leak detection mode of operation, wherein the acoustic imaging system analyzes acoustic data with respect to one or more sound profiles associated with leaks to determine criticality of acoustic data within a scene.

As described above, a system can be configured to calculate numerical costs associated with one or more leaks, such as by way of one or more equations and/or lookup tables. In an exemplary embodiment, a system can identify, for instance, the size of and pressure associate with a leak based on a sound profile associated with such a leak, and subsequently calculate a cost per unit time associated with such a leak by way of a lookup table and/or equation.

In the illustrated example of FIG. 34, criticality and costs per unit time ($/year) are associated with each of a plurality of locations in an acoustic scene. In the illustrated embodiment, such locations are shown via acoustic image data including a plurality of indicators 3410, 3412, 3414 palettized according to criticality and combined with visible light image data to form a display image that provides leak criticality information to a user for each location. Such criticality can be determined, for example, by analysis of an acoustic scene with respect to one or more corresponding sound profiles as described herein.

In various embodiments, leaks of varying degrees of criticality and/or potential lost cost can be represented with acoustic image data including of various color, shape, size, opacity, or the like. Similarly, one or more icons can be used to represent a specific leak (e.g., corresponding to a specific sound profile) or a range of cost or criticality for the leaks. Additionally or alternatively, alphanumeric information, such as a cost/year or the like, can be included proximate the location of the corresponding leak. The display image of FIG. 34 further includes a notification 3420 showing an approximate cost associated with each level of criticality. Such values can be calculated based on acoustic parameters associated with each acoustic signal detected in the scene, for example, in view of a profile stored in memory representing a particular air leak.

In some instances, additional contextual information is useful or necessary in order to perform a proper analysis and reporting activities of the scene. For example, during some operations, when acoustically imaging a scene, a user or technician may desire to record contextual information about the scene that is being inspected. In previous systems, to perform this task, the user or technician must take photographs with a separate camera or device, take written notes, or record notes using a separate device. Such notes must be manually synchronized with the data from the acoustic imaging device, potentially leading to errors in collection, recollection, and mismatching of data, and potentially leading to errors when performing an analysis or reporting.

In some embodiments, acoustic imaging systems according to the present disclosure can capture acoustic data of a target scene and then associate it with information relating to the target scene. Such information related to the target scene can include details regarding one or more objects in the scene, the surroundings of the scene, and/or surroundings of the location of the scene. In some embodiments, the related information can be captured in the form of images, audio recordings, or video recordings, and associated with acoustic data representative of the scene (e.g., with the acoustic data itself, with a display image including corresponding acoustic image data, etc.). In some examples, the related information is associated with the acoustic data to provide a greater understanding of what the information represents. For example, the related information can include details regarding the target scene or object in the target scene.

In some examples, the systems can include one or more devices to gather information related to an object in a scene or the scene in general. The one or more such devices can include a camera, a positioning device, a clock, a timer, and/or various sensors, such as temperature sensors, electromagnetic sensors, humidity sensors, or the like. In some examples, an acoustic imaging system can include a camera (e.g., embedded into a housing of an acoustic imaging device) that can be configured for image and/or video acquisition to gather annotation information. The such an embedded camera can create photo or video annotations which can be appended to or otherwise saved with the acoustic image data or any other data acquired by the acoustic imaging device.

In some examples, such an embedded camera can be configured to generate electromagnetic imaging data that can be combined with acoustic image data for display, as described elsewhere herein. In some embodiments, the acoustic imaging system can be configured to save a variety of information, such as acoustic data, acoustic image data, electromagnetic image data, annotation data (e.g., sensor data, image/video annotation data, etc.) together with a time stamp. In some examples, acoustic imaging systems can be configured to display and/or record relevant information both on the device and in software at a later time. Relevant information can be displayed on the display and/or saved as metadata, for example, with a saved display image or acoustic image file.

According to some embodiments, through the use of an embedded camera, image acquisition, or video acquisition device in an acoustic imaging system, such a device can be utilized to create photo or video annotations which could be appended to and/or saved with the primary acoustic data, the combined electromagnetic and acoustic image data, and/or any audio recordings.

In some examples, a user or technician can annotate the acoustic image data or other data collected by the acoustic imaging system shown on a display, for example, via a user interface (e.g., a touchscreen, one or more buttons, etc.). For instance, in some examples, a user or technician can use on-display annotations to annotate the data while recording data or during playback of data collected at a previous time.

In some examples, the acoustic imaging system can annotate a display image (e.g., including acoustic image data and/or electromagnetic image data) via on-screen interaction from the system use. In some such examples, the device can save all relevant annotated information with the primary acoustic image data, and forego any need for synchronization or matching of data post hoc. Such implementation can reduce or eliminate human memory-related errors, which could result in incorrect pairing of primary and secondary data.

Various on-display annotations that can be added by a user (e.g., via a user interface) can include, but are not limited to on-display drawings (e.g., freehand), on-display text and writing, on-display shape creation, on-display movement of objects, on-display placement of pre-configured markers, on-display placement of pre-configured text, instructions, or notes, on-display placement of pre-configured shapes, on-display placement of pre-configured drawings or illustrations, on-display placement of pre-configured or programmed icons, or on-display visualization of one or more acoustic parameters.

In some examples, an acoustic imaging device can include a display, which can show collected (e.g., live or previously-collected) acoustic image data and/or electromagnetic image data. A user can annotate such an image via controls or a touch interface integrated into display.

Figure 35:
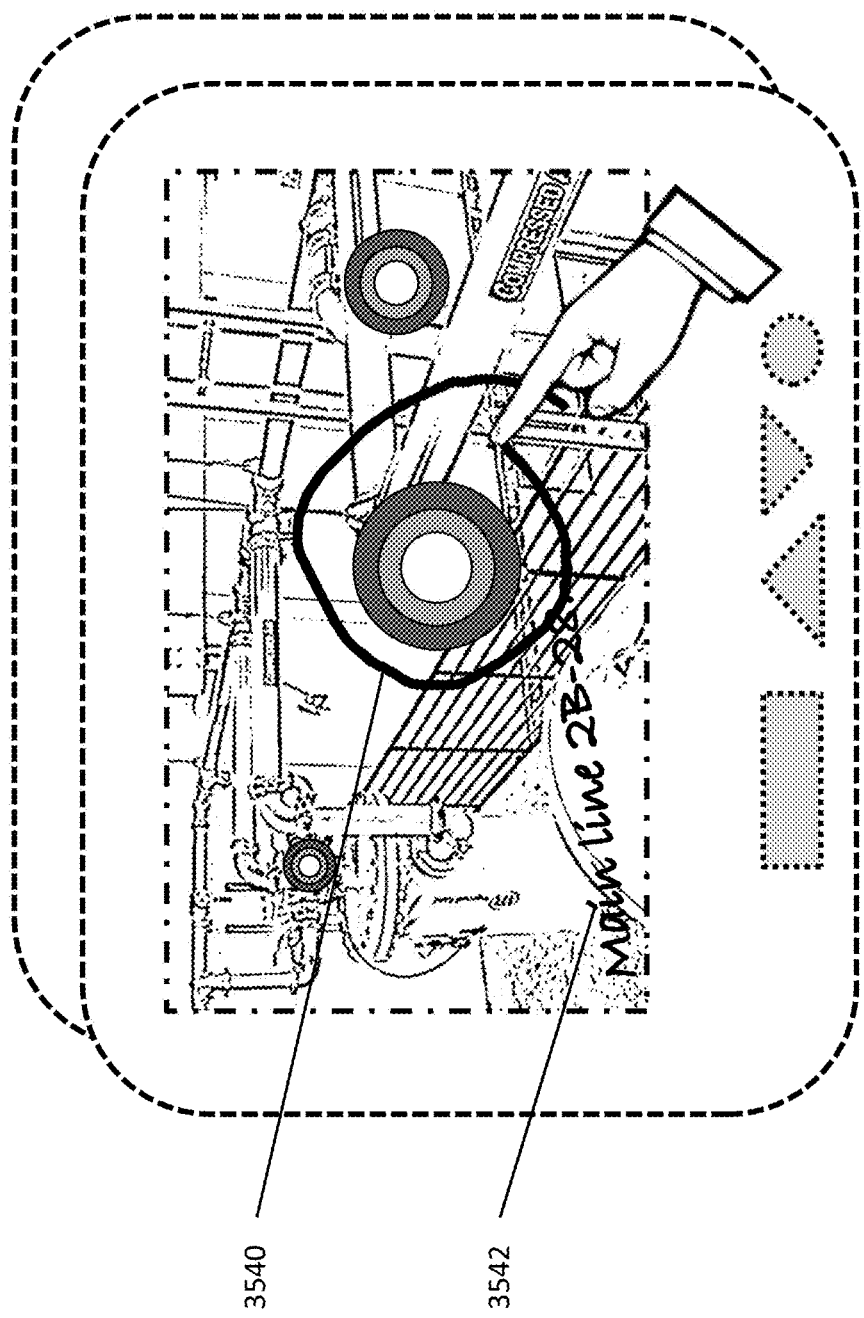
FIG. 35 shows an example of a user annotating the display image with on-display freeform annotations.

FIG. 35 shows an example of a user annotating the display image with on-display annotations. In the example of FIG. 35, three acoustic signals are shown at corresponding locations on the display image via palettized indicators representing acoustic data associated with such acoustic signals. As shown, in some examples, a user can annotate the display image by drawing freeform shapes 3540 in order to highlight or emphasize portions of the display image. In this example, a user annotates the display image by encircling the centermost sound by a freeform drawing 3540. The illustrated example also shows additional annotation information in the form of text 3542 that can be used to identify or describe one or more components in the display image, such as the component associated with the circled sound. For instance, in the illustrated example, a label of the apparent source of the circled sound ("Main line 2B-28") is added to the display image. Such text can be hand-written (e.g., via a touchscreen interface) or typed (e.g., via a virtual keyboard or a physical keyboard in communication with the system).

Figure 36:
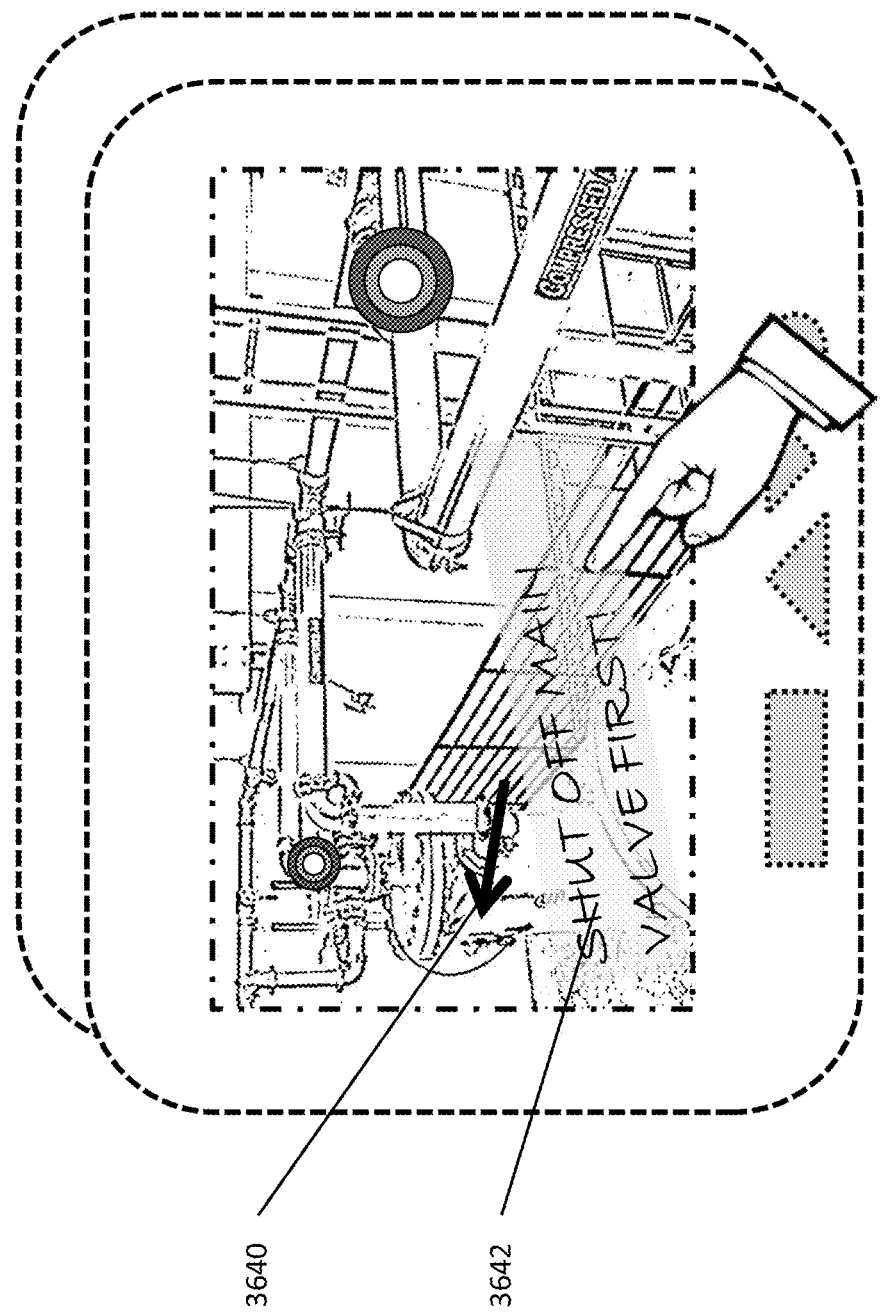
FIG. 36 shows an example of an annotated display image including instructions and relevant location information.

FIG. 36 shows an example of an annotated display image including instructions and relevant location information. In this figure, two sounds are shown on the display image, along with text information and a graphical indication instructing a user of a task to perform. A user can annotate the image as shown in order to instruct or remind a future user to perform one or more tasks while performing an acoustic inspection of such a location.

When generating an annotated image such as that shown in FIG. 36, a user can annotate the display image by inserting a pre-configured marker (e.g., arrow 3640) and/or handwritten text 3642. For instance, in the illustrated example, a user annotates the display image by inserting an arrow 3640 pointed towards a valve switch in the scene and textual instructions 3642 to "shut off main valve first."

Figure 37:
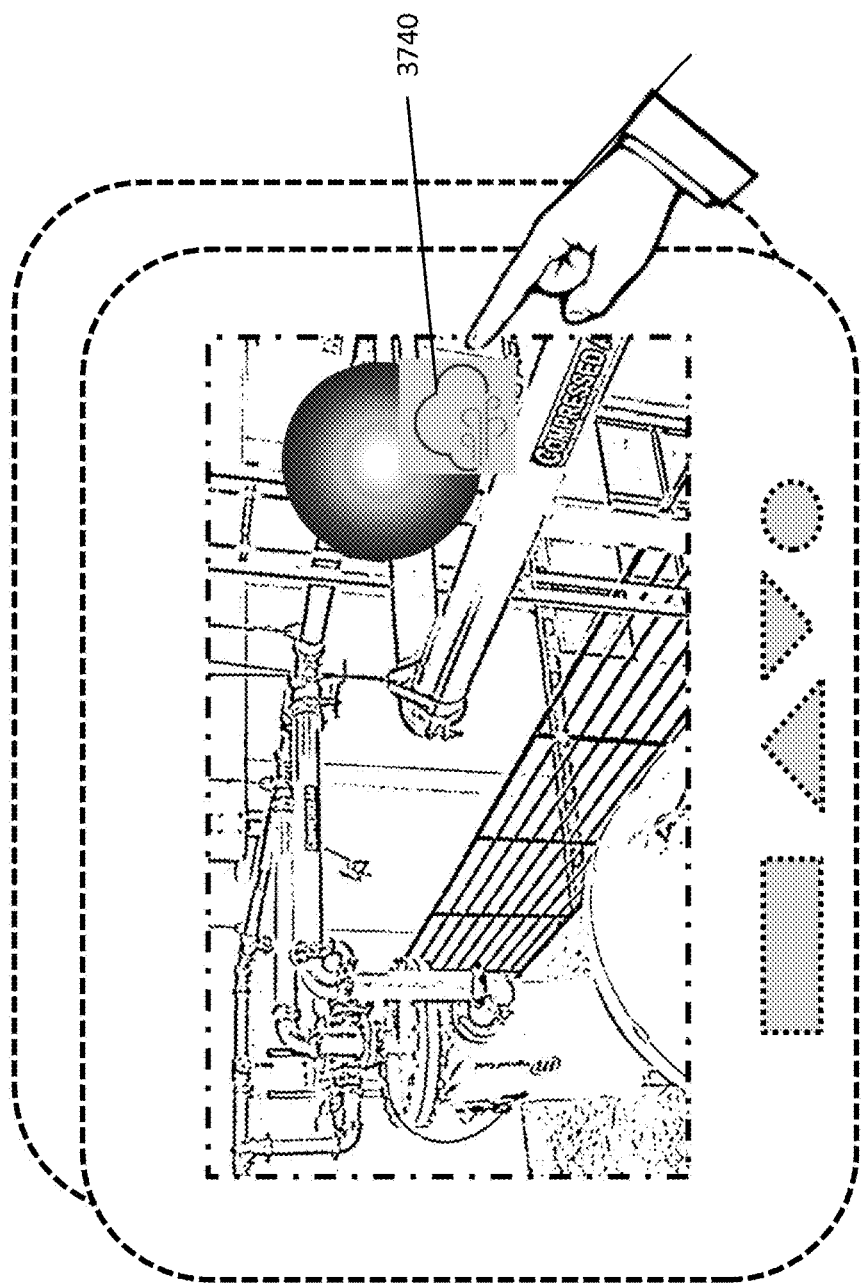
FIG. 37 shows an example of a user annotating the display image with on-display icon annotation.

FIG. 37 shows an example of a user annotating the display image with on-display annotations. In this example, a single acoustic signal is shown via a corresponding indicator on the display image. The illustrated example shows a user annotating the display image by inserting a pre-programed icon 3740 into the display image, such as an air leak icon. Such an icon can be selected by a user and/or recommended by the system based on one or more recognized characteristics sound (e.g., compared to a historical sound profile) and placed by the identified sound. In addition, a user can annotate the image to identify or label a possible source of the observed acoustic signals, such as with a freeform label, a predefined shape, etc.

Figure 38:
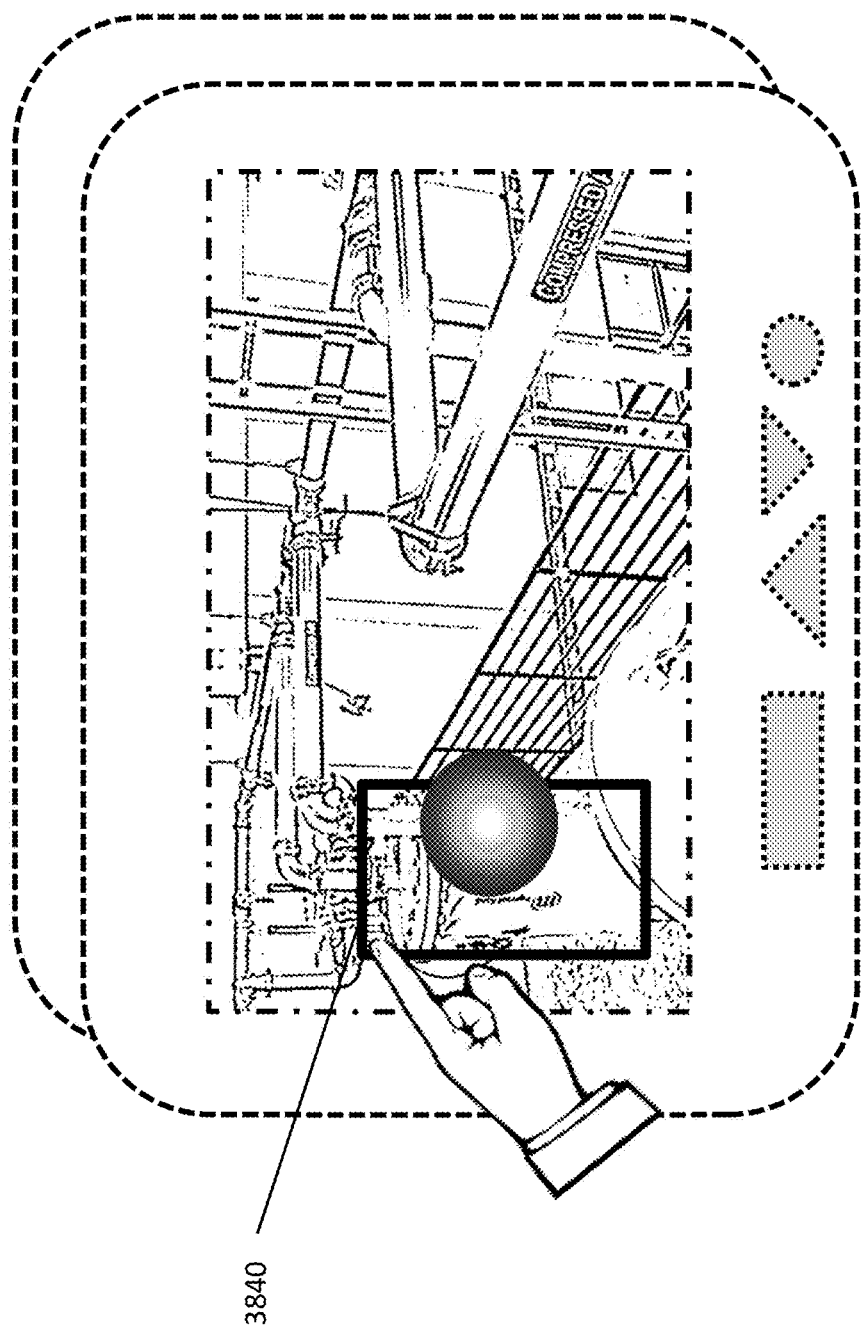
FIG. 38 shows an example of a user annotating the display image with an on-display shape annotation.

FIG. 38 shows an example of a user annotating the display image with an on-display annotation. In this figure, a single acoustic signal is shown via a corresponding indicator on the display image. As shown, a user can annotate the display image by inserting a shape 3840 into the image. In the illustrated example, a user adds a box 3840 around a component on the left-hand side of the display image to show a possible source of the sound from the acoustic image data. Such a box 3840 can be selected as a pre-defined shape (e.g., a positionable and adjustable-size rectangle). Other shapes can be used and can be sized and positioned by a user to annotate the display image as desired.

Figure 39:
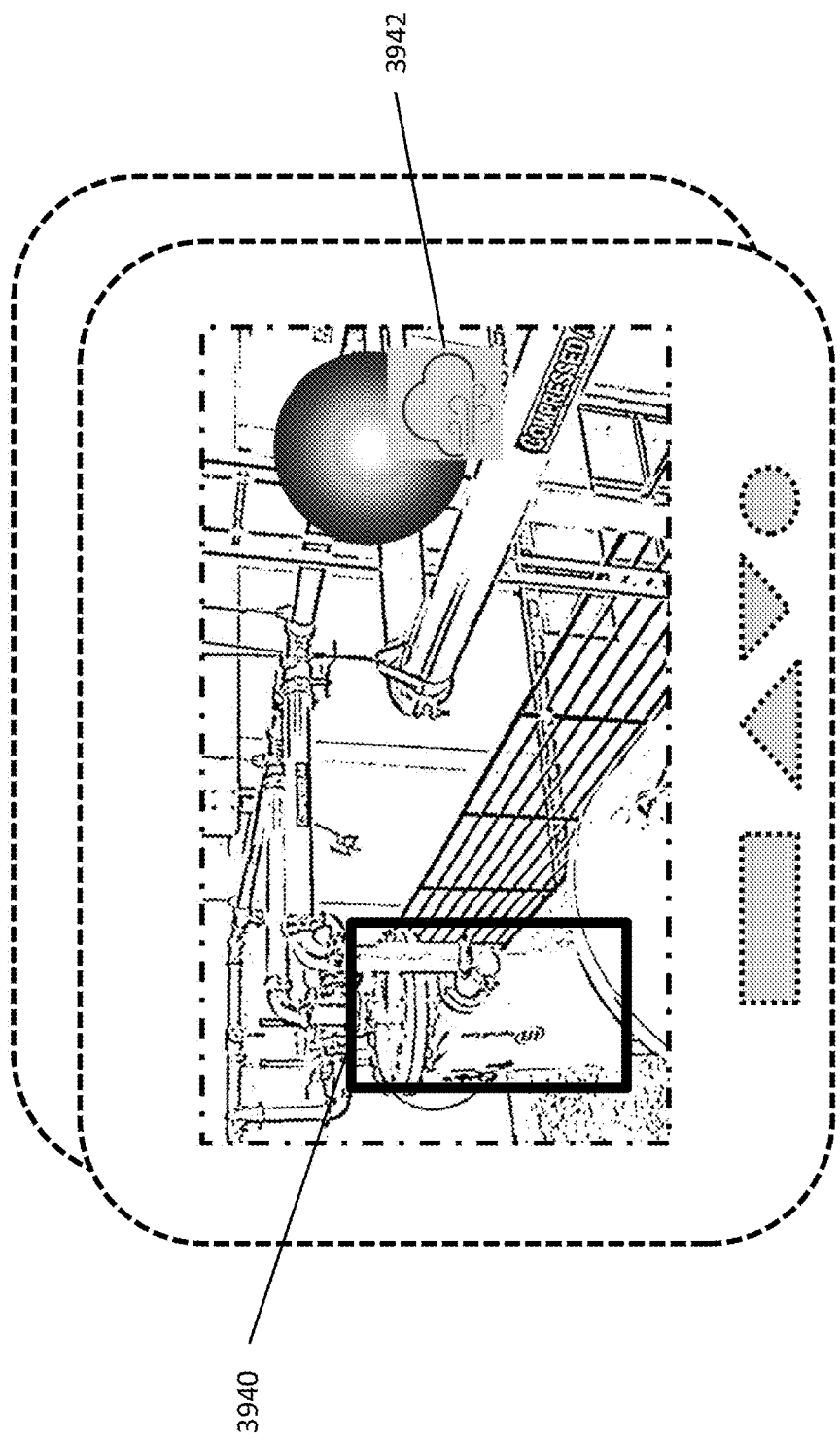
FIG. 39 shows an example of an annotated display image including on-display shape and icon annotations.

In some examples, different types of labels can be combined on a display. For example, FIG. 39 shows an icon label 3942 positioned on a display image proximate an indicator in the acoustic image data representing an acoustic signal within the scene as well as a rectangle 3940 surrounding a component in the scene. Various combinations of annotations are possible. In some embodiments, annotations are added to a display image automatically, for example, when a particular sound profile is recognized in the scene. In some examples, a system may prompt a user to annotate a display image in view of a recognized sound profile.

Additionally or alternatively, in some examples, a user may choose to annotate an image by including visual or textual information representing acoustic parameters associated with an acoustic scene. For example, a user may, via a user interface (e.g., a touchscreen or physical controls), select a particular type of display for showing one or more acoustic parameters associated with the scene. A user may similarly annotate an image to include information regarding a cost or criticality indication associated with a portion of the scene, such as a detected leak.

Annotations can include display features included in a live representation of a display image and/or included in a single captured display image, for example, stored in memory.

As described elsewhere herein, in various embodiments, acoustic imaging devices can employ any number of different methods to display, localize, describe, and analyze detected sounds. Visualization methods could include various types of colored shapes, icons, with various levels of transparency adjustment to accommodate the visible background with which they are displayed. By simplifying parameter controls for acoustic visualizations on the device or making such controls more intuitive, users can more easily achieve better visualization results in less time, and with less training. Various methods of visualization parameter controls can be implemented according to application and user needs. Many of these methods can be tailored to use by specific individual levels of education and training in sound visualization and localization, thus providing a more adaptable device in various types of applications and organizations. As described elsewhere herein, in some examples, a user may choose to annotate a display image by including a particular data visualization scheme in the display image.

Figure 40:
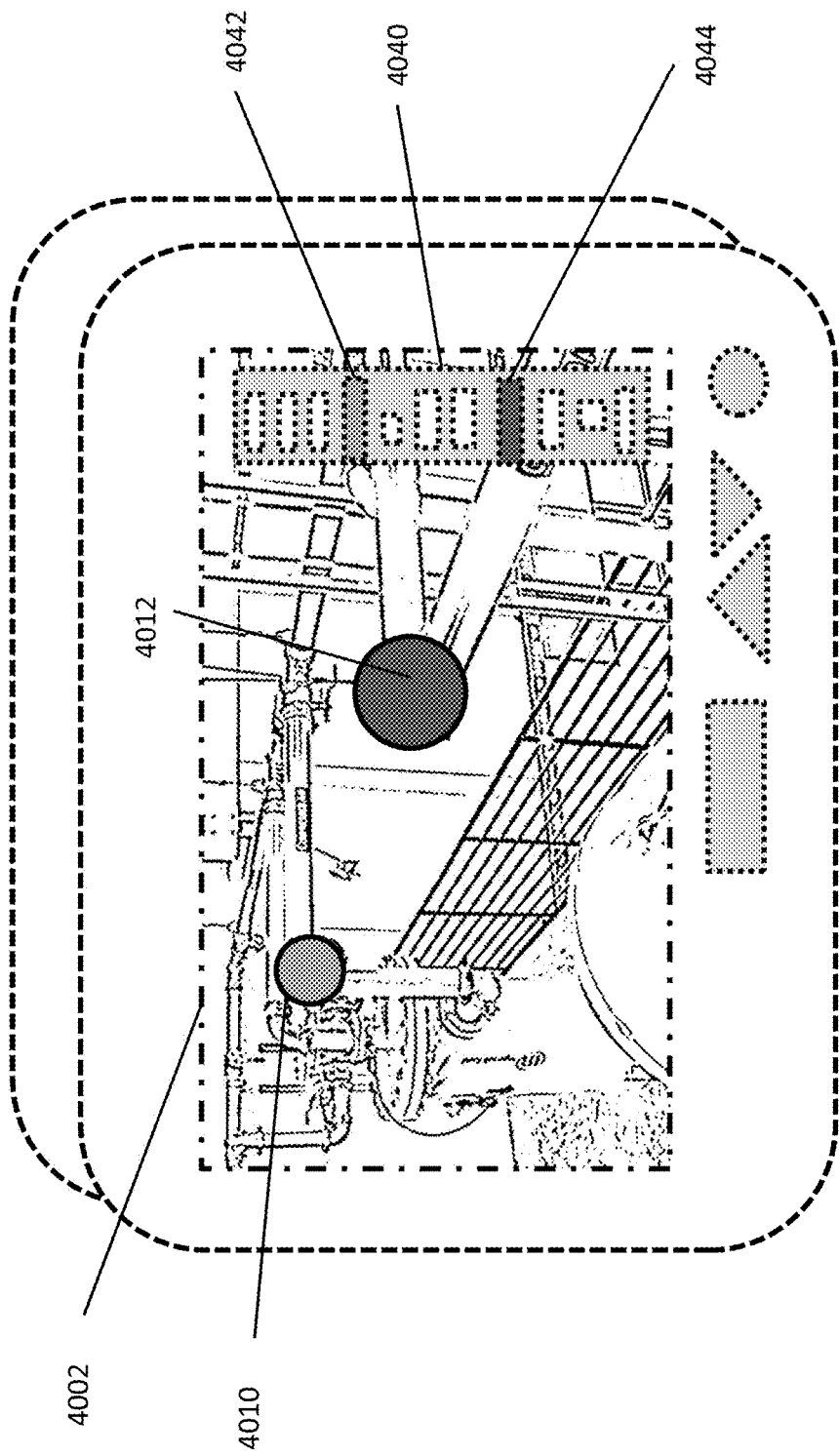
FIG. 40 shows an interface including a display image and a multi-parameter data visualization including plurality of frequency ranges on the right-hand side of the display image.

FIG. 40 shows an interface including a display image 4002 and a multi-parameter data visualization 4040 including plurality of frequency ranges on the right-hand side of the display image. In some examples, a user can select (e.g., via touch screen and/or other interface) one or more frequency ranges from the plurality of displayed frequency ranges, for example, for filtering acoustic image data and displaying acoustic image data having frequency content (e.g., frequency content above a certain magnitude) associated with the selected frequency range(s). In the illustrated example, two frequency ranges 4042 and 4044 are selected. Corresponding indicators 4010 and 4012 in the display image indicate locations in the scene having acoustic signals satisfying the corresponding frequency ranges in the plurality of frequency ranges displayed on the screen. In the illustrated example, frequency range 4042 and corresponding indicator 4010 are shown in a light shade, while frequency range 4044 and corresponding indicator 4012 are shown in a darker shade. In general, in some embodiments, an acoustic signal in the scene meeting a frequency range can be represented via an indicator having a corresponding visual representation as the frequency range.

In general, the frequency ranges can be displayed in a variety of ways, such as a right-hand-justified, left-hand-justified, bottom-justified, or top-justified axis, or a central axis. In various embodiments, the frequency ranges could be broken down into any degree of resolution, including every 1 kHz (e.g., 1 kHz-2 kHz; 2 kHz-3 kHz, etc.) or the like. Such frequency ranges need not all be the same size or span the same range of frequencies. In some examples, the physical size (e.g., width) of the displayed frequency range in the multi-parameter representation 4040 corresponds to one or more parameters, such as a relative amount of frequency content, amplitude of such frequencies in the acoustic scene, proximity of such frequencies, etc.

In various embodiments, frequency ranges could be selected on a virtual control through touch screen interaction and/or on a physical control mechanism, such as a directional pad, where a user could scroll up, down, left, right through button pushes until the desired range bar(s) are highlighted, and then selected. In some examples, multiple ranges could be selected or deselected by the user.

In some embodiments, frequency bars (e.g., 4042, 4044) on the display image 4002 associated with various frequency ranges rise and fall with the decibel level of the range in a real-time display image. In various examples, the decibel level of a range can be determined any number of ways, such as a peak decibel level, an average decibel level, a minimum decibel level, a time-based average decibel level, or the like. In some embodiments, the decibel level associated with each frequency range can be tracked over time. Tracking over time can include saving frequency information at each of a plurality of times, such as at a given interval. Additionally or alternatively, tracking frequency data over time can include tracking the peak decibel level observed at each frequency range over time (e.g., over a specific duration, operating session, etc.). Peak levels can be calculated in a variety of ways.

Figure 41:
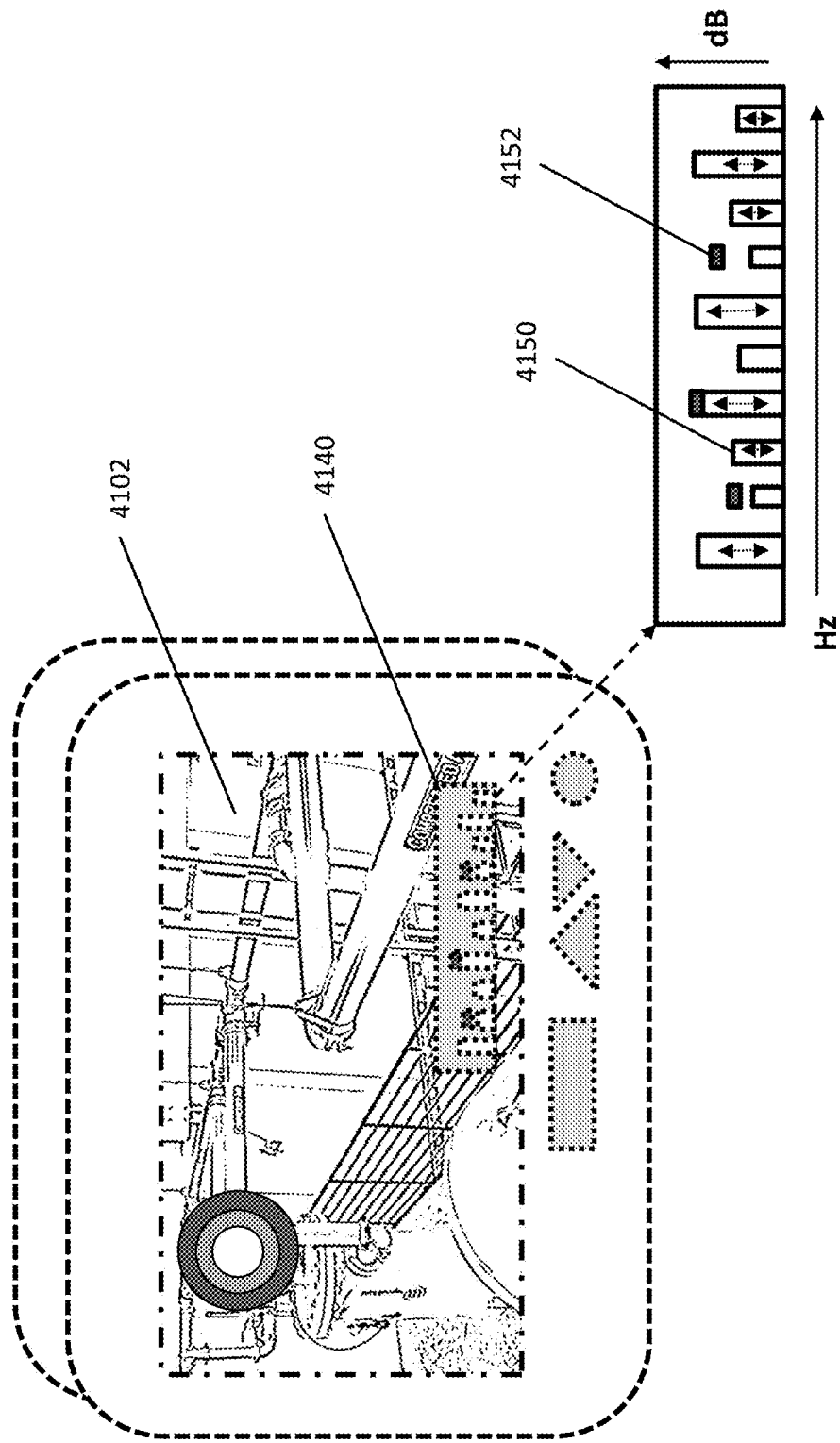
FIG. 41 shows an interface including a display image and a multi-parameter representation of frequency information, including plurality of frequency ranges positioned along a lower edge of the display image.

The display of frequency information can include, in addition to current/recent frequency information, peak frequency data. FIG. 41 shows an interface including a display image 4102 and a multi-parameter representation 4140 of frequency information, including plurality of frequency ranges positioned along a lower edge of the display image. As shown in FIG. 41, frequency information, displayed on the bottom of the display image, includes amplitude information (e.g., 4150) (measured in decibels in the example of FIG. 41) for a plurality of frequency ranges. In some examples, maximum decibel levels are displayed in one or more frequency ranges. In some cases, the frequency ranges showing the maximum decibel levels are selectable by a user. Peak markers 4152 can remain on the multi-parameter representation 4140 indicating the maximum decibel level, and can be represented in any number or possible ways, such as contrasting colors, bar caps, arrows, symbols, or numeric values. In some examples, the maximum decibel levels shown in the data visualization include a maximum value detected over a period of time, such as within the past 5 seconds, within the past 30 minutes, since the start of a selected measurement, or the like. In some examples, a user can reset the maximum value display so that previous maximum values are disregarded.

In various embodiments, the frequency bands included in the display image can be adjusted by the user, or can be automatically determined by the device with programmed algorithms or machine learning. In various examples, frequency bands can be equally sized and distributed, can be of different sizes, can be histogram equalized, or determined by any number of combined methods.

Figure 42:
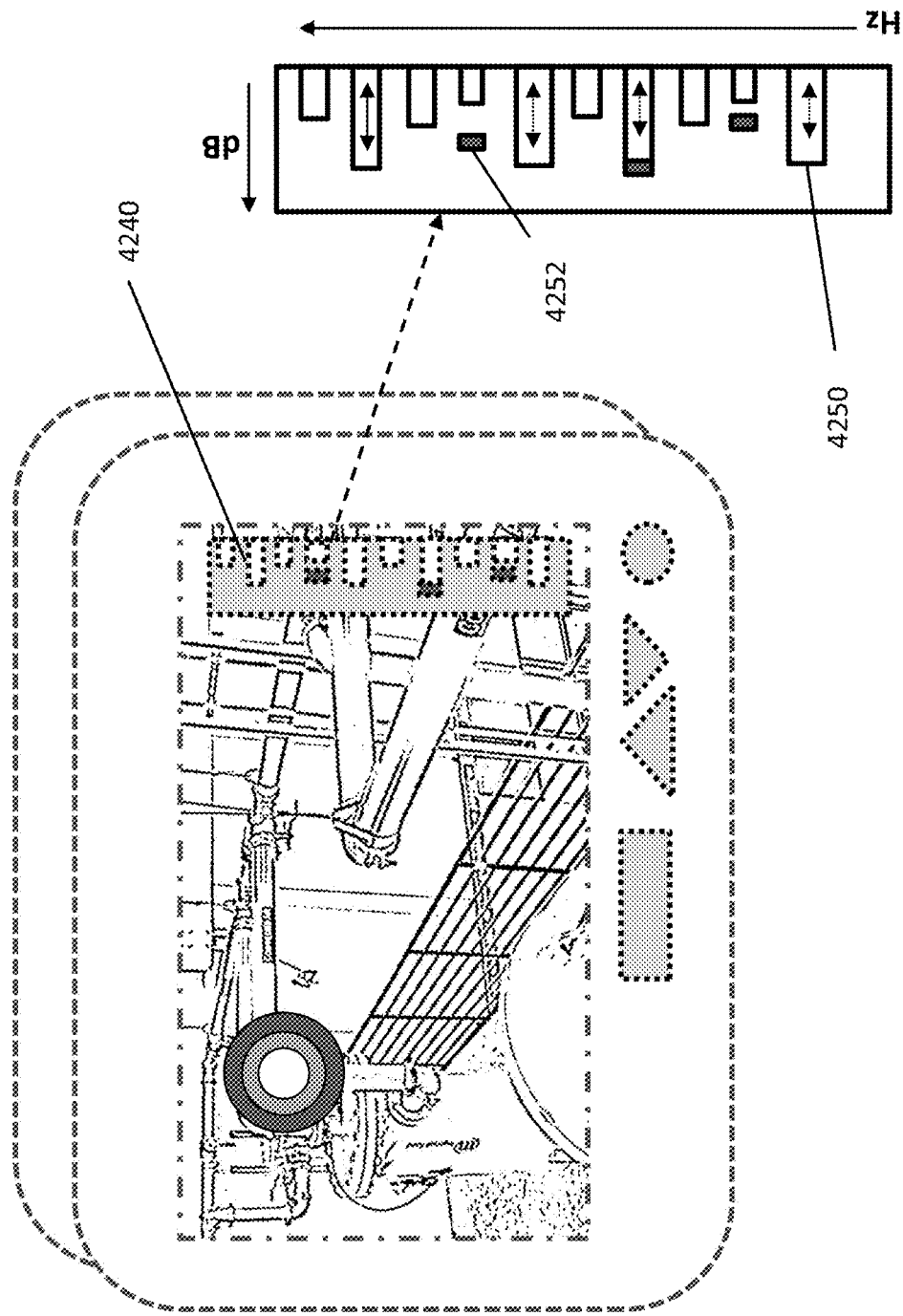
FIG. 42 shows a display image including frequency information for a plurality of frequency bands and peak values for a plurality of frequency bands.

FIG. 42 shows a display image including frequency information for a plurality of frequency bands and peak values for a plurality of frequency bands similar to shown in FIG. 41. In the example of FIG. 42, a multi-parameter representation 4240 including intensity and frequency information is shown on the right-hand portion of the screen, and the amplitude information (e.g., 4250) is shown horizontally with a right-justified axis. Similar to FIG. 41, the multi-parameter representation 4240 includes peak markers 4252 indicating peak amplitudes for one or more frequency ranges over a period of time.

In some examples, decibel levels increase to the right and to the left of a central axis, for instance, in a mirror image. Similarly, decibel level peaks also can appear in a mirror image.

Figure 43:
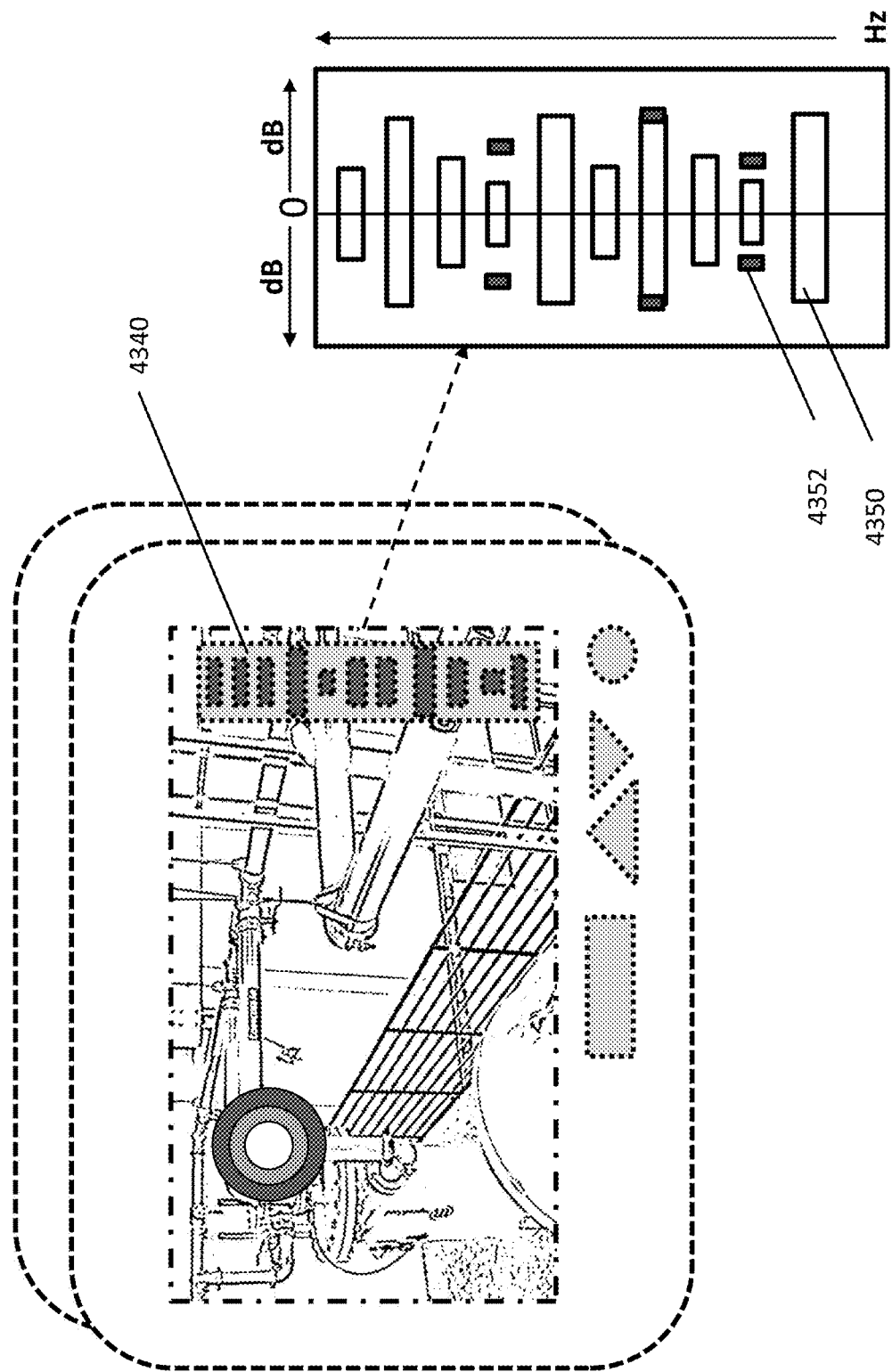
FIG. 43 shows a display image including a multi-parameter representation showing intensity information for a plurality of frequencies.

Such a mirrored decibel information with respect to a central axis is shown in FIG. 43. The display image of FIG. 43 includes multi-parameter representation 4340 showing intensity information for a plurality of frequencies. Such a mirror axis representation can allow the user to better identify small changes or low decibel level changes, which may be important in frequency range selection.

Similar to FIGS. 41 and 42, the multi-parameter representation 4340 of FIG. 43 includes peak markers 4352 indicating peak amplitudes for one or more frequency ranges 4350 over a period of time.

Figure 44:
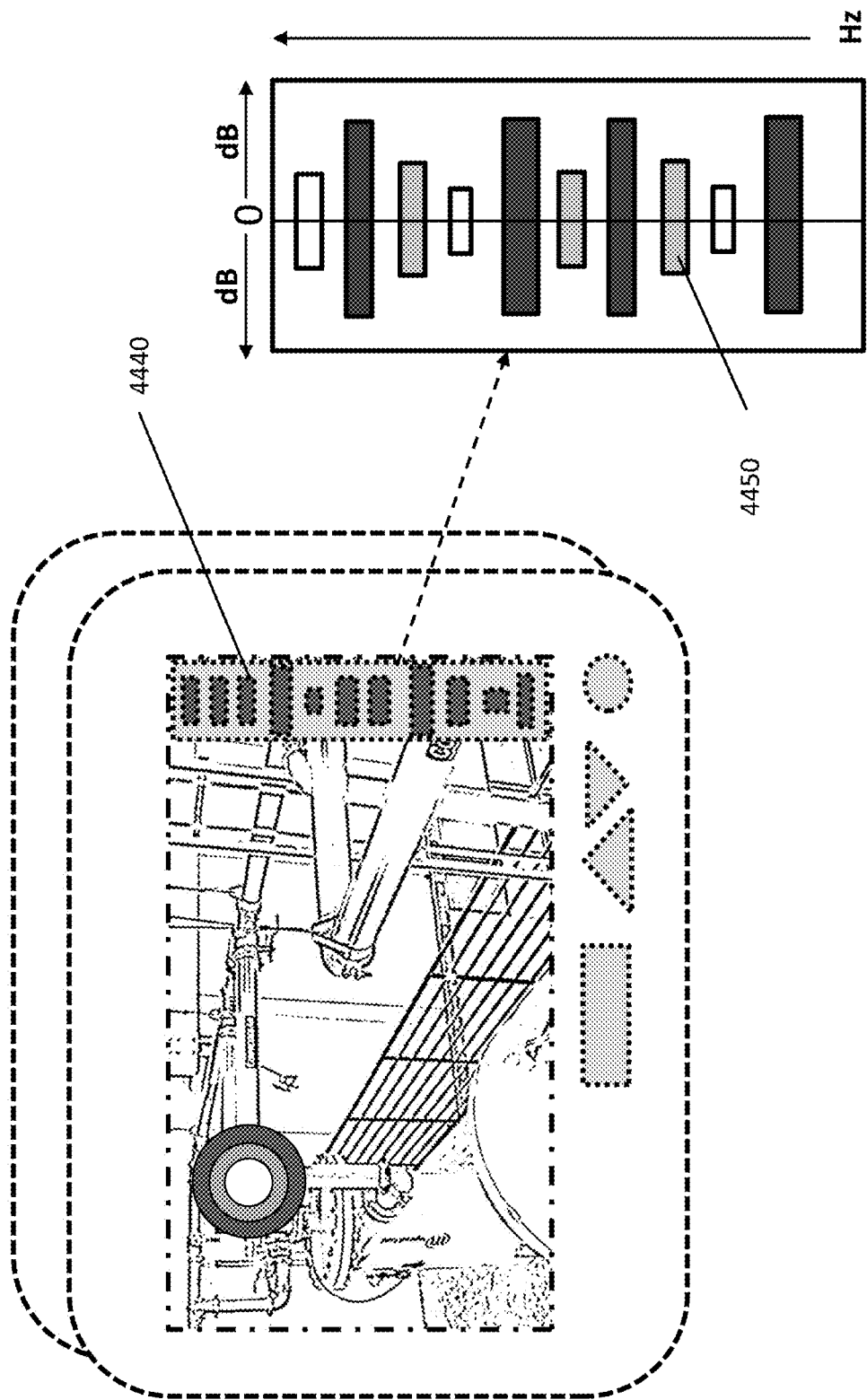
FIG. 44 shows a multi-parameter representation including palettized set of frequency ranges, wherein the palettization represents a decibel range into which each frequency range falls.

In some embodiments, one or more frequency ranges can be palettized to indicate additional information regarding such frequency ranges, such as decibel levels in such frequency ranges. FIG. 44 shows a multi-parameter representation 4440 including palettized set of frequency ranges, wherein the palettization represents a decibel range into which each frequency range falls. For instance, in an exemplary embodiment, frequency ranges (e.g., 4450) shown in white fall within 0-20 dB, frequency ranges shown in a light gray (e.g., 4450) fall within 21-40 dB, and frequency ranges shown in a dark gray fall within 41-100 dB. In some examples, the palettization corresponds to relative values rather than absolute values, for example, wherein frequency ranges shown in white are considered to have "low" intensity, frequency ranges shown in light gray are considered to have "moderate" intensity, and frequency ranges shown in dark gray are considered to have "high" intensity. In an exemplary embodiment, the bottom third of frequency ranges, in terms of intensity, are labeled white, the middle third of frequency ranges, in terms of intensity, are labeled light gray, and the highest third of frequency ranges, in terms of intensity, are shown in dark gray. In another example, frequency ranges having intensity up to one third of the maximum intensity are shown in white, frequency ranges having intensity between one third and two thirds the maximum intensity are shown in light gray, and frequency ranges having intensity between two thirds of the maximum intensity and the maximum intensity are shown in dark gray. In some examples, palettization schemes shown in the displayed frequency information can also be used in one or more indicators present in acoustic image data. In general, any of a variety of color or other visualization schemes (e.g., via various patterns, transparency, etc.) can be used.

In some examples, frequency ranges can be palettized in terms of severity of detected acoustic data in each frequency range. For instance, in some examples, frequency ranges shown in dark gray are considered to be critically severe, frequency ranges shown in light gray are considered to be moderately severe, and frequency ranges shown in white are considered to be exhibit minor severity. Similar to discussed above, in some examples, one or more indicators present in acoustic image data can include similar palettization severity indications at one or more locations in an acoustic scene.

Figure 45:
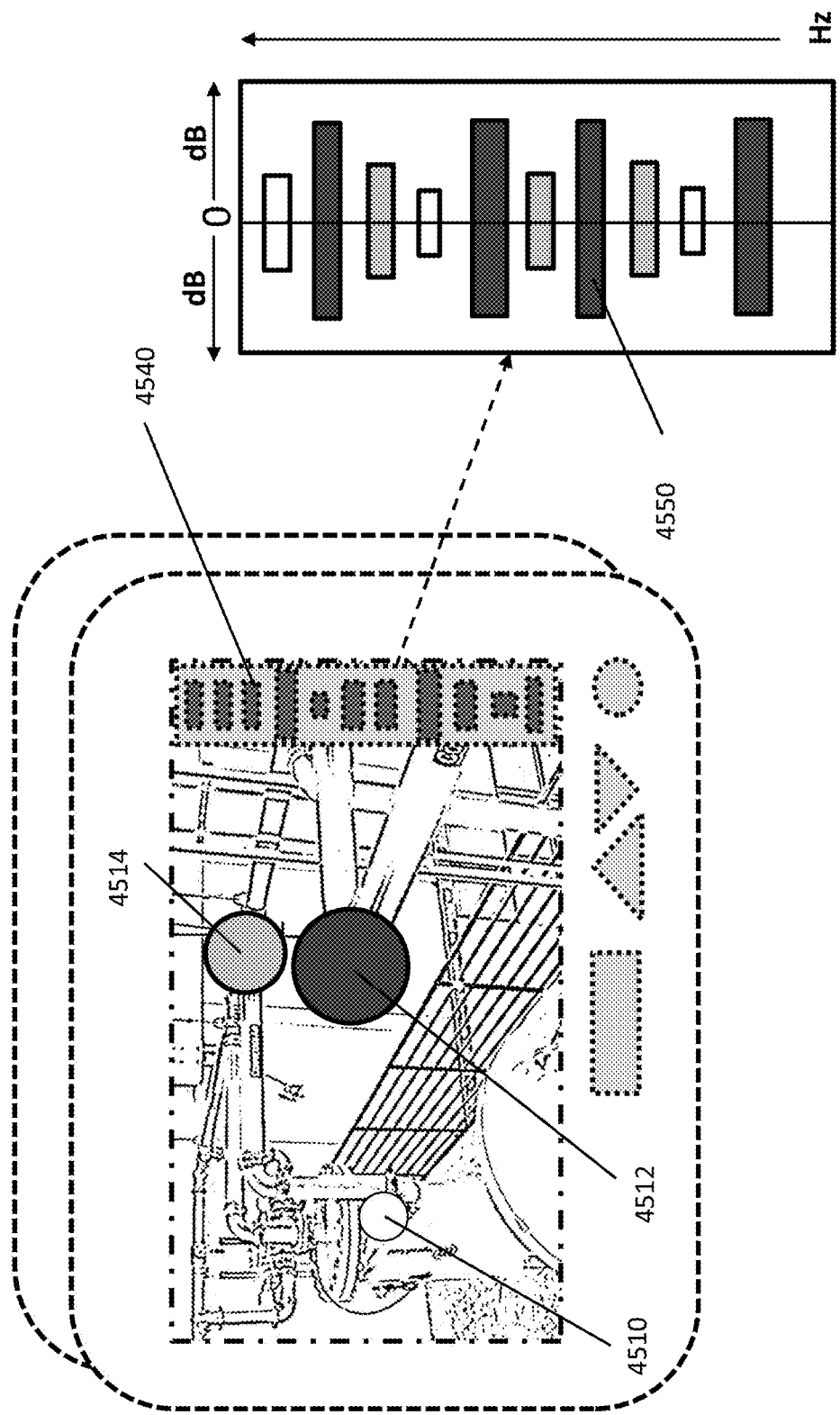
FIG. 45 shows an example display image including a multi-parameter representation showing different frequency ranges and indicators palettized according to severity.

FIG. 45 shows an example display image including a multi-parameter representation 4540 showing different frequency ranges and indicators 4510, 4512, 4514 palettized according to severity. In various examples, colors corresponding to different severity levels can be set automatically by device or manually by user.

Figure 46:
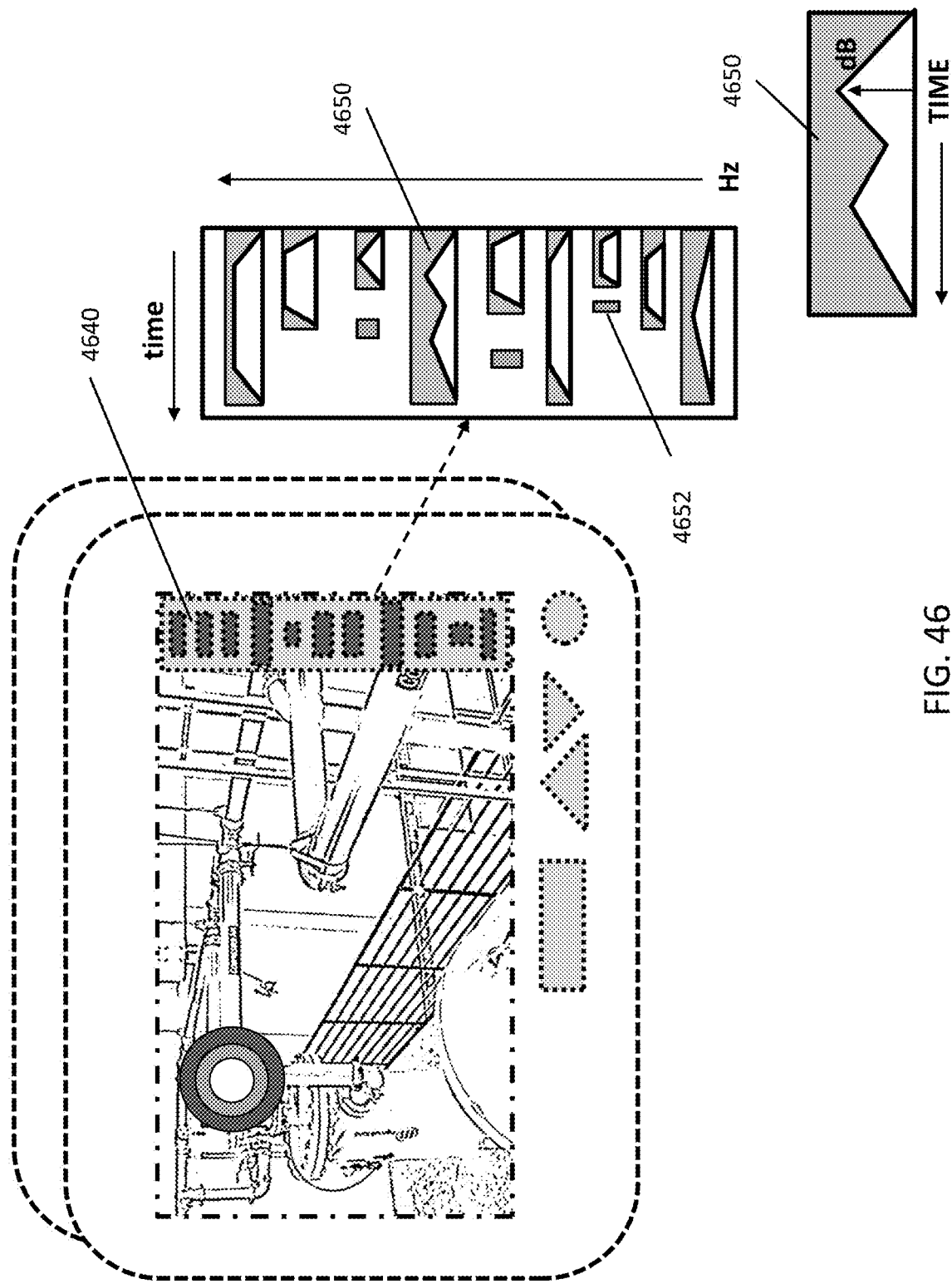
FIG. 46 shows intensity (in dB) vs. time trends for each of a plurality of frequency ranges in multi-parameter representation on a display image.

As described elsewhere herein, in some examples, frequency intensity data can be saved or tracked over time. In some embodiments, intensity vs. time information can be displayed for each of one or more frequency ranges in a multi-parameter representation. FIG. 46 shows intensity (in dB) vs. time trends for each of a plurality of frequency ranges (e.g., 4650) in multi-parameter representation 4640. For example, in some examples, in addition to intensity vs. time, peak intensity information can also be displayed in the multi-parameter representation 4640 for one or more of the one or more frequency ranges, such as via peak markers (e.g., 4652). As shown in FIG. 46, the multi-parameter representation 4640 includes a time axis and represents, for each of the plurality of acoustic frequencies or acoustic frequency ranges (e.g., 4650), intensity information corresponding to the acoustic frequency or acoustic frequency range over time.

Various processes as described herein can be embodied as a non-transitory computer-readable medium comprising executable instructions for causing one or more processors for carrying out such processes. Systems can include one or more processors configured to perform such processes, for example, based on instructions stored in memory integral to or external from the processor. In some instances, various components can be distributed throughout the system. For instance, a system can include a plurality of distribute processors, each configured execute at least a portion of the overall process executed by a system. Additionally, it will be appreciated that various features and functions as described herein can be combined into a single acoustic imaging system, for example, embodied as a handheld acoustic imaging tool or a distributed system having various separate and/or separable components.

Various functionalities of components described herein can be combined. In some embodiments, features described in this application can be combined with features described in application No. PCT/US2019/043217 entitled "SYSTEMS AND METHODS FOR PROJECTING AND DISPLAYING ACOUSTIC DATA," filed on Jul. 24, 2019, which is assigned to the assignee of the instant application and which is incorporated herein by reference. In some embodiments, features described in this application can be combined with features described in application No. PCT/US2019/043237 entitled "SYSTEMS AND METHODS FOR TAGGING AND LINKING ACOUSTIC IMAGES," filed on Jul. 24, 2019, which is assigned to the assignee of the instant application and which is incorporated herein by reference. In some embodiments, features described in this application can be combined with features described in application No. PCT/US2019/043233 entitled "SYSTEMS AND METHODS FOR DETACHABLE AND ATTACHABLE ACOUSTIC IMAGING SENSORS," filed on Jul. 24, 2019, which is assigned to the assignee of the instant application and which is incorporated herein by reference. In some embodiments, features described in this application can be combined with features described in application No. PCT/US2019/043230 entitled "SYSTEMS AND METHODS FOR REPRESENTING ACOUSTIC SIGNATURES FROM A TARGET SCENE," filed on Jul. 24, 2019, which is assigned to the assignee of the instant application and which is incorporated herein by reference.

Various embodiments have been described. Such examples are non-limiting, and do not define or limit the scope of the present disclosure in any way.

The various embodiments described above can be combined to provide further embodiments. All of the patents, applications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An acoustic analysis system comprising:
   an acoustic sensor array comprising a plurality of acoustic sensor elements configured to output acoustic data based on acoustic signals received from a scene;
   an electromagnetic imaging tool configured to output electromagnetic image data representative of electromagnetic radiation from the scene; and
   a processor in communication with the acoustic sensor array and the electromagnetic imaging tool, the processor being configured to:
   generate an image based on the acoustic data and the electromagnetic image data;
   determine a location in the image based on a location of an acoustic signal in the scene; and
   cause an indicator to be positioned at the location in the image, wherein the indicator has a visual characteristic representing a value of a user-selected acoustic parameter of the acoustic signal.

2. The acoustic analysis system of claim 1, wherein the acoustic data includes acoustic data in a plurality of acoustic frequencies or a plurality of acoustic frequency ranges, and wherein the processor is further configured to cause a multi-parameter representation to be displayed on the image, the multi-parameter representation including intensity information representative of the acoustic data in the plurality of acoustic frequencies or the plurality of acoustic frequency ranges.

3. The acoustic analysis system of claim 2, wherein the multi-parameter representation includes a time axis and presents, with respect to the time axis, the intensity information of the acoustic data in the plurality of acoustic frequencies or the plurality of acoustic frequency ranges over time.

4. The acoustic analysis system of claim 2, further comprising a user interface in communication with the processor, wherein the processor is configured to:
   receive, via the user interface, a selection of one or more acoustic frequencies or acoustic frequency ranges;
   determine one or more locations in the scene having acoustic signals corresponding to the one or more acoustic frequencies or acoustic frequency ranges; and
   cause the image to present, at the one or more locations in the scene, acoustic data of the acoustic signals corresponding to the one or more acoustic frequencies or acoustic frequency ranges.

5. The acoustic analysis system of claim 2, wherein the multi-parameter representation includes, for the plurality of acoustic frequencies or the plurality of acoustic frequency ranges, an indication of a current acoustic intensity value and a representation of a maximum acoustic intensity value.

6. The acoustic analysis system of claim 5, wherein the maximum acoustic intensity value represents, for the plurality of acoustic frequencies or the plurality of acoustic frequency ranges, a maximum acoustic intensity detected over a period of time.

7. The acoustic analysis system of claim 5, wherein the maximum acoustic intensity value represents a maximum acoustic intensity detected since a start of a measurement of acoustic intensity or a reset of the measurement of acoustic intensity.

8. The acoustic analysis system of claim 2, wherein the indicator or the multi-parameter representation includes criticality information representing a criticality of acoustic data at a location within the scene or at an acoustic frequency or acoustic frequency range within the scene.

9. The acoustic analysis system of claim 2, wherein the processor is further configured to palletize one or more acoustic frequencies or acoustic frequency ranges to indicate additional information about the one or more acoustic frequencies or acoustic frequency ranges, wherein the additional information indicates:
   a decibel range into which acoustic data in an acoustic frequency or acoustic frequency range falls, or
   a correspondence of the acoustic frequency or acoustic frequency range to a relative value rather than an absolute value.

10. The acoustic analysis system of claim 2, wherein the processor is further configured to palletize one or more acoustic frequencies or acoustic frequency ranges to indicate additional information about the one or more acoustic frequencies or acoustic frequency ranges, wherein the additional information indicates a severity of the acoustic data in the one or more acoustic frequencies or acoustic frequency ranges.

11. The acoustic analysis system of claim 1, wherein the visual characteristic of the indicator comprises an adjustable transparency that is adjusted according to the value of the user-selected acoustic parameter.

12. The acoustic analysis system of claim 1, wherein the visual characteristic of the indicator comprises a gradient palettization indicating the location in the scene where the value of the user-selected acoustic parameter satisfies one or more filters.

13. The acoustic analysis system of claim 12, wherein the gradient palettization is a single color gradient palettization that uses a gradient transparency of the indicator to indicate an intensity of the acoustic signal.

14. The acoustic analysis system of claim 1, wherein the processor is further configured to use one or more filters to identify one or more locations in the scene where the value of the user-selected acoustic parameter satisfies one or more acoustic conditions, wherein the one or more acoustic conditions includes a frequency, a frequency range, an intensity, an intensity range, a distance, or a distance range.

15. An acoustic analysis system comprising:
    an acoustic sensor array comprising a plurality of acoustic sensor elements configured to output acoustic data based on acoustic signals received from a scene; and
    a processor in communication with the acoustic sensor array, the processor being configured to:
    generate an image based on the acoustic data;
    determine if the acoustic data matches a sound profile, the sound profile comprising an acoustic parameter and a condition associated with the acoustic parameter, wherein the acoustic data matches the sound profile if a value of the acoustic parameter satisfies the condition; and
    if the acoustic data matches the sound profile, indicate in the image that the acoustic data matches the sound profile, wherein the image includes information related to the sound profile.

16. The acoustic analysis system of claim 15, wherein the acoustic parameter is a first acoustic parameter and the condition is a first condition, the sound profile further comprising a second acoustic parameter and a second condition associated with the second acoustic parameter, and
wherein the acoustic data matches the sound profile if values of the first and second acoustic parameters respectively satisfy the first and second conditions.

17. The acoustic analysis system of claim 16, wherein the first acoustic parameter is a frequency and the first condition is a range of frequencies, and the second acoustic parameter is an intensity and the second condition is a threshold intensity, wherein the acoustic data matches the sound profile if the acoustic data represents an acoustic signal having a frequency within the range of frequencies and an intensity equal to or greater than the threshold intensity.

18. The acoustic analysis system of claim 16, wherein the acoustic data matches the sound profile if the acoustic data represents:
a first acoustic signal that satisfies the first condition associated with the first acoustic parameter, and
a second acoustic signal that satisfies the second condition associated with the second acoustic parameter.

19. An acoustic analysis system comprising:
an acoustic sensor array comprising a plurality of acoustic sensor elements configured to output acoustic data based on acoustic signals received from a scene;
an electromagnetic imaging tool configured to output electromagnetic image data representative of electromagnetic radiation from the scene; and
a processor in communication with the acoustic sensor array and the electromagnetic imaging tool, the processor being configured to:
determine an acoustic parameter associated with an acoustic signal in the scene;
generate an image based on the acoustic data and the electromagnetic image data; and
update the image based on a user input, wherein the image is updated to include an indicator representing the acoustic parameter when a value of the acoustic parameter satisfies a characteristic indicated by the user input, the indicator being positioned in the image at a location indicating a location of the acoustic signal in the scene.

20. The acoustic analysis system of claim 19, wherein the image is updated to include multiple indicators, each indicator positioned at a respective location of a respective acoustic signal that satisfies a characteristic indicated by the user input, and each indicator providing a multi-parameter representation of the respective acoustic signal including an indication of a recognized sound profile of the respective acoustic signal.

\* \* \* \* \*